US012746704B2

(12) United States Patent
Lyons et al.

(10) Patent No.: US 12,746,704 B2
(45) Date of Patent: Sep. 29, 2026

(54) RIP-CUT SAW GUIDE SYSTEM

(71) Applicant: Kreg Enterprises, Inc., Ankeny, IA (US)

(72) Inventors: Andrew Lyons, Grimes, IA (US); Kyong Choi, Ames, IA (US); Christian Ewoldt, Ankeny, IA (US); Eric Ellingboe, Dubuque, IA (US)

( * ) Notice: Subject to any disclaimer, the term of this patent is extended or adjusted under 35 U.S.C. 154(b) by 427 days.

(21) Appl. No.: 18/323,098

(22) Filed: May 24, 2023

(65) Prior Publication Data

US 2023/0382003 A1 Nov. 30, 2023

Related U.S. Application Data

(60) Provisional application No. 63/346,036, filed on May 26, 2022.

(51) Int. Cl.

| | |
|---|---|
| ***B27B 27/08*** | (2006.01) |
| ***B27B 9/04*** | (2006.01) |
| ***B27B 19/09*** | (2006.01) |

(52) U.S. Cl.

CPC ................ *B27B 27/08* (2013.01); *B27B 9/04* (2013.01); *B27B 19/09* (2013.01)

(58) Field of Classification Search

CPC ........... B27B 27/08; B27B 9/04; B27B 25/10; B23B 19/09; B23D 59/00; B27D 51/02; B23Q 17/2404; B23Q 9/0042; B23Q 9/007; B27G 19/04; B26D 47/02; B25F 5/02; B25H 1/0078; Y10T 83/68; Y10T 83/828; Y10T 83/8822

USPC ......... 30/374, 289, 376, 371, 373, 375, 505; 83/821, 745, 520, 614, 743, 468.1, 468.4, 83/508.2, 574, 454, 487, 761, 762, 765; 33/42, 403, 427, 429, 430, 437, 474, 479

See application file for complete search history.

(56) References Cited

U.S. PATENT DOCUMENTS

| | | | | | |
|---|---|---|---|---|---|
| 1,452,753 | A | | 4/1923 | Otto | |
| 2,571,569 | A | | 10/1951 | Walter | |
| 2,656,860 | A | * | 10/1953 | Thayer ................ | B23Q 9/0085 83/522.25 |
| 2,676,624 | A | | 4/1954 | Gecmen | |
| 3,320,982 | A | * | 5/1967 | Kwiatkowski ....... | B23Q 9/0078 83/471.2 |
| 3,368,594 | A | * | 2/1968 | Drumbore ............ | B23Q 9/0085 83/468.3 |

(Continued)

FOREIGN PATENT DOCUMENTS

| | | |
|---|---|---|
| DE | 102010032989 A1 | 2/2012 |
| EP | 0354290 | 2/1990 |

(Continued)

*Primary Examiner* — Ghassem Alie

(57) ABSTRACT

In one or more arrangements, a guide system for woodworking operations is presented which has a rail and a pair of side members operably connected to, and adjustable along a length of, the rail. In one or more arrangements, the side members are connected directly to the rail while in other arrangements the side members are indirectly connected to the rail, such as through use of a front member. In some various arrangements, the side members are laterally adjustable in order to accommodate various shapes, sizes, and configurations of base plates on various cutting members.

18 Claims, 54 Drawing Sheets

(56) References Cited

U.S. PATENT DOCUMENTS

| | | | | | |
|---|---|---|---|---|---|
| 3,586,077 | A | * | 6/1971 | Pease | B23Q 9/0014 30/376 |
| 3,830,130 | A | | 8/1974 | Moore | |
| 4,056,028 | A | | 11/1977 | Patterson | |
| 4,078,309 | A | | 3/1978 | Wilson | |
| 4,078,781 | A | | 3/1978 | Fraser | |
| 4,381,105 | A | | 4/1983 | Goff | |
| 4,453,438 | A | | 6/1984 | Zelli | |
| 4,489,634 | A | * | 12/1984 | Volk | B23D 47/025 83/581 |
| 4,522,098 | A | | 6/1985 | Bliss | |
| 4,524,662 | A | | 6/1985 | Carley | |
| 4,624,054 | A | | 11/1986 | Edwards | |
| 4,628,608 | A | * | 12/1986 | Kuhlmann | B23Q 9/0028 30/373 |
| 4,642,898 | A | | 2/1987 | Miller | |
| 4,777,726 | A | | 10/1988 | Flowers | |
| 5,035,061 | A | * | 7/1991 | Bradbury | B23Q 9/0028 30/373 |
| 5,052,454 | A | * | 10/1991 | Meinhardt | B23Q 35/44 144/144.51 |
| 5,080,152 | A | | 1/1992 | Collins et al. | |
| 5,182,975 | A | | 2/1993 | Warner | |
| 5,365,822 | A | | 11/1994 | Stapleton et al. | |
| 5,390,425 | A | | 2/1995 | Gilberts | |
| 5,481,810 | A | | 1/1996 | Hastings | |
| 5,509,338 | A | | 4/1996 | Ekker | |
| 5,533,556 | A | * | 7/1996 | Whitney | B23Q 9/0042 144/144.1 |
| 5,787,599 | A | | 8/1998 | Clifton | |
| 5,815,931 | A | * | 10/1998 | Cleveland | B23Q 9/0028 30/373 |
| 5,815,933 | A | | 10/1998 | Staniszewski | |
| 6,079,309 | A | | 6/2000 | Molburg | |
| 6,226,885 | B1 | | 5/2001 | Korich | |
| 6,393,710 | B1 | | 5/2002 | Hastings | |
| 6,412,179 | B1 | | 7/2002 | Ende | |
| 6,484,410 | B1 | | 11/2002 | Meastas | |
| 6,505,411 | B2 | | 1/2003 | Gooden | |
| 6,604,296 | B2 | | 8/2003 | Mastrobattista | |
| 6,757,981 | B2 | | 7/2004 | Hampton | |
| 6,880,442 | B2 | | 4/2005 | Duginske | |
| 7,020,978 | B1 | | 4/2006 | Nelson | |
| 7,219,440 | B2 | | 5/2007 | Lewis | |
| 7,464,737 | B2 | | 12/2008 | Duginske | |
| 7,484,313 | B1 | | 2/2009 | Ogilvie | |
| 7,798,187 | B1 | | 9/2010 | Duginske | |
| 8,479,630 | B2 | | 7/2013 | Osbourne | |
| 8,616,108 | B2 | | 12/2013 | Lukas et al. | |
| 8,646,368 | B1 | | 2/2014 | Clark | |
| 9,114,546 | B1 | | 8/2015 | Francis | |
| 9,593,925 | B2 | | 3/2017 | Couture | |
| 9,815,177 | B2 | | 11/2017 | Ursell et al. | |
| 9,975,221 | B2 | | 5/2018 | Ursell et al. | |
| 10,456,944 | B2 | * | 10/2019 | Ursell | B27B 9/04 |
| 10,875,109 | B1 | | 12/2020 | Gibson et al. | |
| 11,052,565 | B2 | | 7/2021 | Strempke et al. | |
| 11,168,965 | B2 | | 11/2021 | Strempke et al. | |
| 11,325,215 | B1 | | 5/2022 | Clark | |
| 11,383,312 | B2 | | 7/2022 | Gibson et al. | |
| 11,701,721 | B2 | | 7/2023 | Gibson et al. | |
| 12,280,464 | B1 | | 4/2025 | Clark | |
| 2002/0066190 | A1 | | 6/2002 | Fey et al. | |
| 2003/0037453 | A1 | | 2/2003 | Mastrobattista | |
| 2003/0233922 | A1 | | 12/2003 | Makropoulos | |
| 2004/0159200 | A1 | | 8/2004 | Stoffel | |
| 2004/0172846 | A1 | | 9/2004 | McRae | |
| 2005/0016349 | A1 | | 1/2005 | Molburg | |
| 2005/0061128 | A1 | | 3/2005 | Caughlin et al. | |
| 2005/0172776 | A1 | | 8/2005 | Beleski | |
| 2006/0196072 | A1 | | 9/2006 | Lewis | |
| 2008/0289206 | A1 | | 11/2008 | Mastrobattista | |
| 2009/0308218 | A1 | | 12/2009 | Raff et al. | |
| 2011/0083540 | A1 | | 4/2011 | Xing et al. | |
| 2012/0079931 | A1 | | 4/2012 | Hansen | |
| 2013/0118332 | A1 | | 5/2013 | Barnes | |
| 2013/0247738 | A1 | | 9/2013 | Stoffel | |
| 2015/0020672 | A1 | | 1/2015 | Ursell et al. | |
| 2015/0283679 | A1 | | 10/2015 | Ursell | |
| 2015/0283680 | A1 | | 10/2015 | Ursell | |
| 2015/0321374 | A1 | | 11/2015 | Ursell et al. | |
| 2018/0065272 | A1 | * | 3/2018 | Saylor | B27F 1/16 |
| 2018/0180394 | A1 | | 6/2018 | Ursell et al. | |
| 2021/0121996 | A1 | | 4/2021 | Hoff et al. | |
| 2021/0122080 | A1 | | 4/2021 | Eilts et al. | |
| 2021/0146570 | A1 | | 5/2021 | Miller et al. | |
| 2021/0283797 | A1 | | 9/2021 | Strempke et al. | |
| 2022/0288707 | A1 | * | 9/2022 | Hall | B23D 47/02 |

FOREIGN PATENT DOCUMENTS

| | | | |
|---|---|---|---|
| EP | 2974824 | A2 | 1/2016 |
| GB | 2177647 | | 1/1989 |

* cited by examiner

RIP-CUT SAW GUIDE SYSTEM

CROSS-REFERENCE TO RELATED APPLICATION

This application claims priority to U.S. Provisional Patent Application No. 63/346,036 filed May 26, 2022 and titled "RIP-CUT SAW GUIDE SYSTEM," the disclosure of which is hereby incorporated by reference in its entirety.

FIELD OF THE DISCLOSURE

This disclosure relates to a cutting device. More specifically and without limitation, this disclosure related to a device that assists with cutting wood and other materials.

OVERVIEW OF THE DISCLOSURE

A number of systems and devices have been developed for cutting wood and other materials. Common types of cutting systems include: band saws, circular saws, and table saws. Each of these saw configurations have their own unique benefits as well as their own unique disadvantages and drawbacks. Band saws are formed of a rotating saw blade that is formed in the shape of a band. This blade is relatively narrow and therefore band saws are tremendously well suited for cutting intricate shapes or features in both large and small pieces of material. While effective in many applications, band saws suffer from many disadvantages.

Namely, band saws are not well suited for making long straight cuts due to the narrow configuration of the blade. In addition, due to the large blade, band saws are generally large in stature which makes them stationary, and not portable, tools limited to use within the confines of a workshop. In addition, band saw blades are generally expensive. Also, band saws generally have a slow through-put. Another disadvantage of band saws is that the blade can be easily moved by grains in the wood due to the flexible nature and narrow width of the blade, which adds inaccuracy to straight cuts. For these reasons, band saws are not well suited or desirable for many cutting operations or many users.

Table saws are generally formed of a rotating blade that sticks upward from a table top surface. Table saws are generally well suited for making straight cuts in pieces of plank material. While table saws can be used with great precision to make straight cuts, table saws suffer from many disadvantages.

Namely, due to the rotating blade sticking up from the table top surface, table saws have a generally sinister appearance and therefore many users are scared or intimidated by table saws. While some of the bad reputation table saws have is partially fiction, it is true that the exposed blade is very dangerous, especially when used by the novice user. Another disadvantage of table saws is that because the blade protrudes from a table-top-like surface, table saws are relatively large, heavy, complicated, and expensive devices. Due to their large size, table saws cannot be used in many settings or are not convenient for use in many applications such as on a jobsite as they are not very mobile or easy to set up on-site. Instead, table saws, like band saws, are generally reserved for use within the confines of a workshop. Yet another disadvantage of table saws is that they have a tendency to kick-back material during cutting. A kick back occurs when a piece of material binds between the rotating blade and a guide surface or when a workpiece begins to twist or rotate while being cut. This often results in the blade pushing, kicking or throwing the workpiece back toward the user, sometimes in a catastrophic manner. Obviously this can be a very dangerous situation, not to mention a very scary one.

Another disadvantage of table saws is that they can be very difficult to use when cutting large sheets of material because the entire piece of material must be moved, not to mention moved in a manner that prevents binding and kick-back. If the piece of material is not precisely moved it can bind on the blade and kick back. Yet another disadvantage of table saws is that they require a lot of skill and experience to fully utilize the table saw in a safe manner. For these reasons, table saws are not well suited or desirable for many cutting operations or many users.

Circular saws are generally formed of a handheld motor connected to a rotating blade. Circular saws are relatively inexpensive, and unlike table saws, circular saws generally have a blade cover that protects the user from the blade when not in use. This blade cover provides at least the appearance of safety which makes many users much more comfortable using a circular saw as opposed to a table saw. Also, due to their small size, circular saws are relatively easy to move and operate. In addition, circular saws are easy to transport and therefore circular saws are well suited for job-site use and are not constrained to use only within a workshop.

While circular saws have many advantages, they also have many disadvantages. Namely, due to their small size it is hard to accurately cut small pieces of material with a circular saw. In addition, it is difficult to make a long and straight cut with circular saws. Another disadvantage to circular saws is that the blade guide often gets into the way when a user is attempting to make a cut, which can cause the cutting operation to be less-safe and can cause the cutting operation to be in accurate. Another disadvantage is because the blade rotates upward through the workpiece circular saws tend to cause a great amount of tear out on the upper-positioned surface of the workpiece that is cut. Circular saws come in various shapes and sizes, and they have bases of various shapes and sized. This can mean that certain cutting attachments and/or assistance tools are not adequate to fit every type of circular saw.

As such, prior art cutting systems suffer from many substantial disadvantages including being: unsafe, inaccurate, large, expensive, hard to use, inaccurate, hard to guide, and cause tear out, among many other disadvantages. Also, cutting attachments and/or assistance tools are not adaptable for every cutting system.

Therefore, for all the reasons stated above, and the reasons stated below, there is a need in the art for an improved rip-cut saw guide system. Thus, it is a primary objective of the disclosure to provide a rip-cut saw guide system and method that improves upon the state of the art.

Another objective of the disclosure is to provide a rip-cut saw guide system which is safe to use.

Yet another object of the disclosure is to provide a rip-cut saw guide system that is efficient to use.

Another object of the disclosure is to provide a rip-cut saw guide system that is relatively inexpensive.

Yet another object of the disclosure is to provide a rip-cut saw guide system that is capable of making long straight cuts.

Another object of the disclosure is to provide a rip-cut saw guide system that is capable of making round cuts.

Yet another object of the disclosure is to provide a rip-cut saw guide system that can be used to cut both large and small pieces easily and accurately.

Another object of the disclosure is to provide a rip-cut saw guide system that is accurate.

Yet another object of the disclosure is to provide a rip-cut saw guide system that is efficient.

Another object of the disclosure is to provide a rip-cut saw guide system that can be used with practically any circular saw.

Yet another object of the disclosure is to provide a rip-cut saw guide system that can be used with practically any jigsaw.

Another object of the disclosure is to provide a rip-cut saw guide system that can be used with workpieces with a wide range of thicknesses.

Yet another object of the disclosure is to provide a rip-cut saw guide system that is easy to learn how to use.

Another object of the disclosure is to provide a rip-cut saw guide system that is relatively small in size and shape.

Yet another object of the disclosure is to provide a rip-cut saw guide system that provides the benefits of a circular saw and a table saw in a single device.

Another object of the disclosure is to provide a rip-cut saw guide system that provides the benefits of a jigsaw and a table saw in a single device.

Yet another object of the disclosure is to provide a rip-cut saw guide system that allows for bevel cuts and other angled cuts.

Another object of the disclosure is to provide a rip-cut saw guide system that holds workpieces in a firm and rigid manner.

Yet another object of the disclosure is to provide a rip-cut saw guide system that is easy to set up.

Another object of the disclosure is to provide a rip-cut saw guide system that is easy to take down.

Yet another object of the disclosure is to provide a rip-cut saw guide system that is formed of a minimum number of parts.

Another object of the disclosure is to provide a rip-cut saw guide system that is simple to use.

Yet another object of the disclosure is to provide a rip-cut saw guide system that is easier to use than prior art systems.

Another object of the disclosure is to provide a rip-cut saw guide system that is unique.

Yet another object of the disclosure is to provide a rip-cut saw guide system that provides new capabilities to existing tools.

Another object of the disclosure is to provide a rip-cut saw guide system that can be used with practically any benchtop.

Yet another object of the disclosure is to provide a rip-cut saw guide system that is high quality.

Another object of the disclosure is to provide a rip-cut saw guide system that has a robust design.

Yet another object of the disclosure is to provide a rip-cut saw guide system that has a long useful life.

Another object of the disclosure is to provide a rip-cut saw guide system that provides accurate and clean cuts.

Yet another object of the disclosure is to provide a rip-cut saw guide system that helps prevent chip tear-out.

Another object of the disclosure is to provide a rip-cut saw guide system that is durable.

Yet another object of the disclosure is to provide a rip-cut saw guide system that saves time.

Another object of the disclosure is to provide a rip-cut saw guide system that is fun to use.

Yet another object of the disclosure is to provide a rip-cut saw guide system that can be used with workpieces of practically any material.

Another object of the disclosure is to provide a rip-cut saw guide system that is easily portable and can be used on a job site.

Yet another object of the disclosure is to provide a rip-cut saw guide system that is adjustable to fit various shape, sizes, and types of saws.

These and other objects, features, or advantages of the disclosure will become apparent from the specification, figures, and claims.

SUMMARY OF THE DISCLOSURE

In one or more arrangements, a guide system for woodworking operations is presented which has a rail and a pair of side members operably connected to, and adjustable along a length of, the rail. In one or more arrangements, the side members are connected directly to the rail while in other arrangements the side members are indirectly connected to the rail, such as through use of a front member. In some various arrangements, the side members are laterally adjustable to accommodate various shapes, sizes, and configurations of base plates on various cutting members.

DETAILED DESCRIPTION OF THE DISCLOSURE

Figure 1:
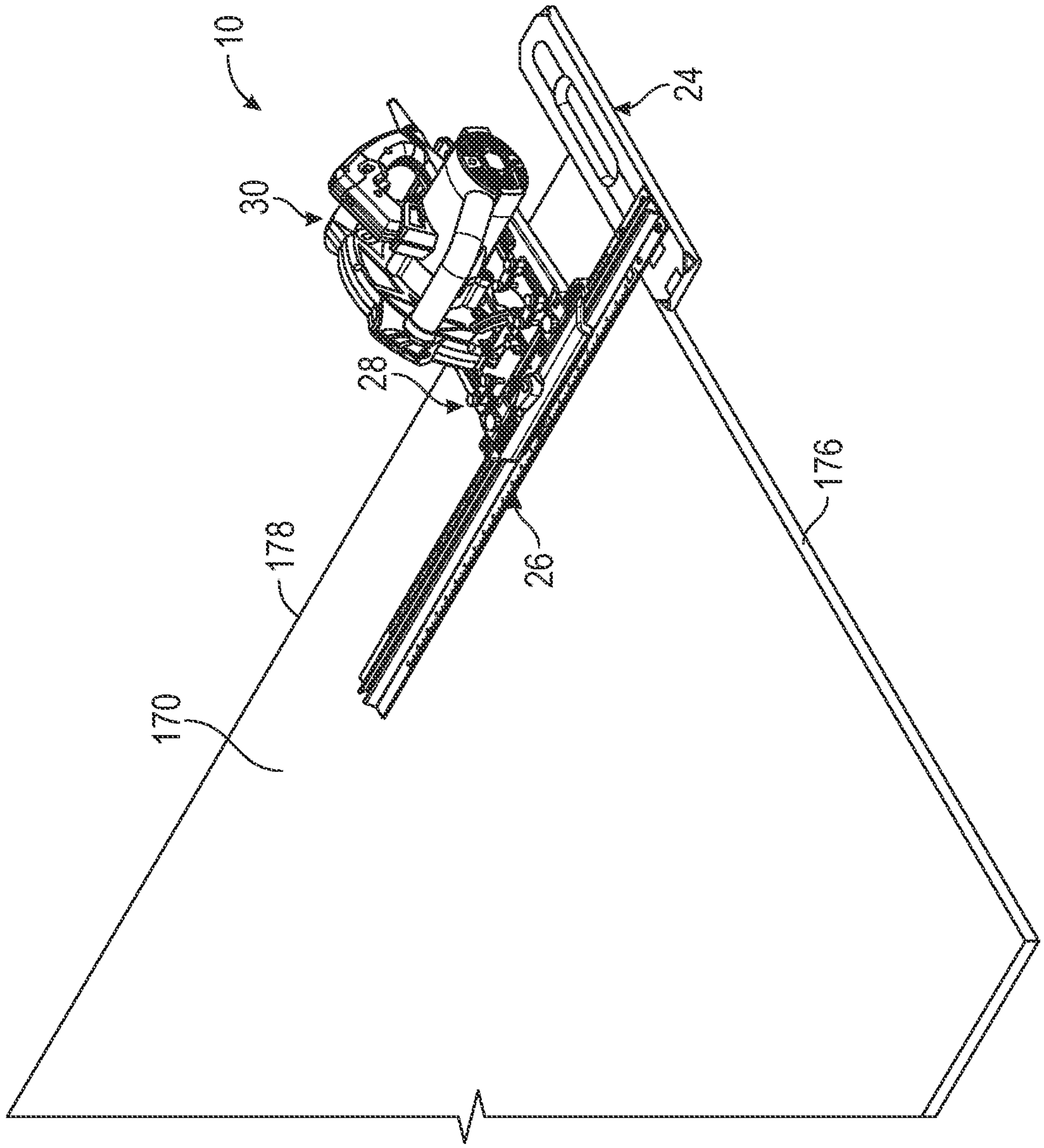
FIG. 1 shows an upper front left perspective view of a rip-cut saw guide system in use with a circular saw on a workpiece, in accordance with one or more arrangements.
Figure 2:
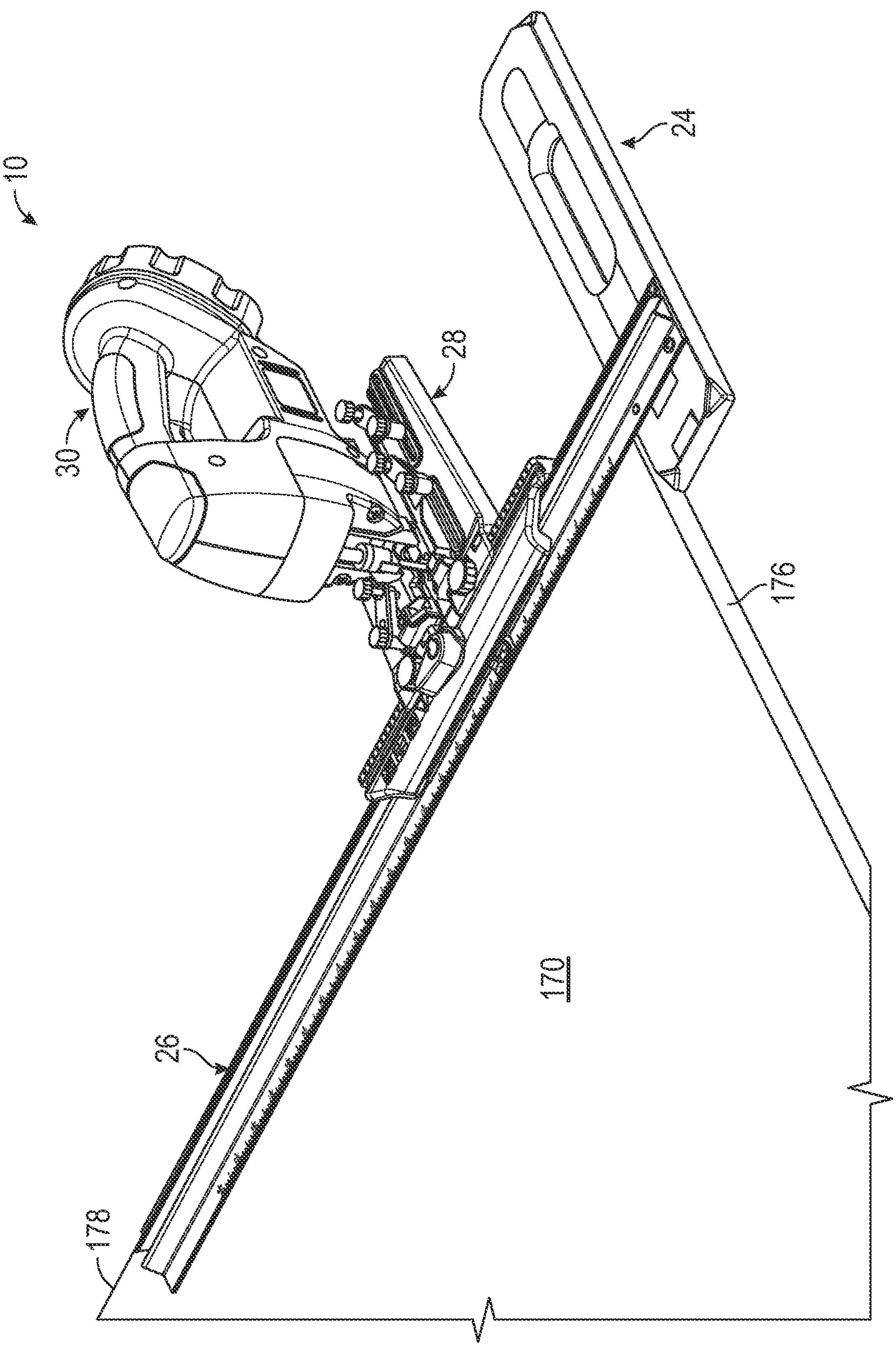
FIG. 2 shows an upper front left perspective view of a rip-cut saw guide system in use with a jigsaw on a workpiece, in accordance with one or more arrangements.
Figure 3:
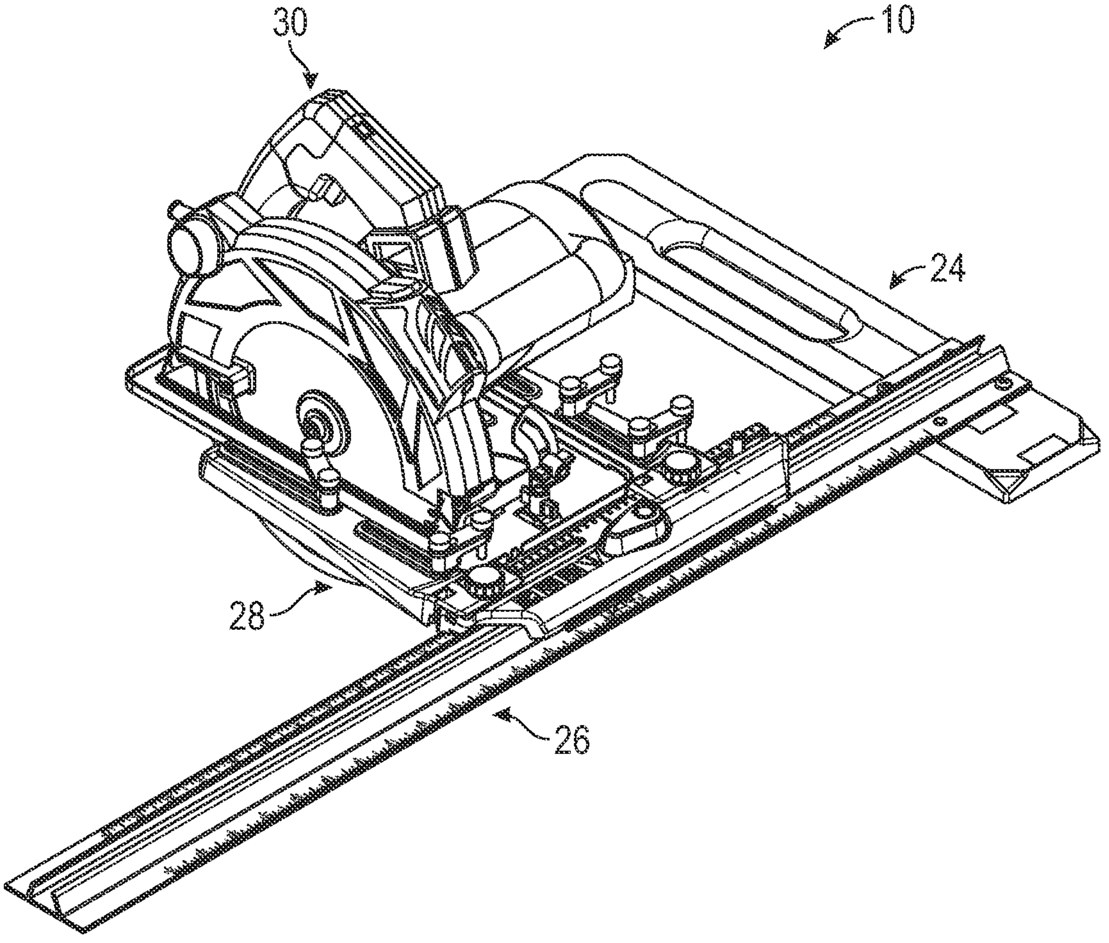
FIG. 3 shows an upper front right perspective view of a rip-cut saw guide system with a circular saw, in accordance with one or more arrangements.
Figure 4:
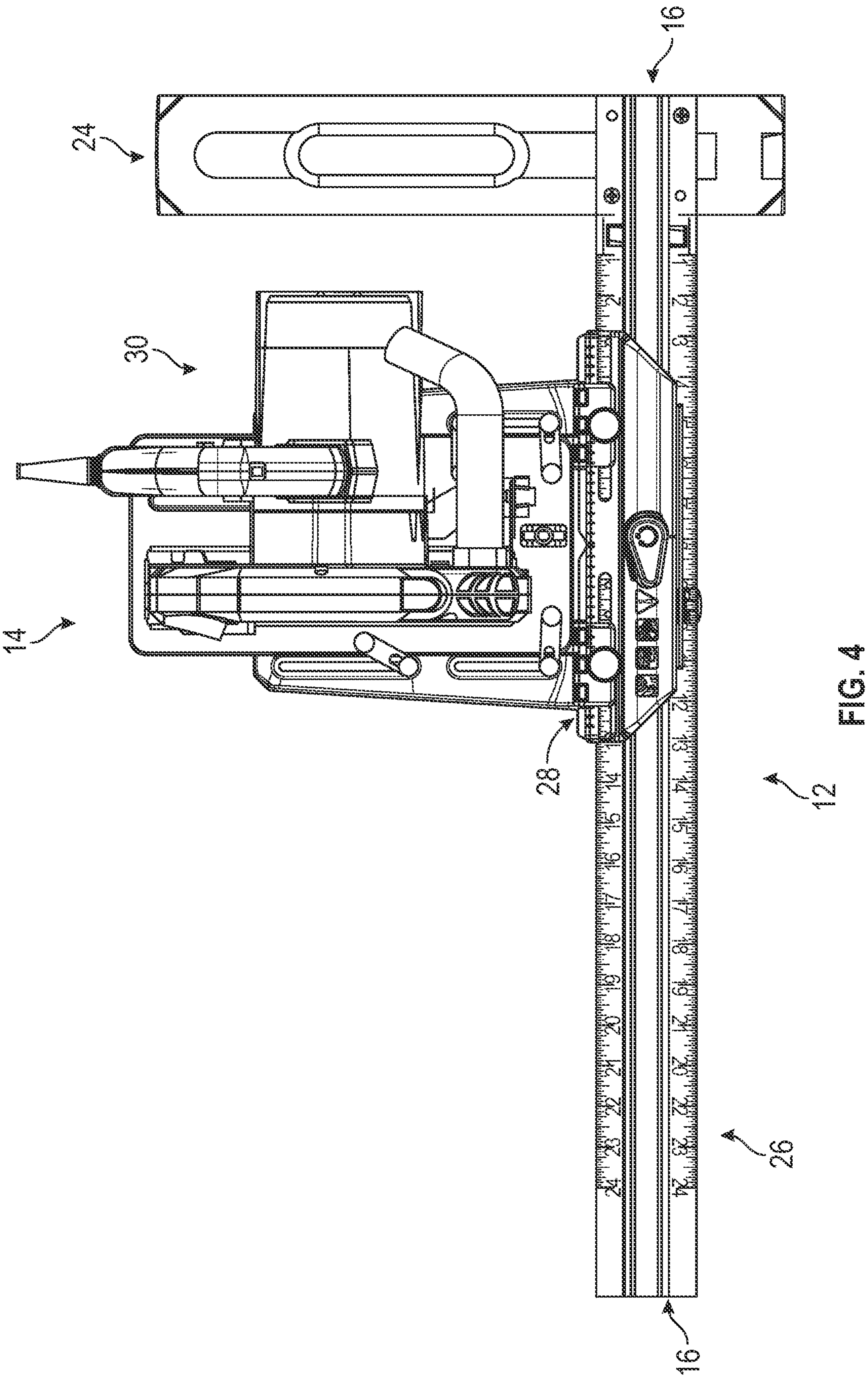
FIG. 4 shows a top view of a rip-cut saw guide system with a circular saw, in accordance with one or more arrangements.
Figure 5:
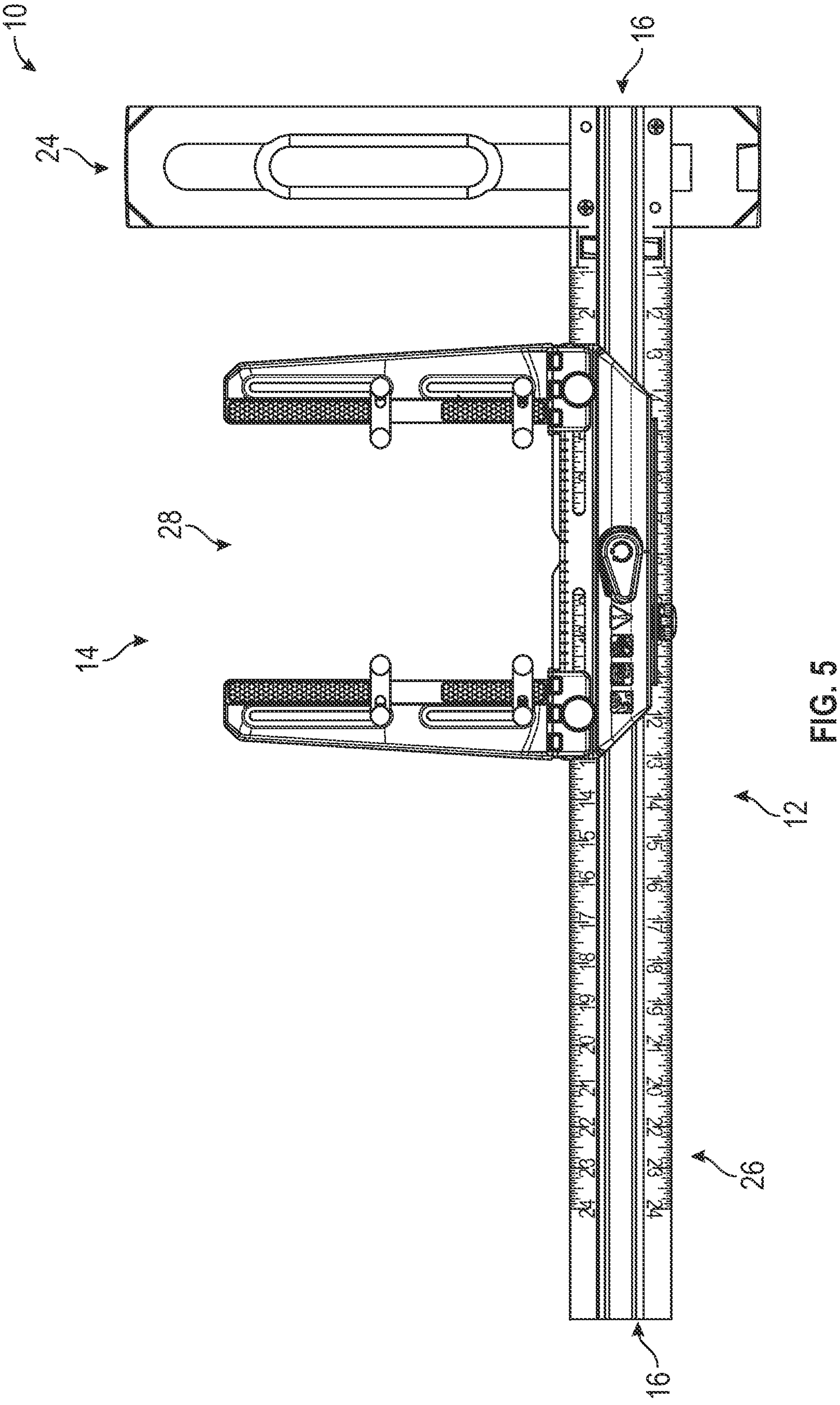
FIG. 5 shows a top view of a rip-cut saw system, in accordance with one or more arrangements.
Figure 6:
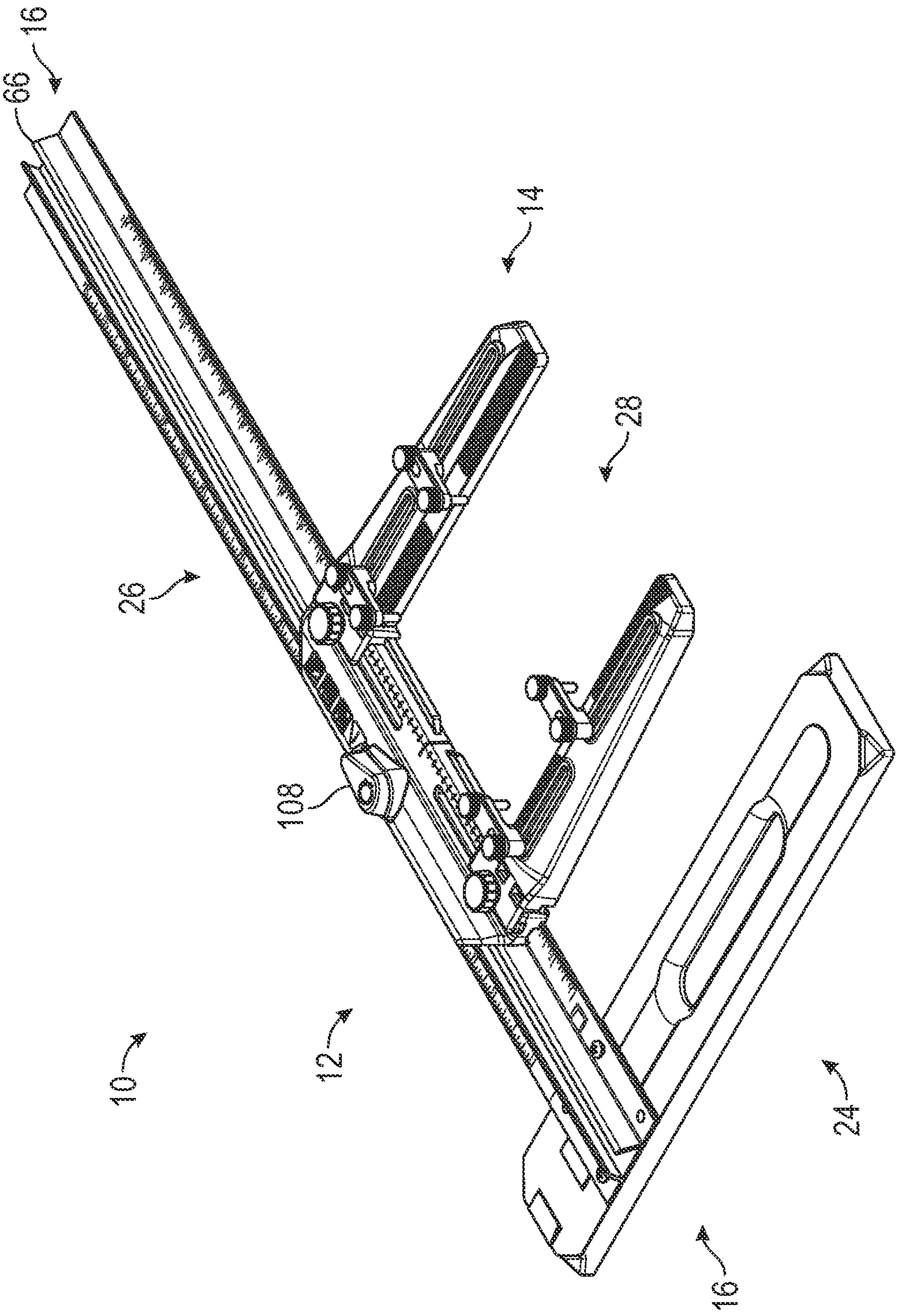
FIG. 6 shows an upper left rear perspective view of a rip-cut saw system, in accordance with one or more arrangements.
Figure 7:
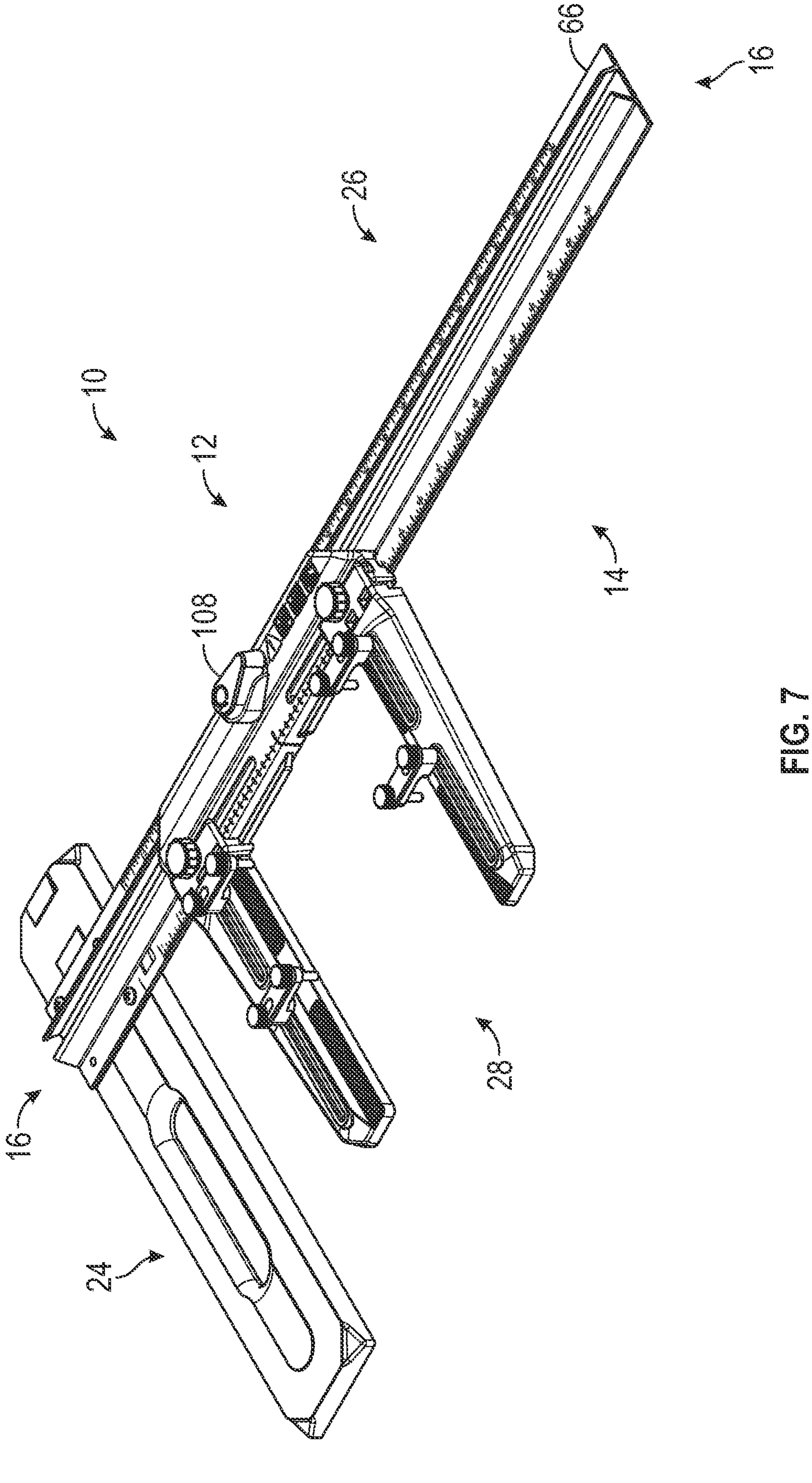
FIG. 7 shows an upper right rear perspective view of a rip-cut saw system, in accordance with one or more arrangements.
Figure 8:
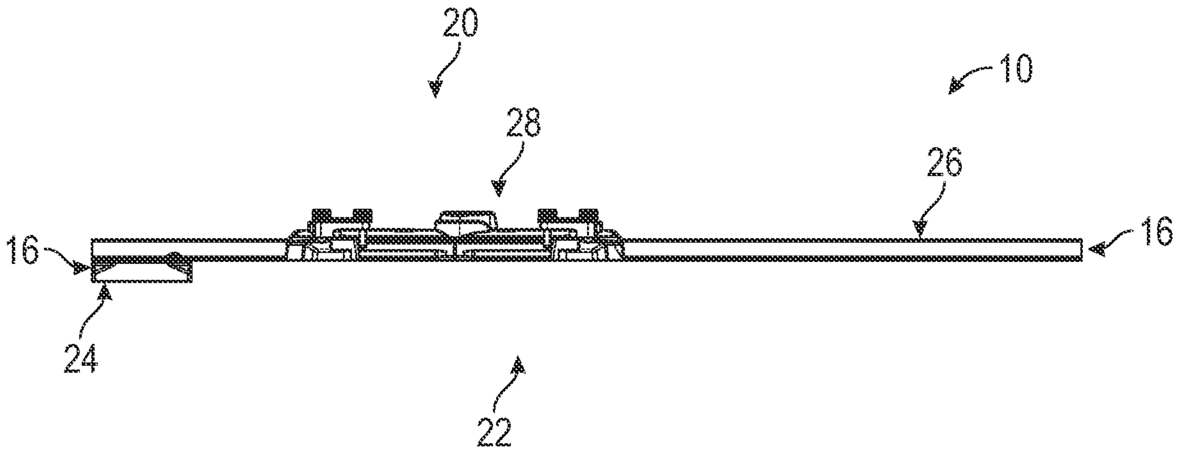
FIG. 8 shows a rear elevation view of a rip-cut saw system, in accordance with one or more arrangements.
Figure 9:
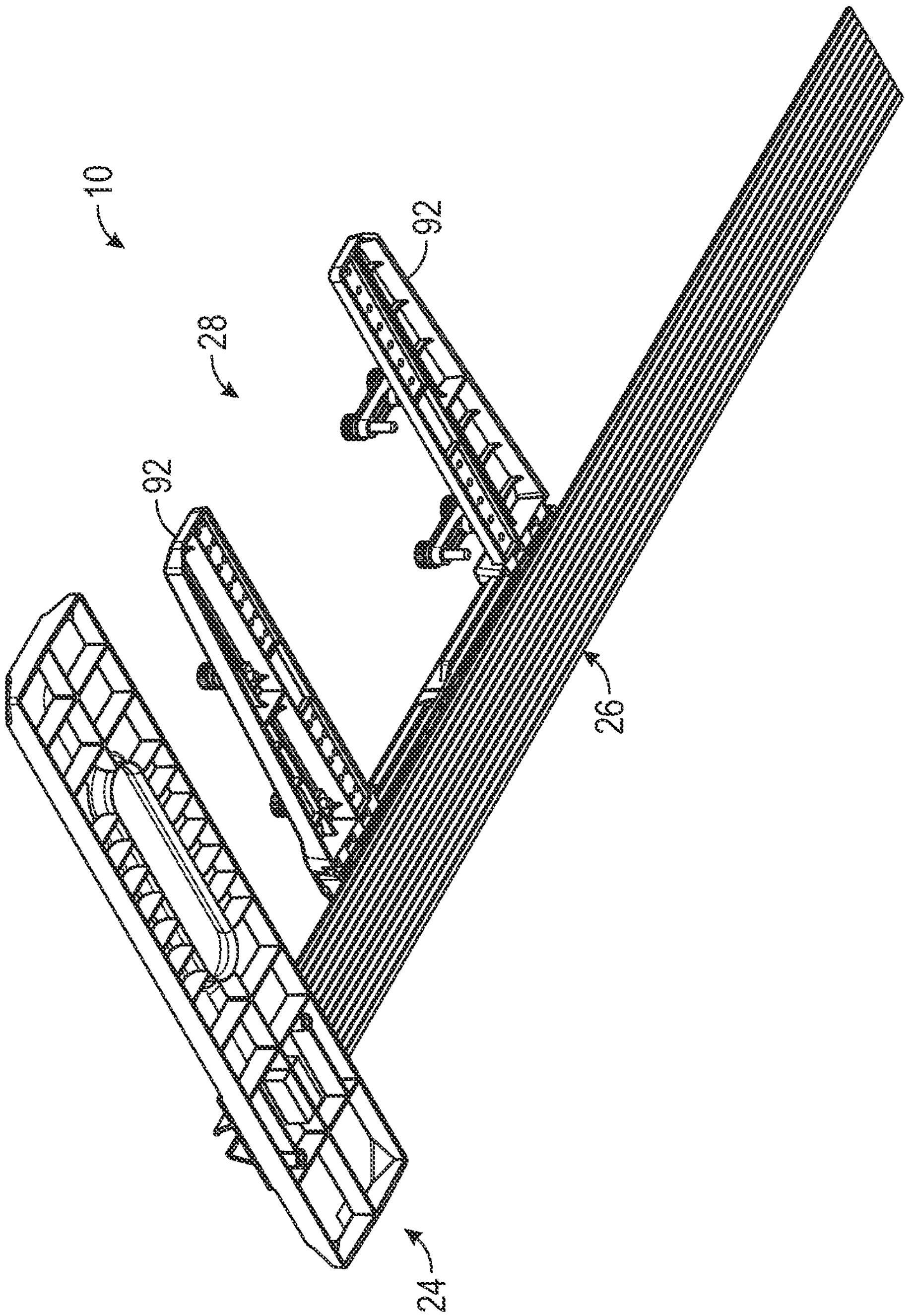
FIG. 9 shows a lower left rear perspective view of a rip-cut saw system, in accordance with one or more arrangements.
Figure 10:
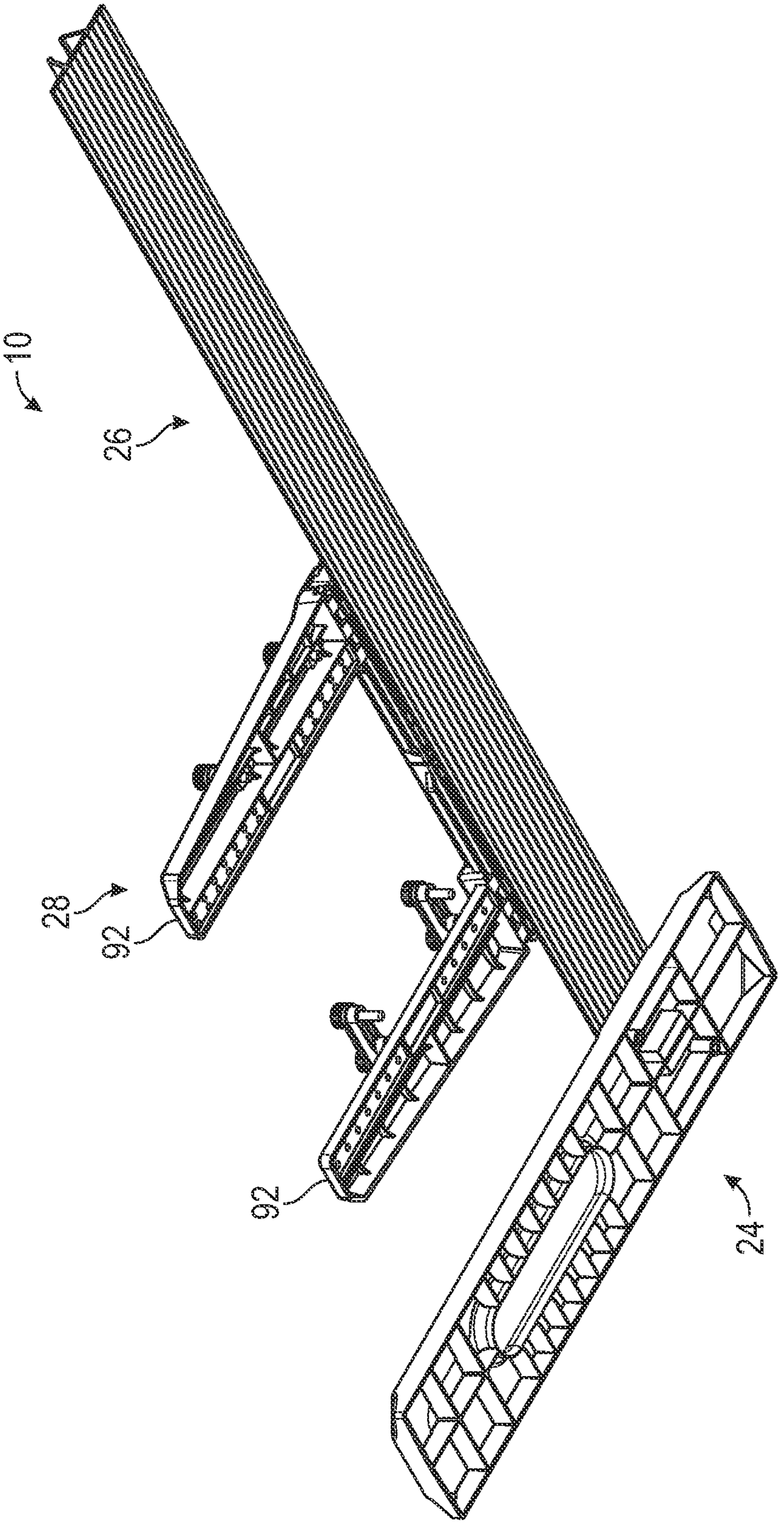
FIG. 10 shows a lower right rear perspective view of a rip-cut saw system, in accordance with one or more arrangements.
Figure 11:
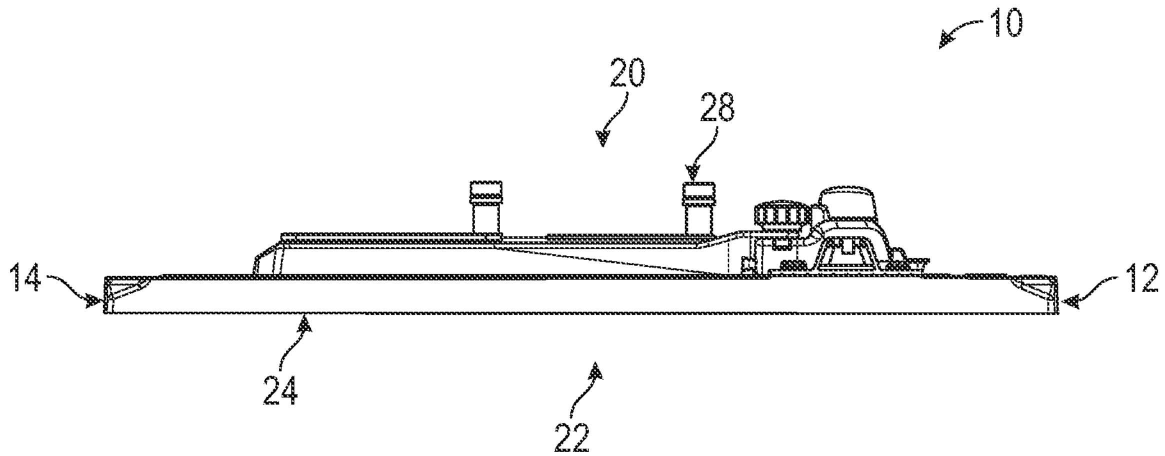
FIG. 11 shows right side elevation view of a rip-cut saw system, in accordance with one or more arrangements.
Figure 12:
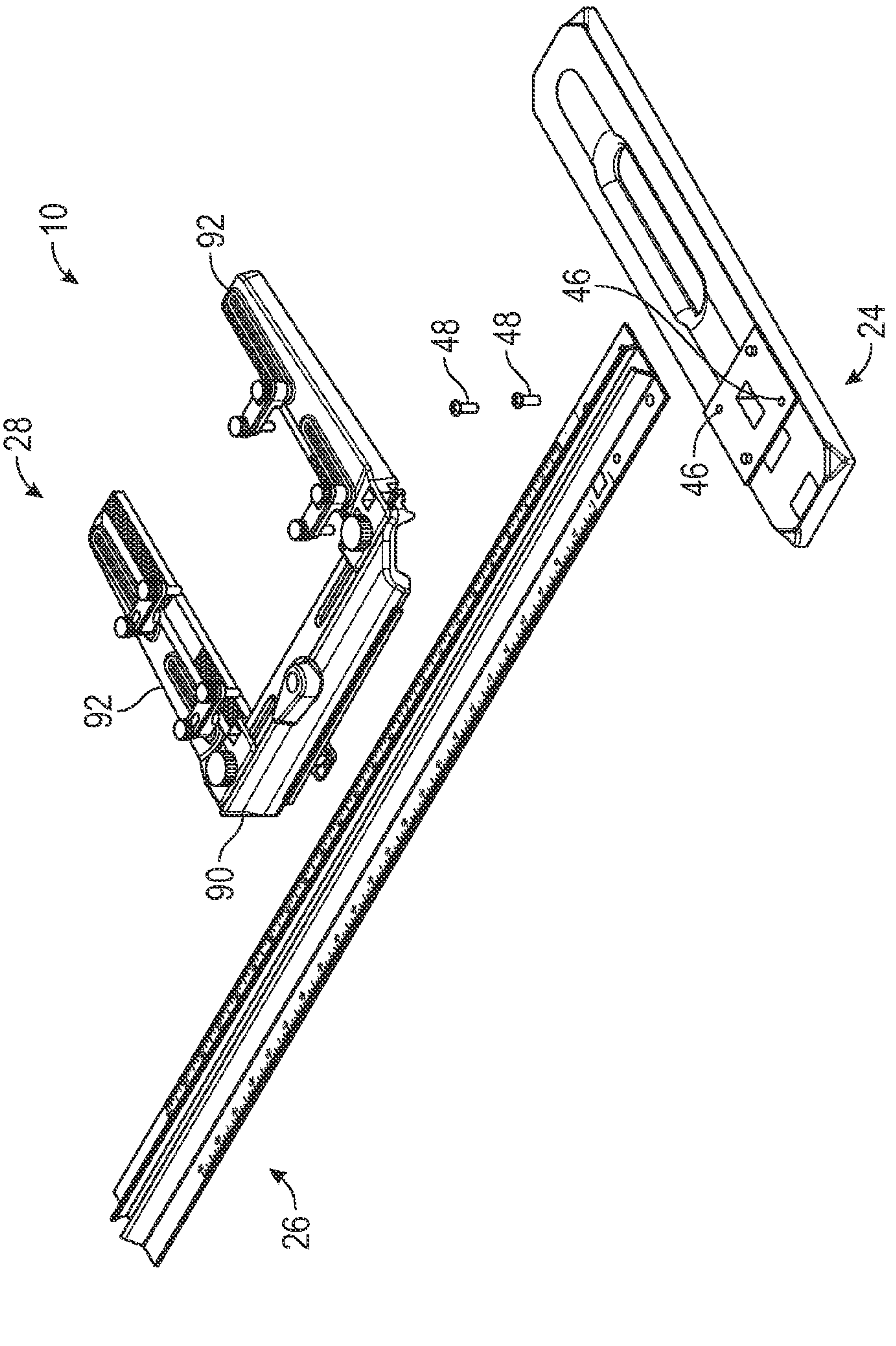
FIG. 12 shows an exploded upper left front perspective view of a rip-cut saw guide system with the guide arm, rail, and sled detached from one another, in accordance with one or more arrangements.
Figure 13:
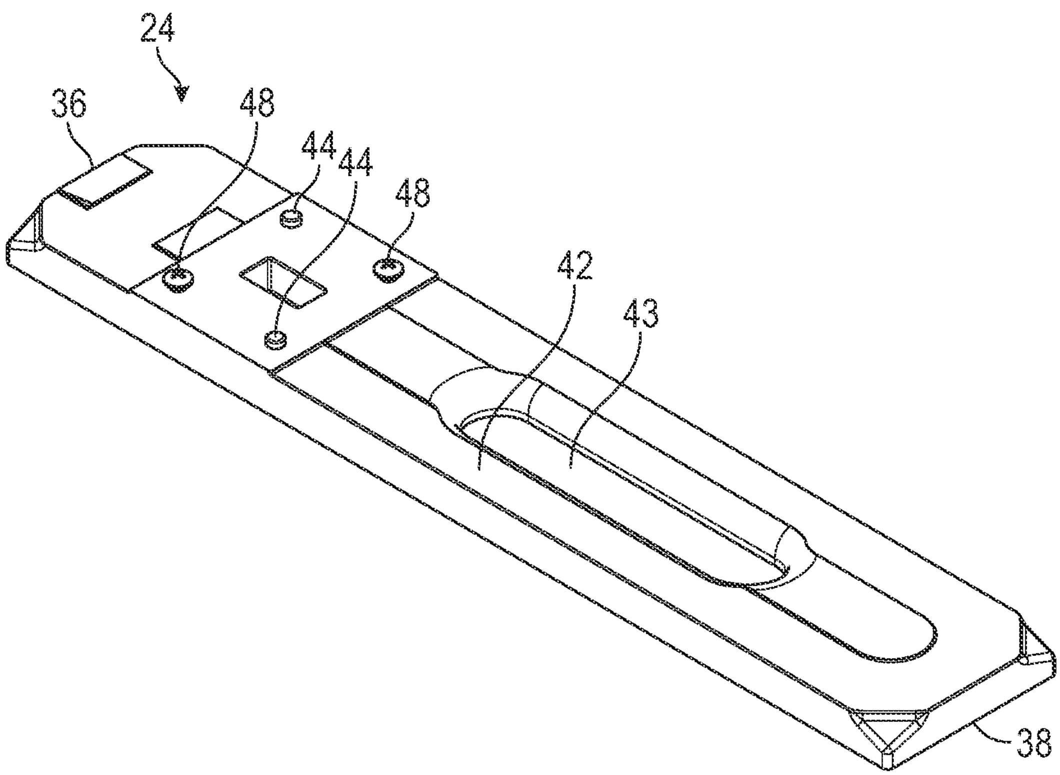
FIG. 13 shows an upper left rear perspective view of a guide arm of a rip-cut saw guide system, in accordance with one or more arrangements.
Figure 14:
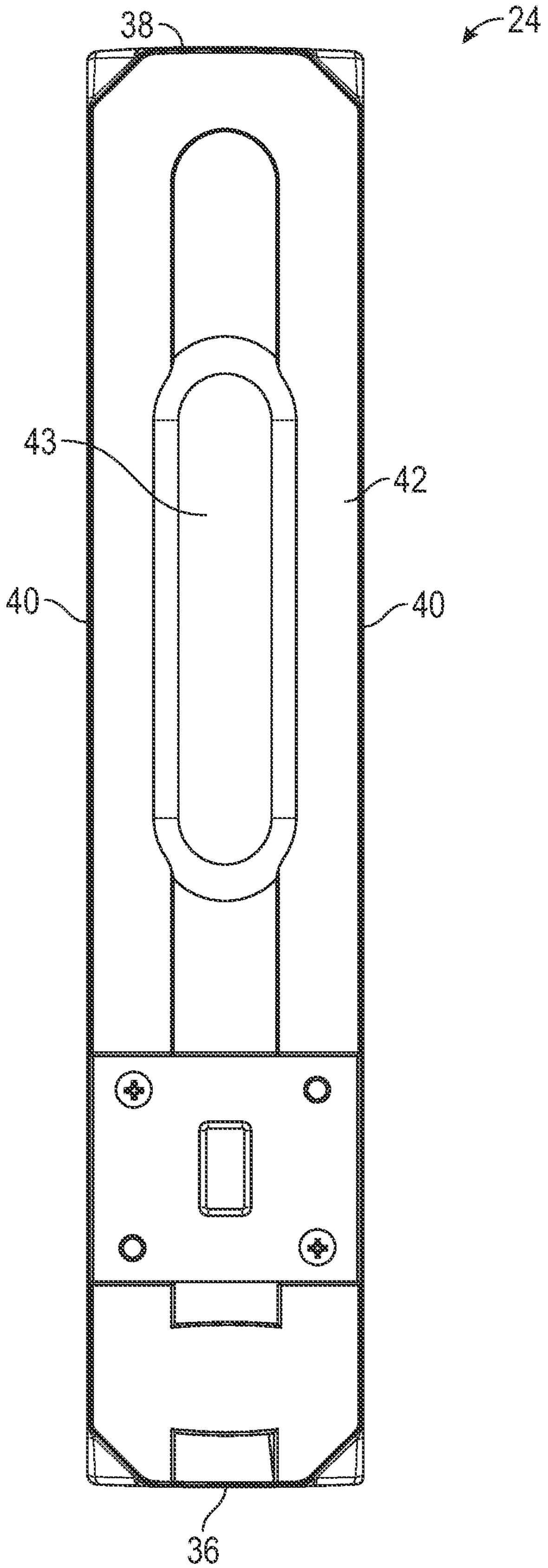
FIG. 14 shows a top plan view of a guide arm of a rip-cut saw guide system, in accordance with one or more arrangements.
Figure 15:
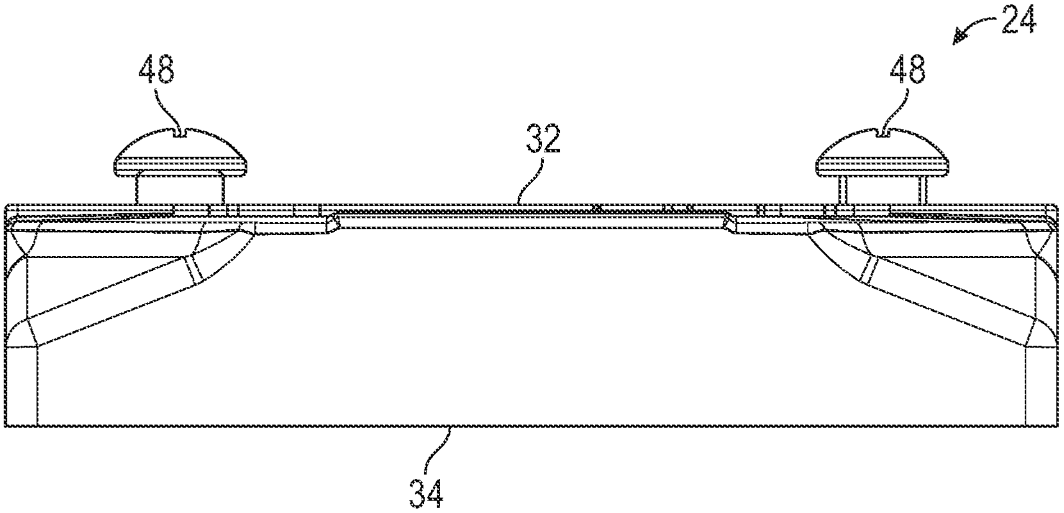
FIG. 15 shows a front elevation view of a guide arm of a rip-cut saw guide system, in accordance with one or more arrangements.
Figure 16:
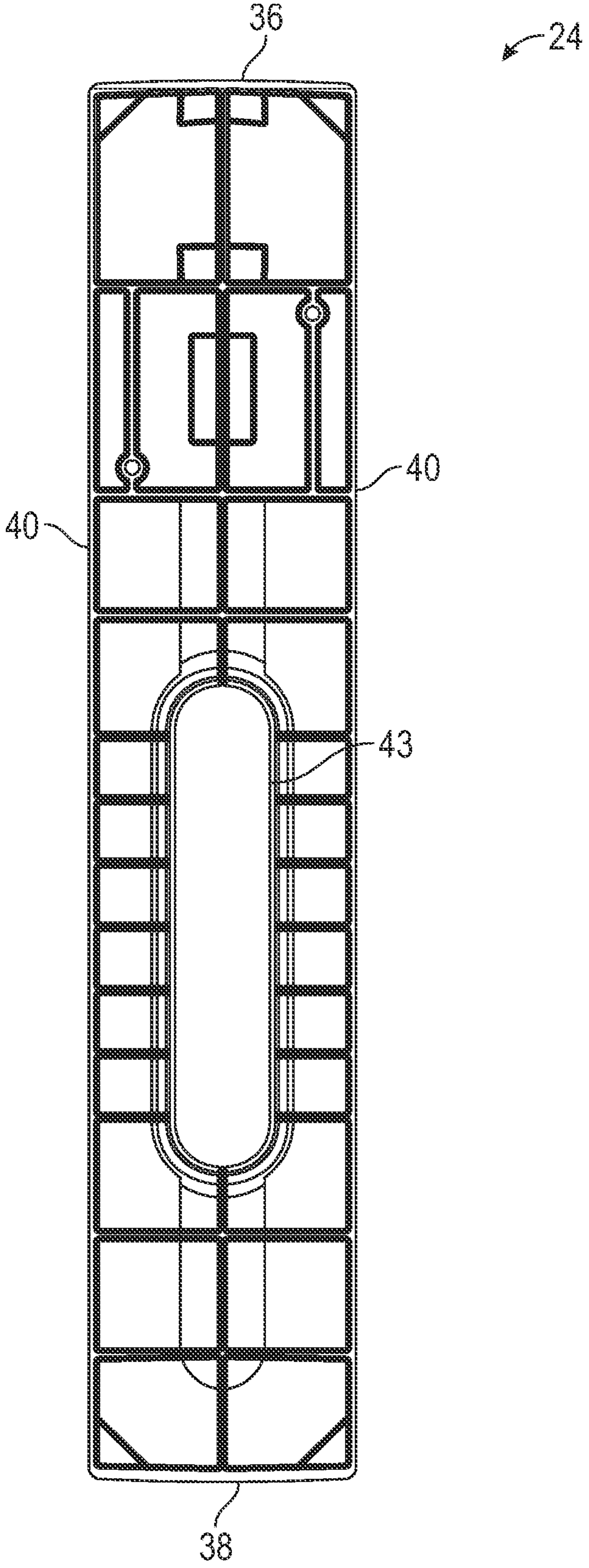
FIG. 16 shows a bottom view of a guide arm of a rip-cut saw guide system, in accordance with one or more arrangements.
Figure 17:
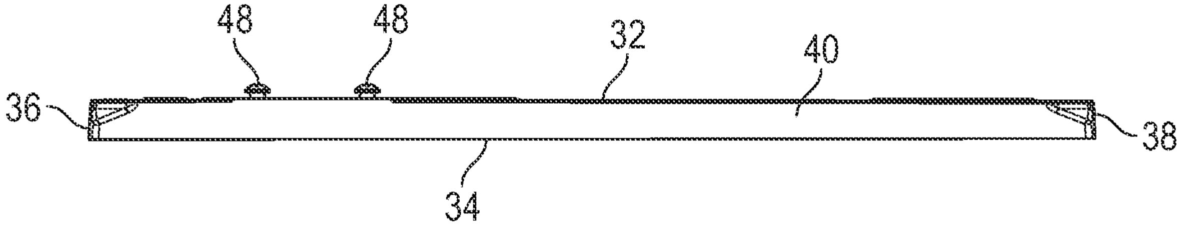
FIG. 17 shows a left side elevation view of a guide arm of a rip-cut saw guide system, in accordance with one or more arrangements.
Figure 18:
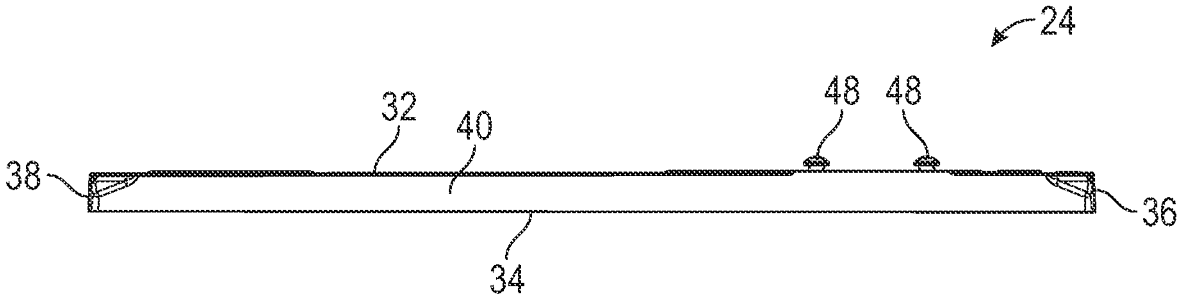
FIG. 18 shows a right side elevation view of a guide arm of a rip-cut saw guide system, in accordance with one or more arrangements.
Figure 19:
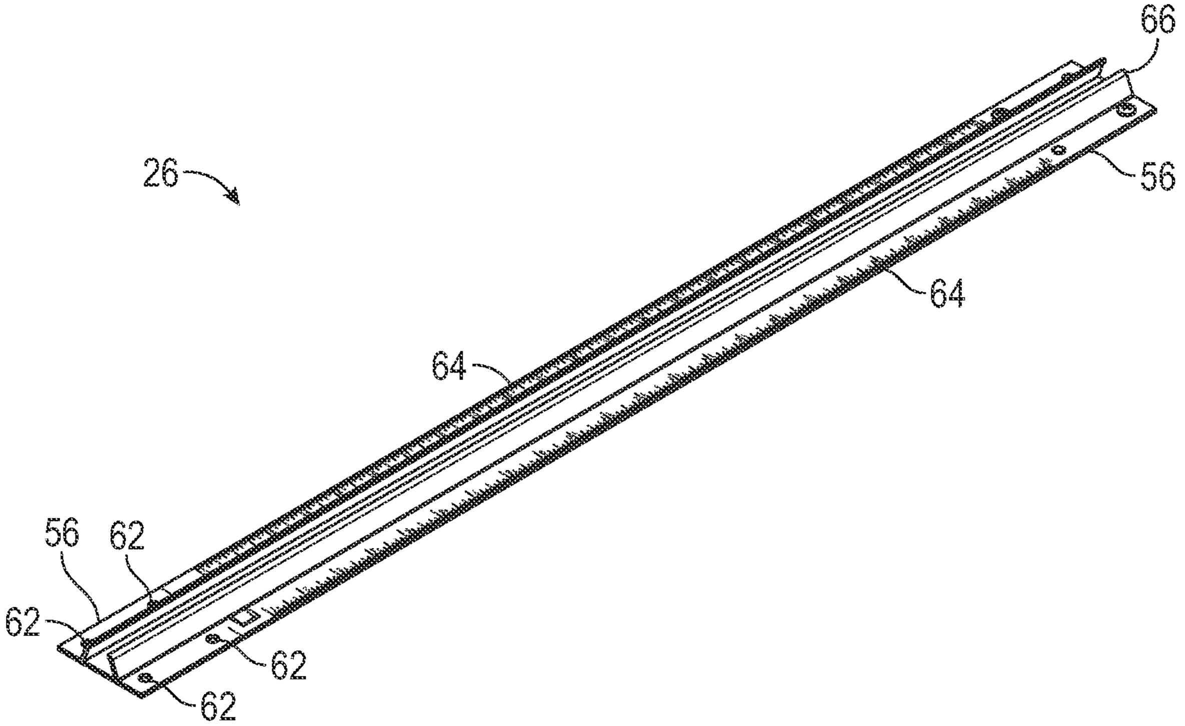
FIG. 19 shows an upper left rear perspective view of a rail of a rip-cut saw guide system with indicia, in accordance with one or more arrangements.
Figure 20:
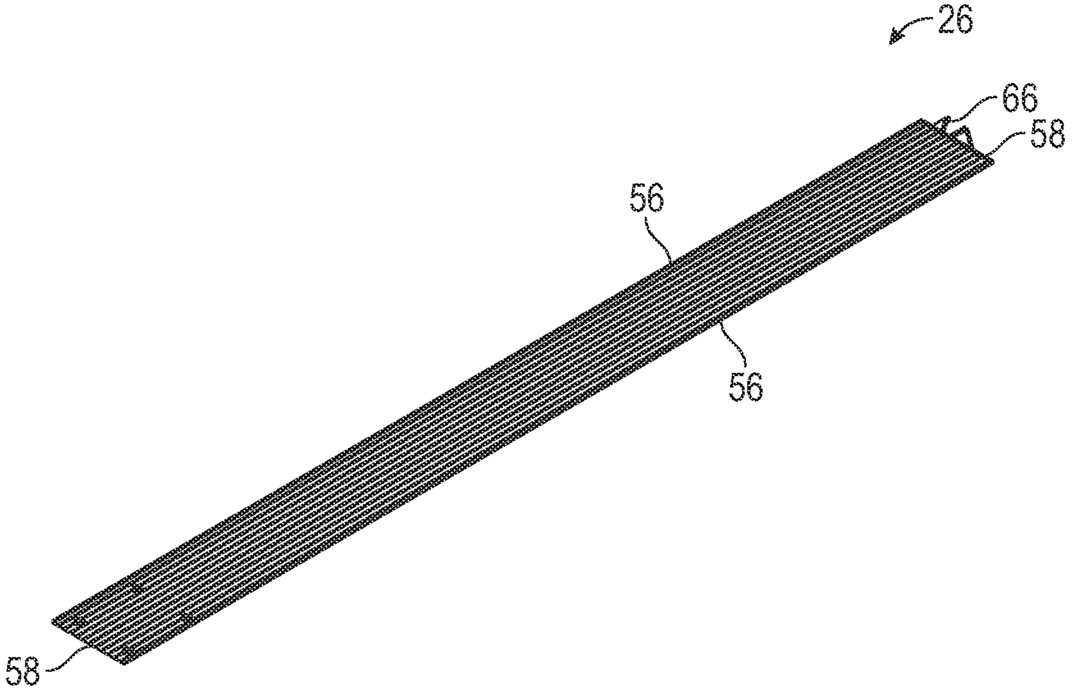
FIG. 20 shows a lower right rear perspective view of a rail of a rip-cut saw guide system, in accordance with one or more arrangements.
Figure 21:
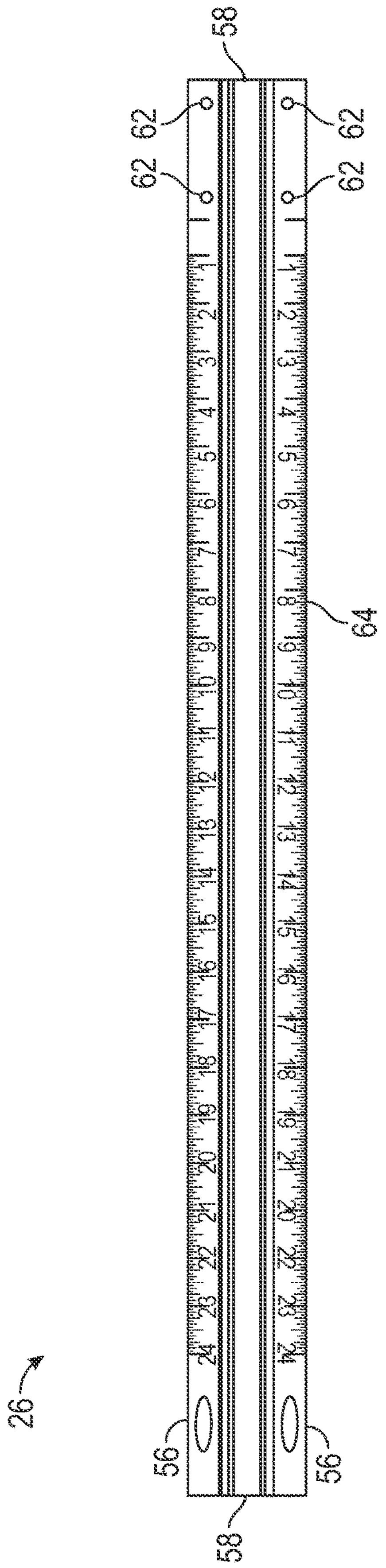
FIG. 21 shows a top plan view of a rail with indicia of a rip-cut saw guide system, in accordance with one or more arrangements.
Figure 22:
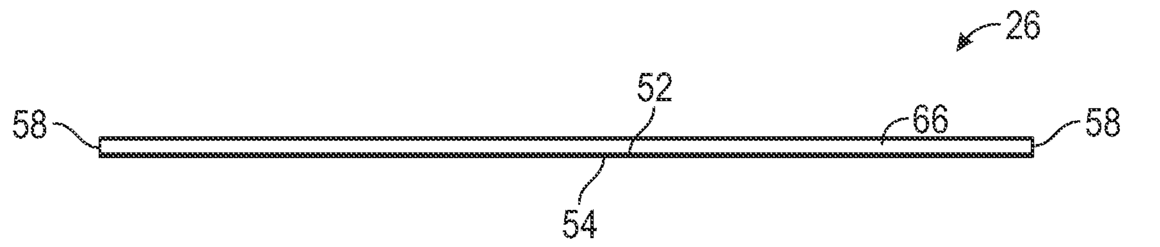
FIG. 22 shows a rear elevation view of a rail of a rip-cut saw guide system, in accordance with one or more arrangements.
Figure 23:
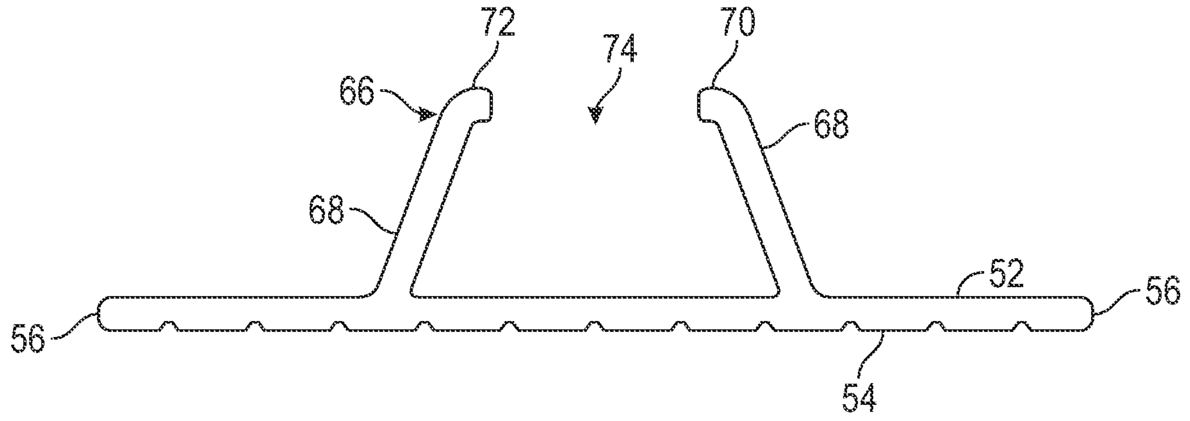
FIG. 23 shows a side view of a rail of a rip-cut saw guide system, in accordance with one or more arrangements.
Figure 24:
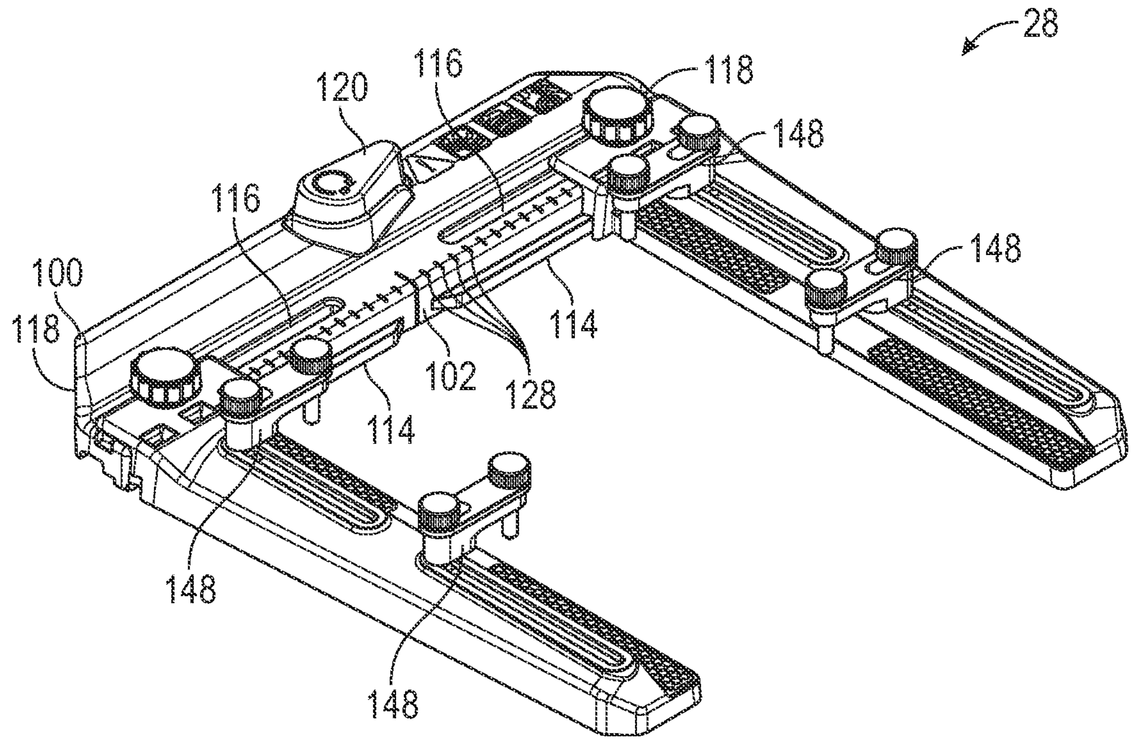
FIG. 24 shows an upper left rear perspective view of a sled of a rip-cut saw guide system, in accordance with one or more arrangements.
Figure 25:
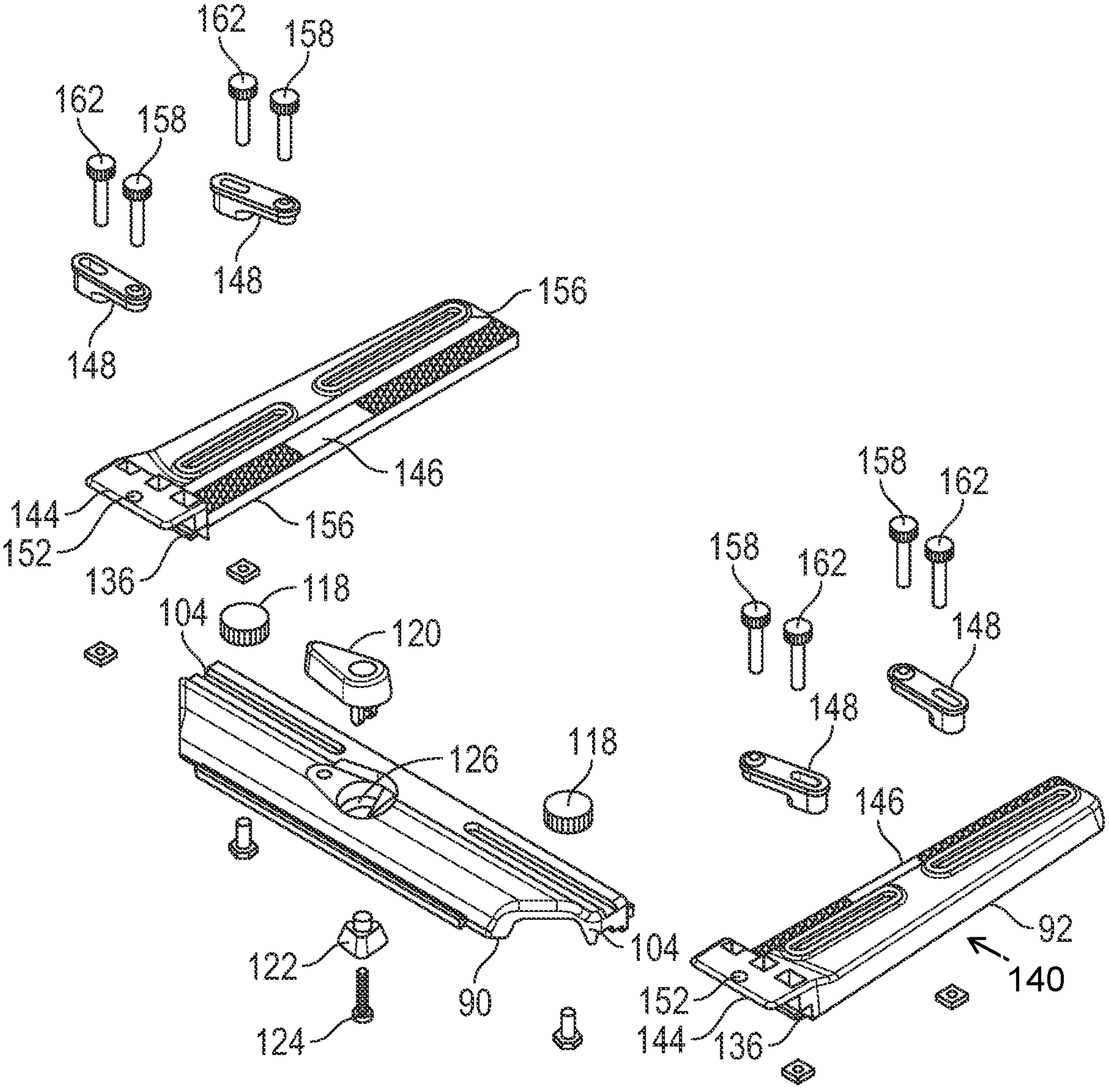
FIG. 25 shows an upper left front perspective exploded view of a sled of a rip-cut saw guide system, detailing the individual parts and connectors of the sled in accordance with one or more arrangements.
Figure 26:
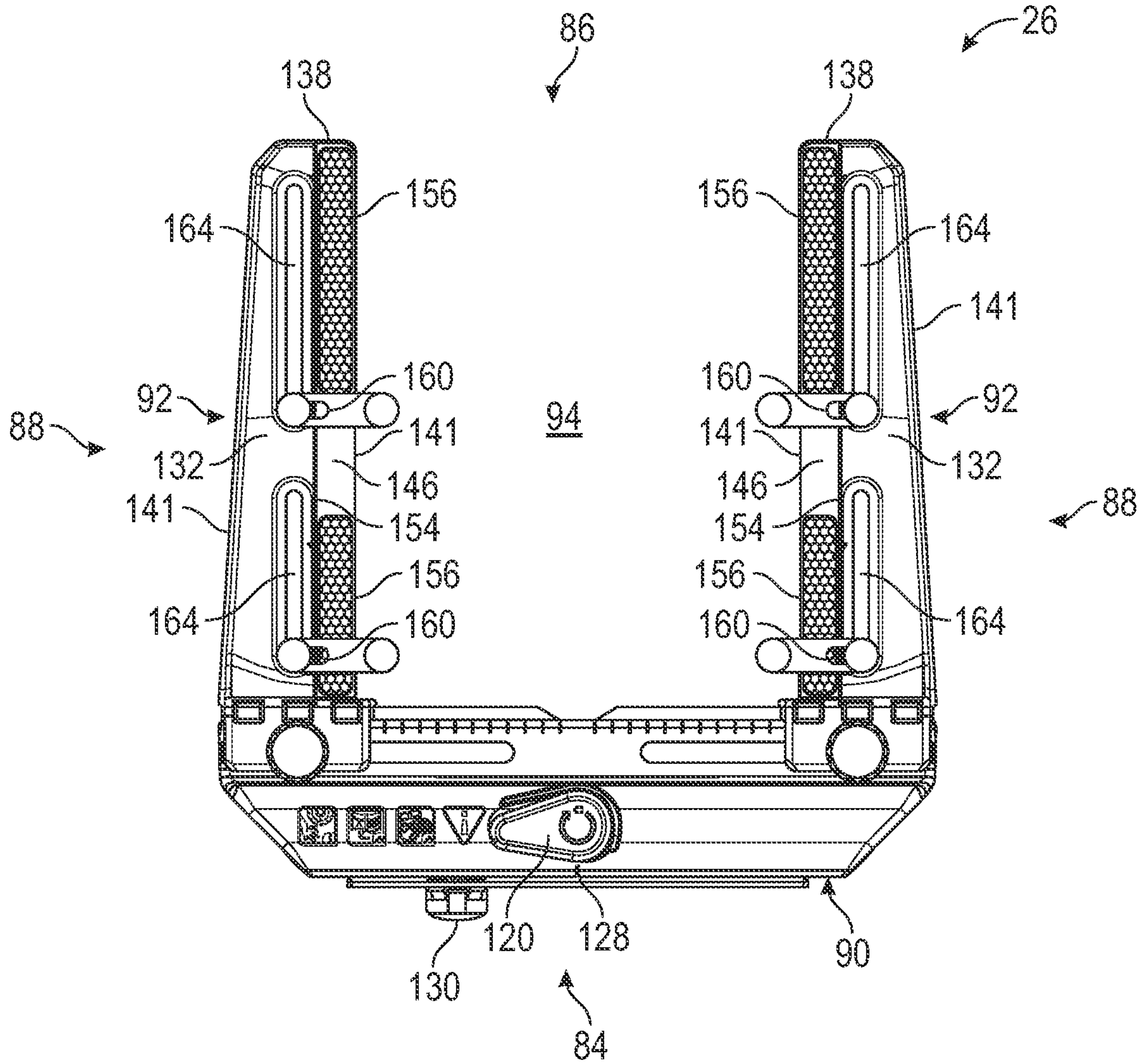
FIG. 26 shows a top plan view of a sled of a rip-cut saw guide system, in accordance with one or more arrangements.
Figure 27:
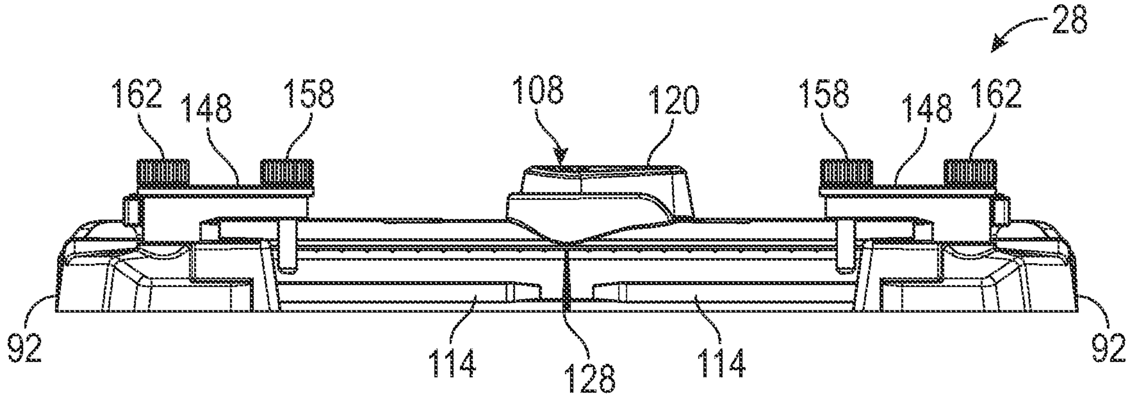
FIG. 27 shows a rear elevation view of a sled of a rip-cut saw guide system, in accordance with one or more arrangements.
Figure 28:
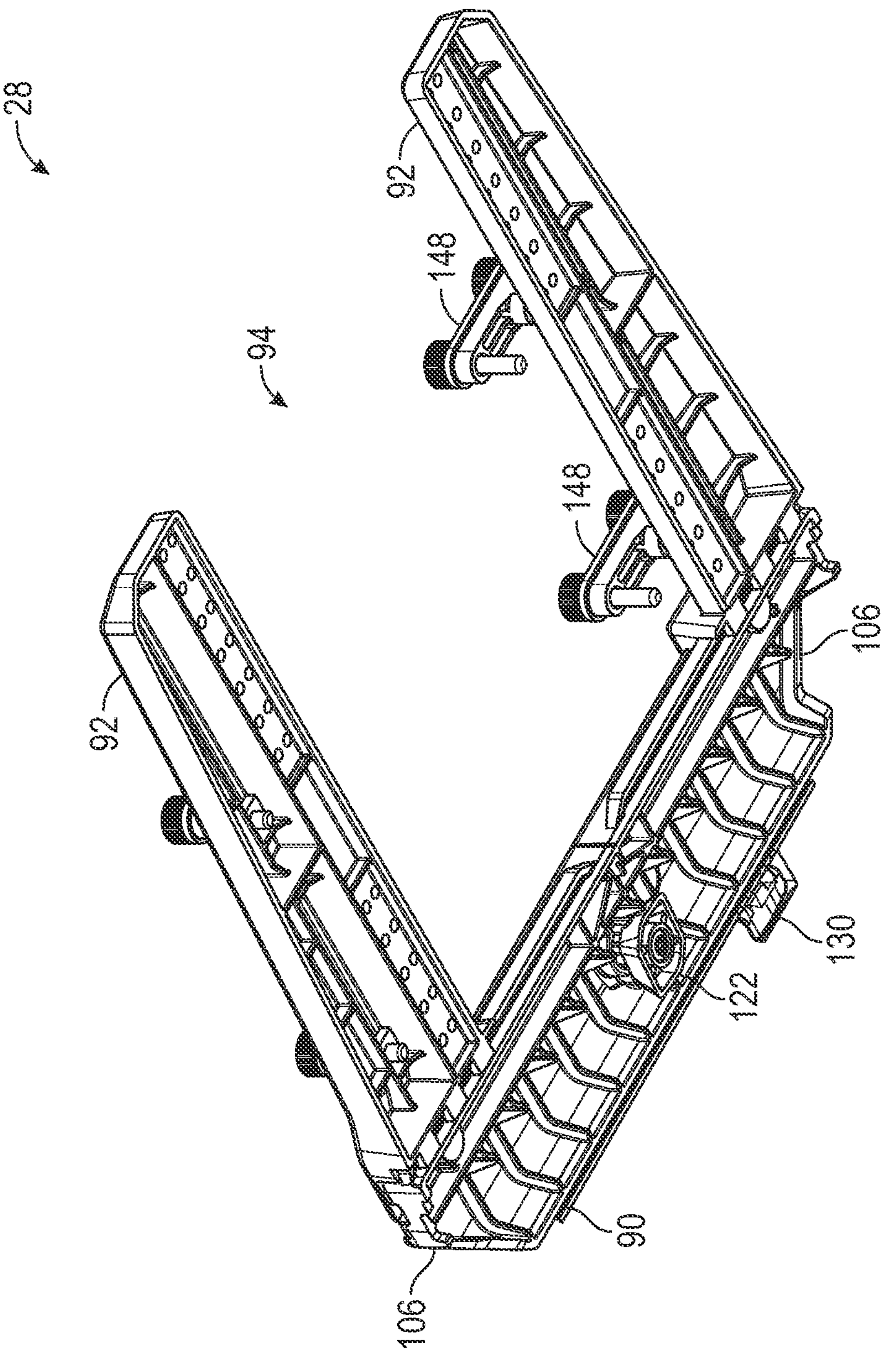
FIG. 28 shows a lower left rear perspective view of a sled of a rip-cut saw guide system, in accordance with one or more arrangements.
Figure 29:
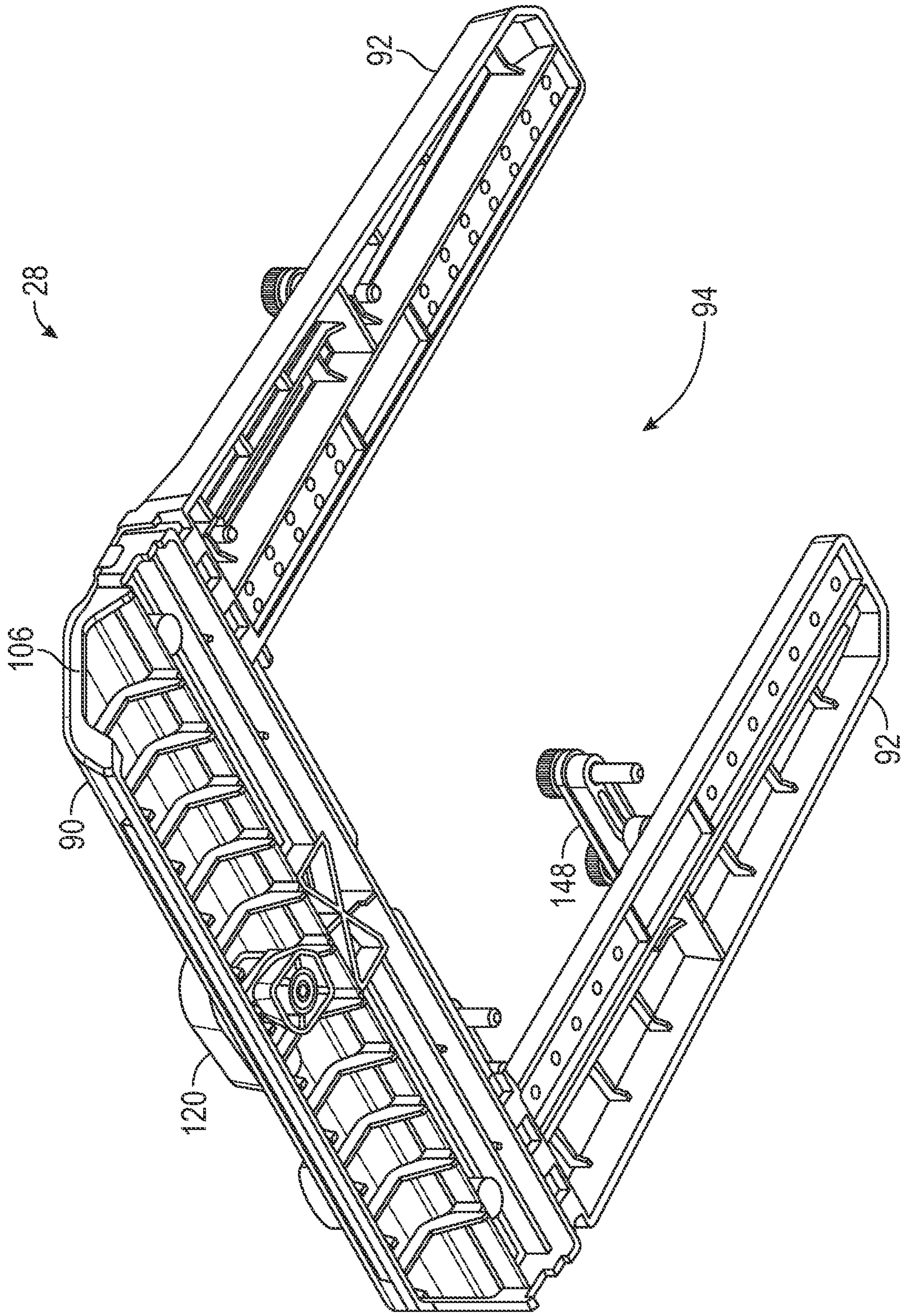
FIG. 29 shows a lower left front perspective view of a sled of a rip-cut saw guide system, in accordance with one or more arrangements.
Figure 30:
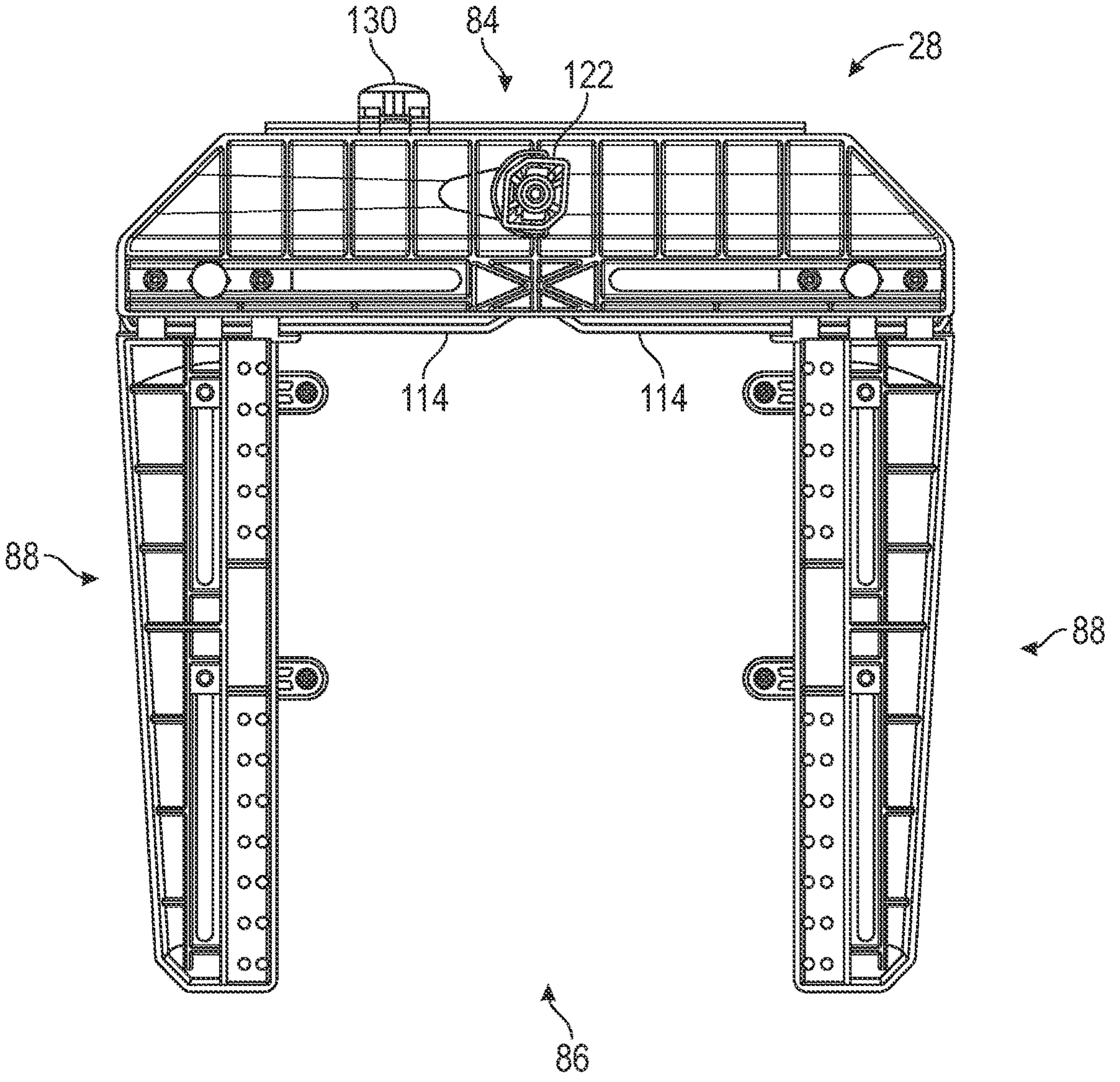
FIG. 30 shows a bottom view of a sled of a rip-cut saw guide system, in accordance with one or more arrangements.
Figure 31:
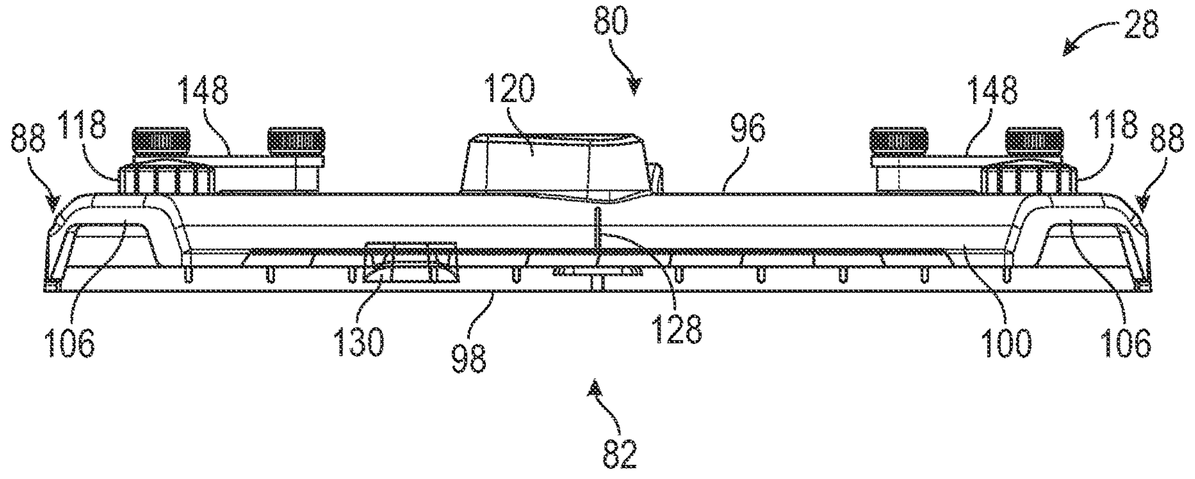
FIG. 31 shows a front elevation view of a sled of a rip-cut saw guide system, in accordance with one or more arrangements.
Figure 32:
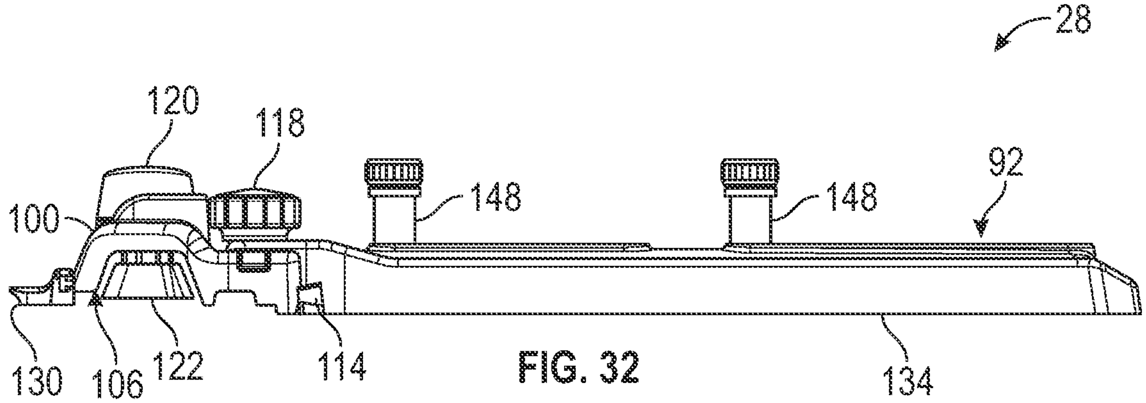
FIG. 32 shows a left side elevation view of a sled of a rip-cut saw guide system, in accordance with one or more arrangements.
Figure 33:
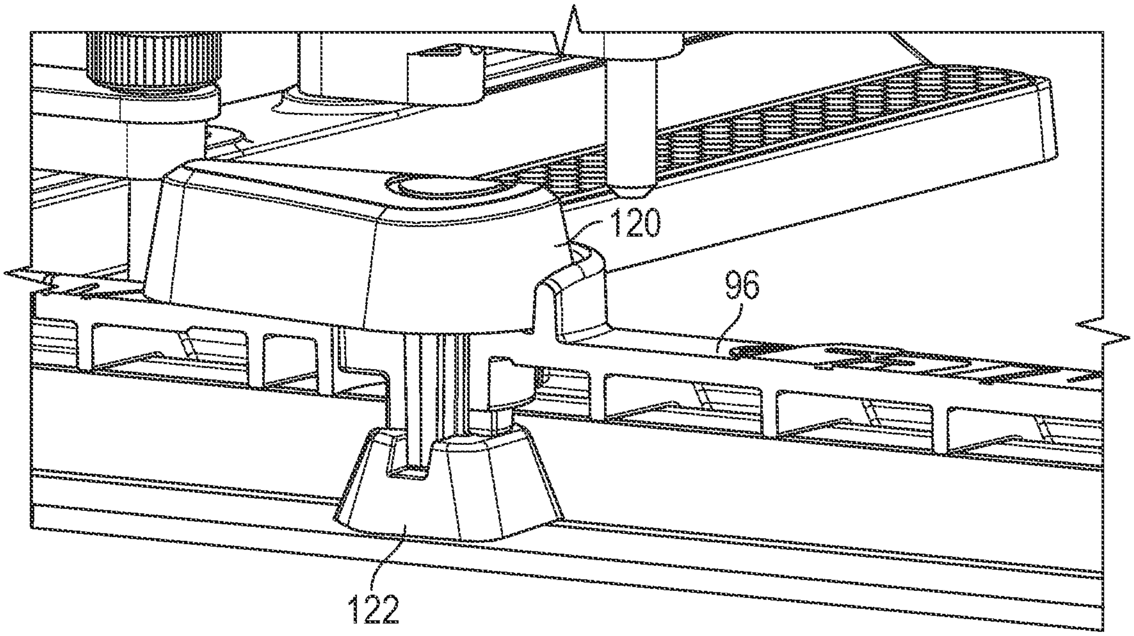
FIG. 33 shows a front left cutaway view of the front of a sled of a rip-cut saw guide system in accordance with one or more arrangements, the view showing a locking selector and wedge of a locking member of the sled.
Figure 34:
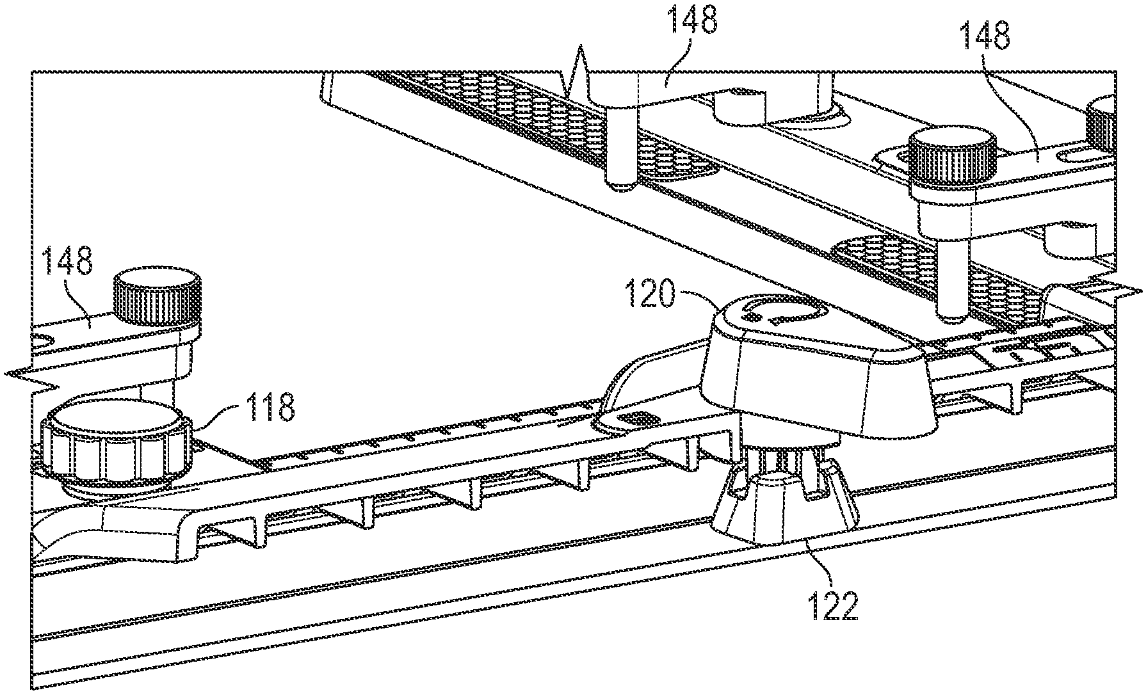
FIG. 34 shows a front right cutaway view of the front of a sled of a rip-cut saw guide system in accordance with one or more arrangements, the view showing a locking selector and wedge of a locking member and the insert fasteners and attachment members of the sled.
Figure 35:
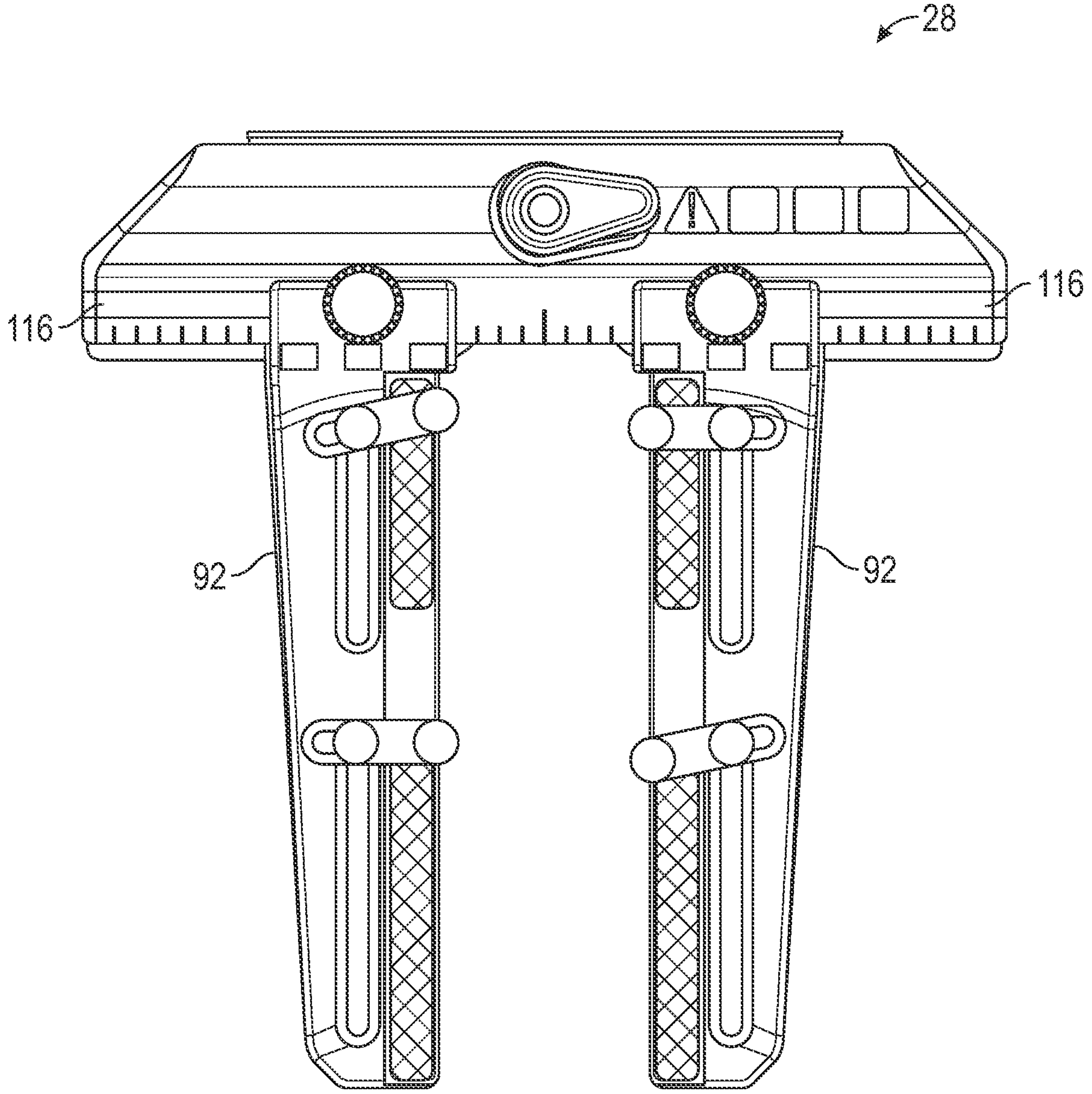
FIG. 35 is a top view of a sled of a rip-cut saw guide system in accordance with one or more arrangements, the view showing side members attached inboard from the ends of front member to accommodate more narrow cutting members.
Figure 36:
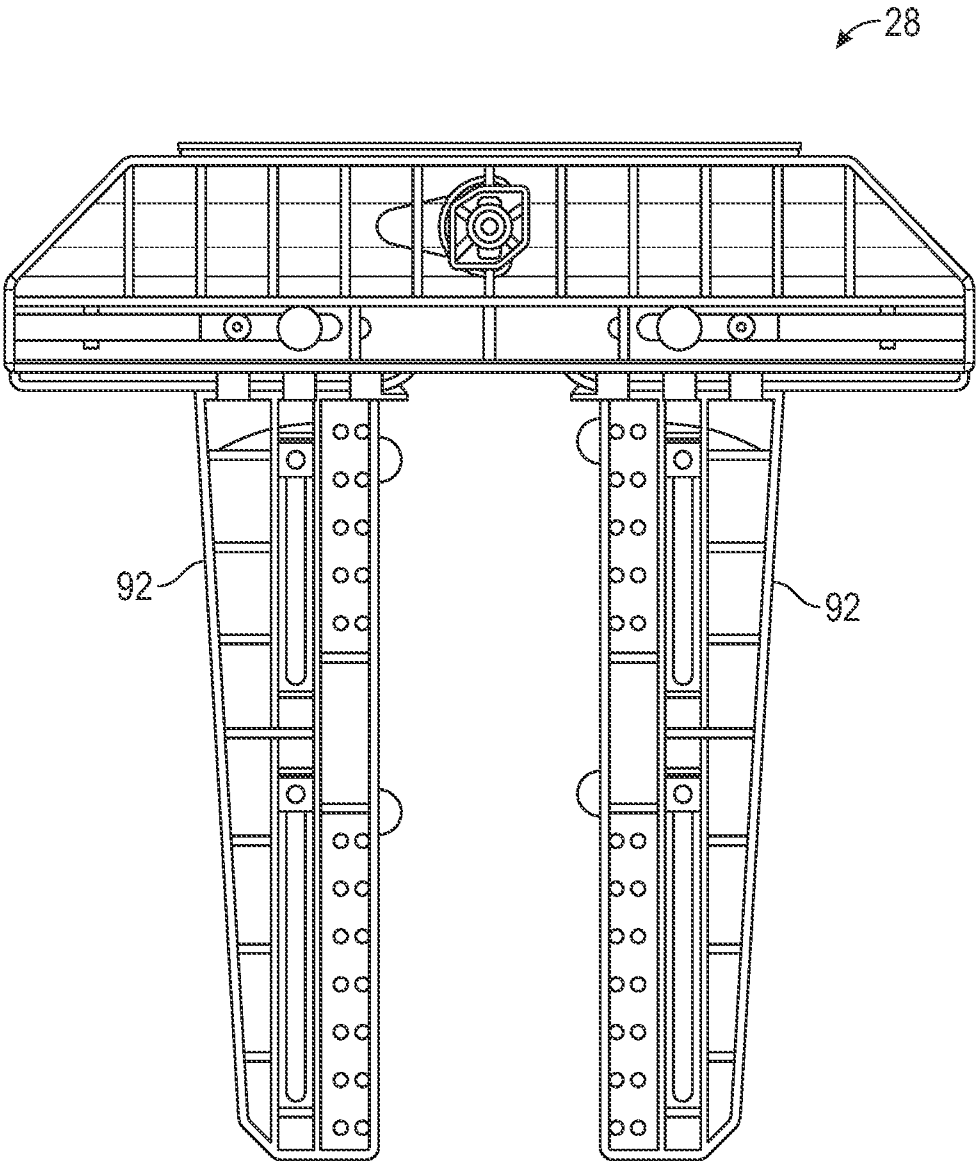
FIG. 36 is a bottom view of a sled of a rip-cut saw guide system in accordance with one or more arrangements, the view showing side members attached inboard from the ends of front member to accommodate more narrow cutting members.
Figure 37:
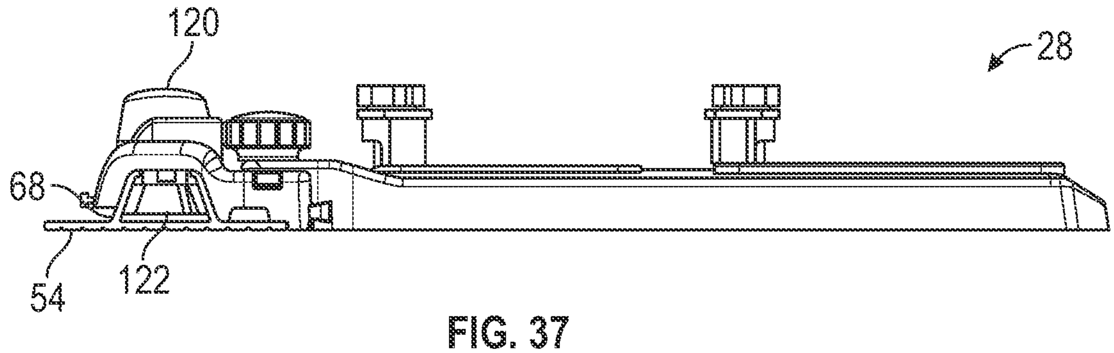
FIG. 37 is a left side view of a sled and rail of a rip-cut saw guide system in accordance with one or more arrangements, the view showing the locking member of the sled in a locked position within the feature of the rail.
Figure 38:
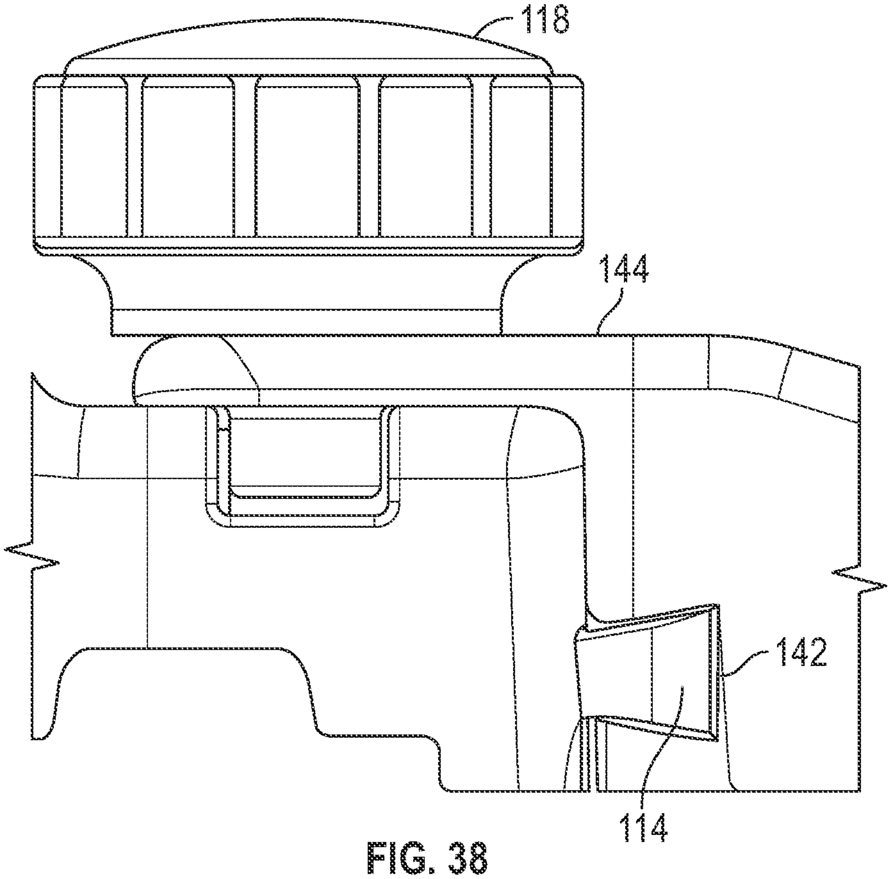
FIG. 38 is a left side view of the front member and one side member of a sled of a rip-cut saw guide system in accordance with one or more arrangements, the view showing the slidable connection between a protrusion on the front member and a recess on the side member and the fastener holding the side member securely to the front member.
Figure 39:
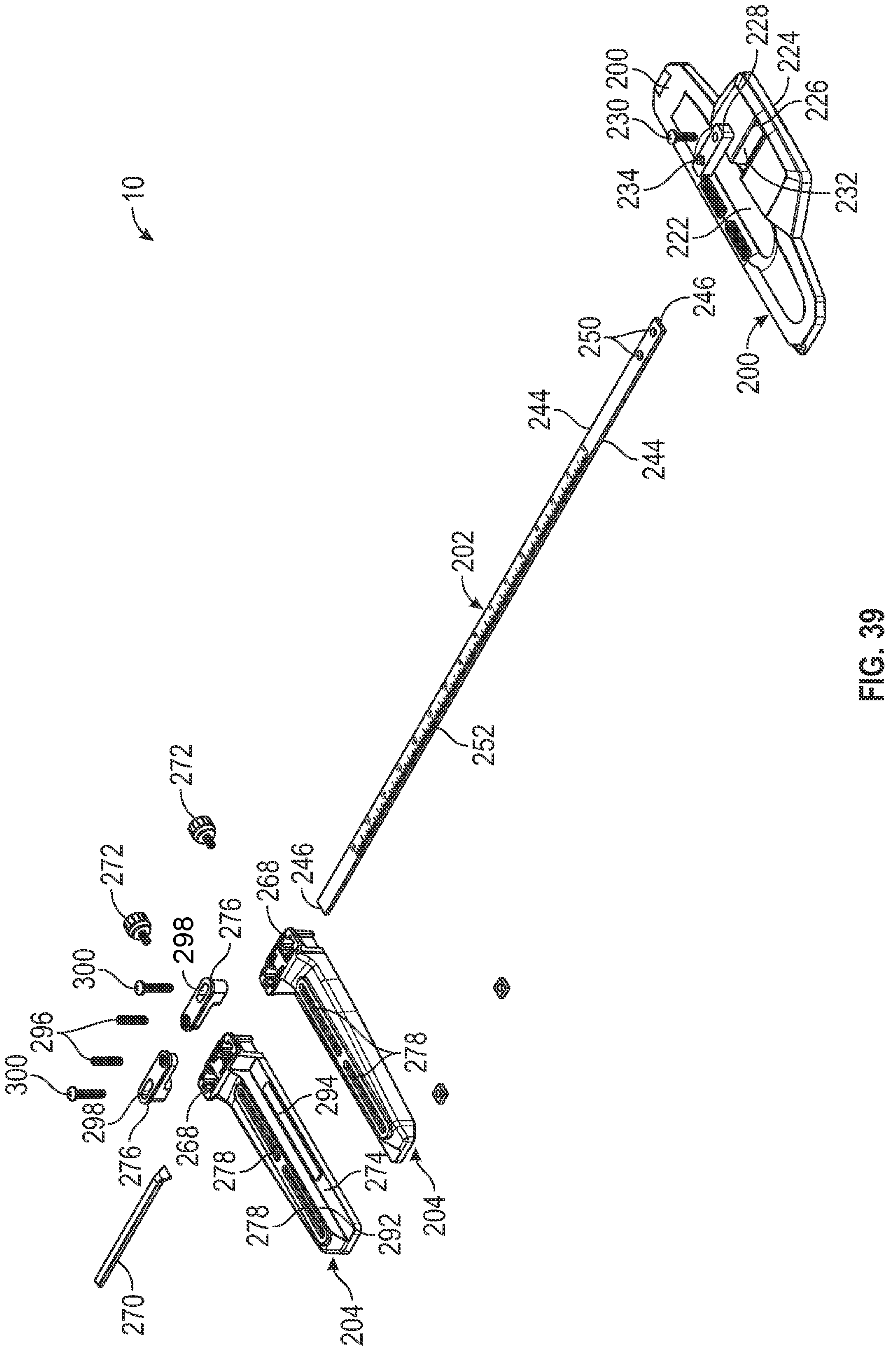
FIG. 39 is an upper right rear exploded view of a rip-cut saw guide system, according to one or more arrangements, the arrangement showing an embodiment with a guide arm on the right side and a sled not including a front member.
Figure 40:
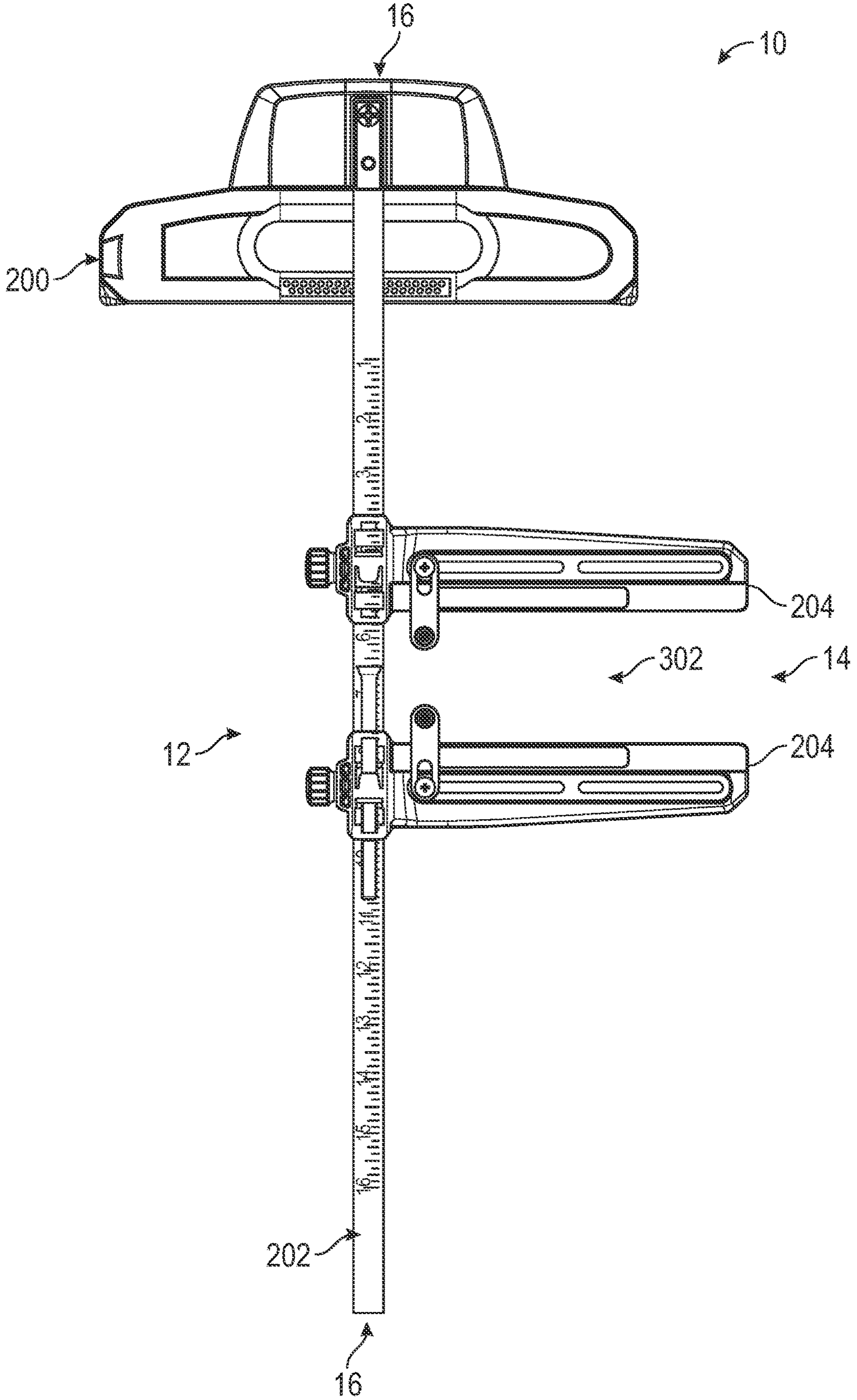
FIG. 40 is a top plan view of a rip-cut saw guide system, according to one or more arrangements.
Figure 41:
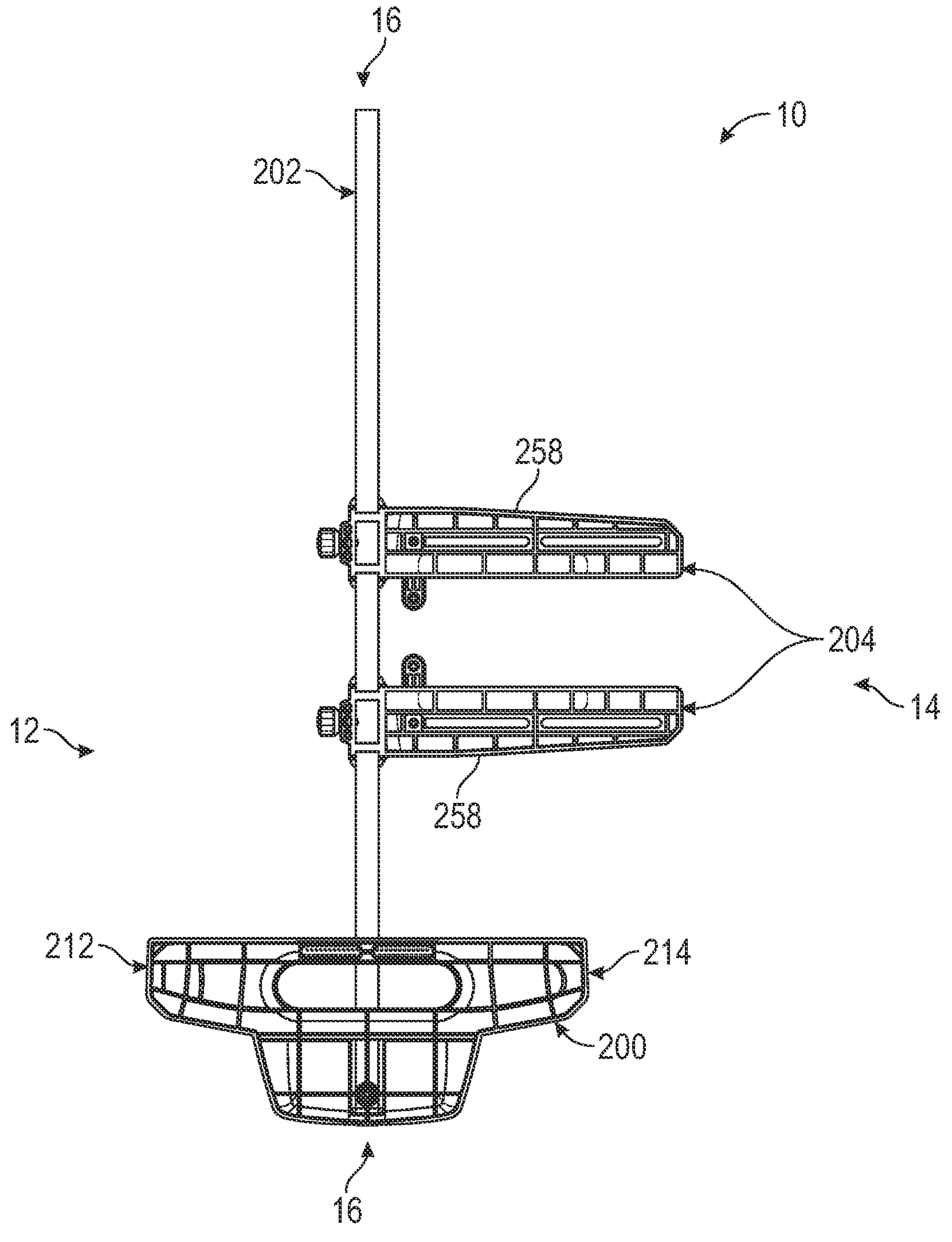
FIG. 41 is a bottom view of a rip-cut saw guide system, according to one or more arrangements.
Figure 42:
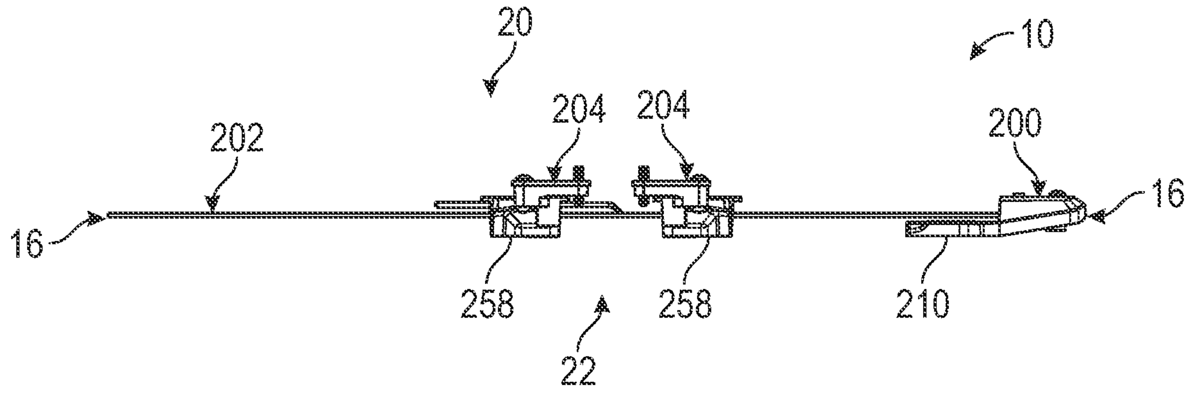
FIG. 42 is a rear elevation view of a rip-cut saw guide system, according to one or more arrangements.
Figure 43:
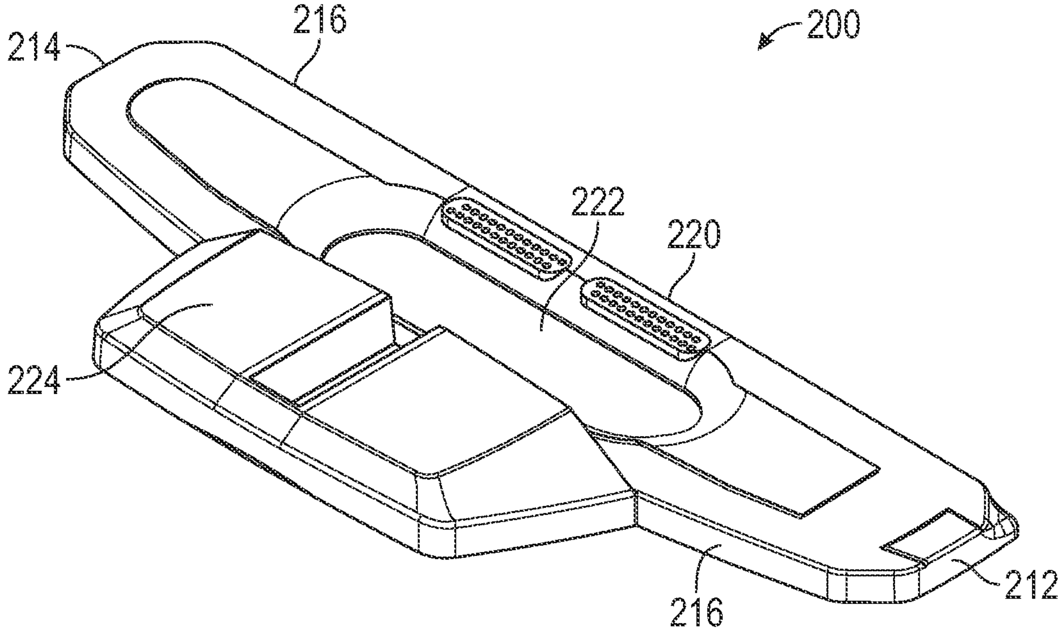
FIG. 43 is an upper right front perspective view of a guide arm of a rip-cut saw guide system, according to one or more arrangements.
Figure 44:
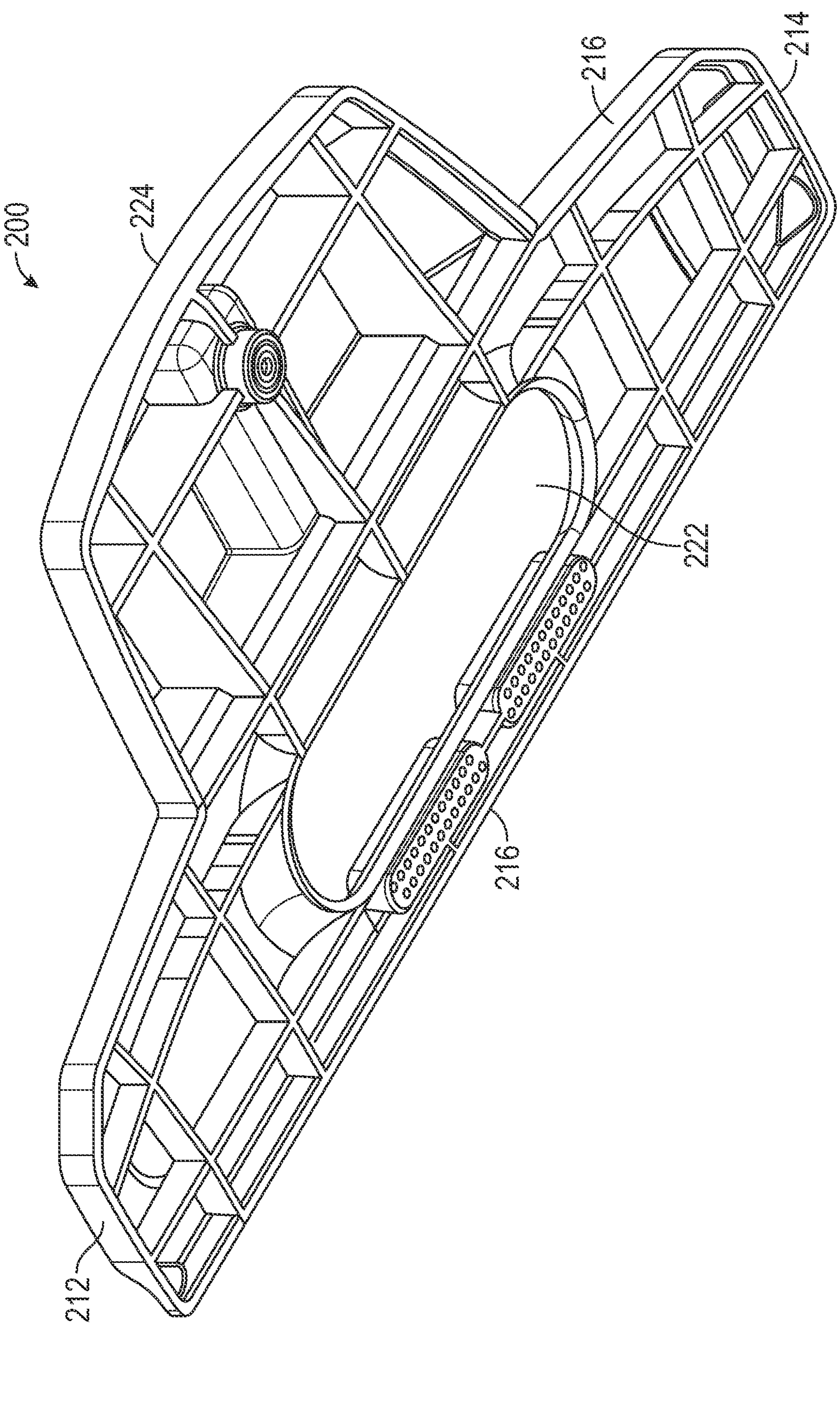
FIG. 44 is a lower right rear perspective view of a guide arm of a rip-cut saw guide system, according to one or more arrangements.
Figure 45:
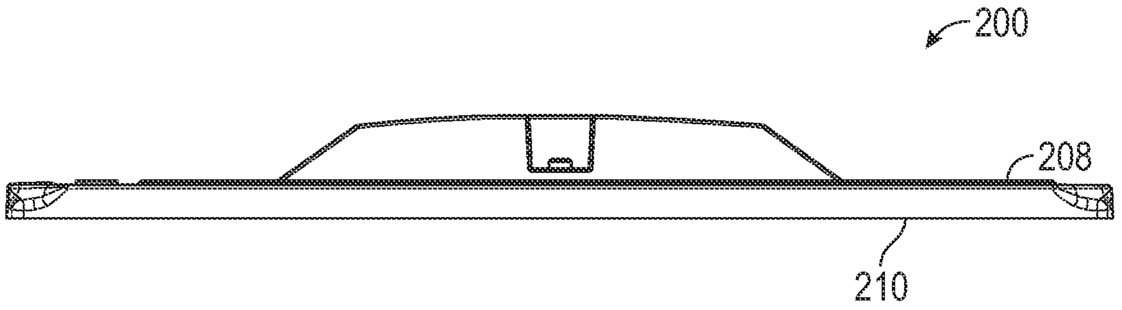
FIG. 45 is a left side elevation view of a guide arm of a rip-cut saw guide system, according to one or more arrangements.
Figure 46:
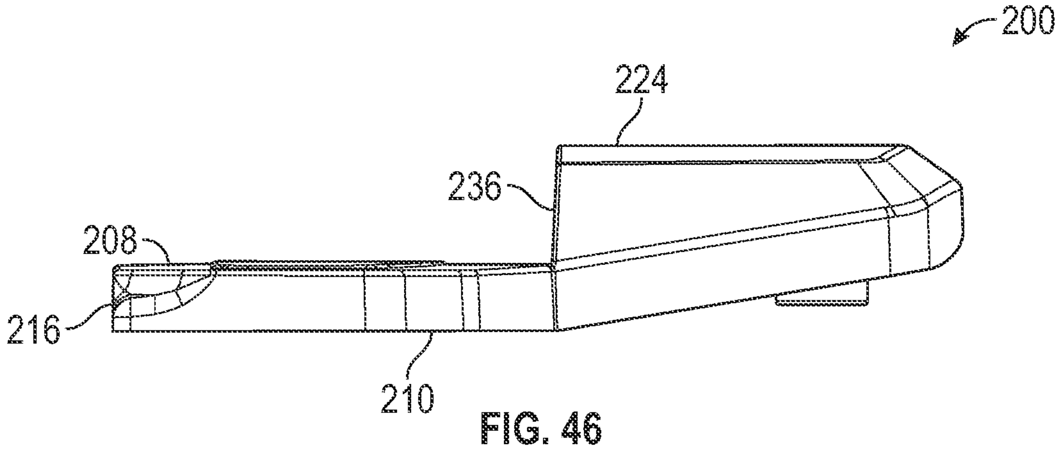
FIG. 46 is a rear elevation view of a guide arm of a rip-cut saw guide system, according to one or more arrangements.
Figure 47:
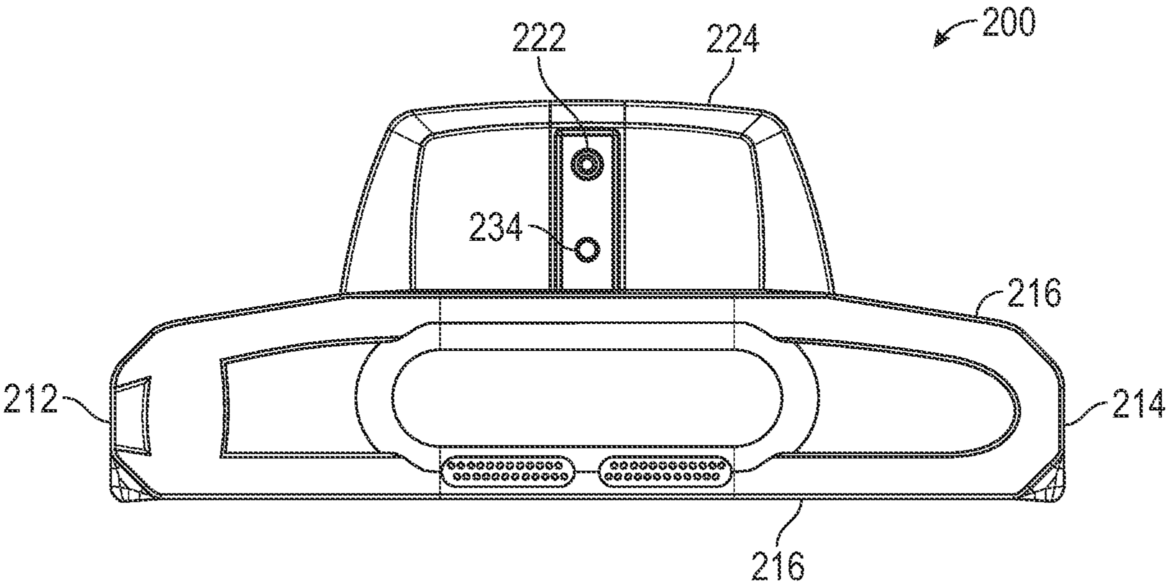
FIG. 47 is a top plan view of a guide arm of a rip-cut saw guide system, according to one or more arrangements.
Figure 48:
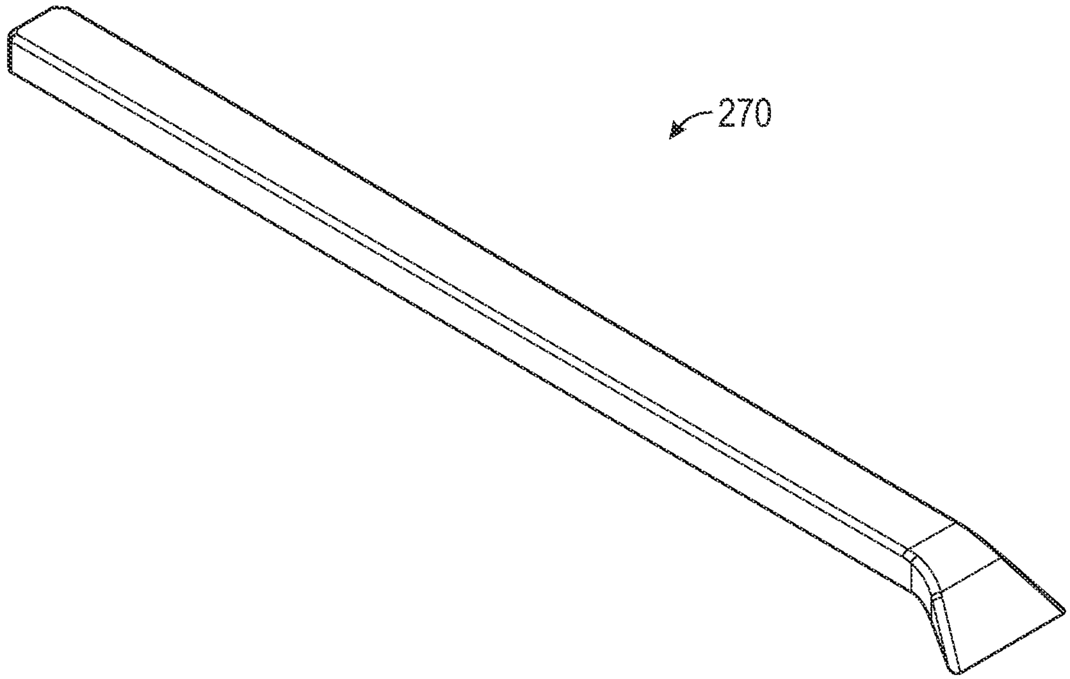
FIG. 48 is an upper right rear perspective view of a guide cursor of a rip-cut saw guide system, according to one or more arrangements.
Figure 49:
FIG. 49 is a rear elevation view of a guide cursor of a rip-cut saw guide system, according to one or more arrangements.
Figure 50:
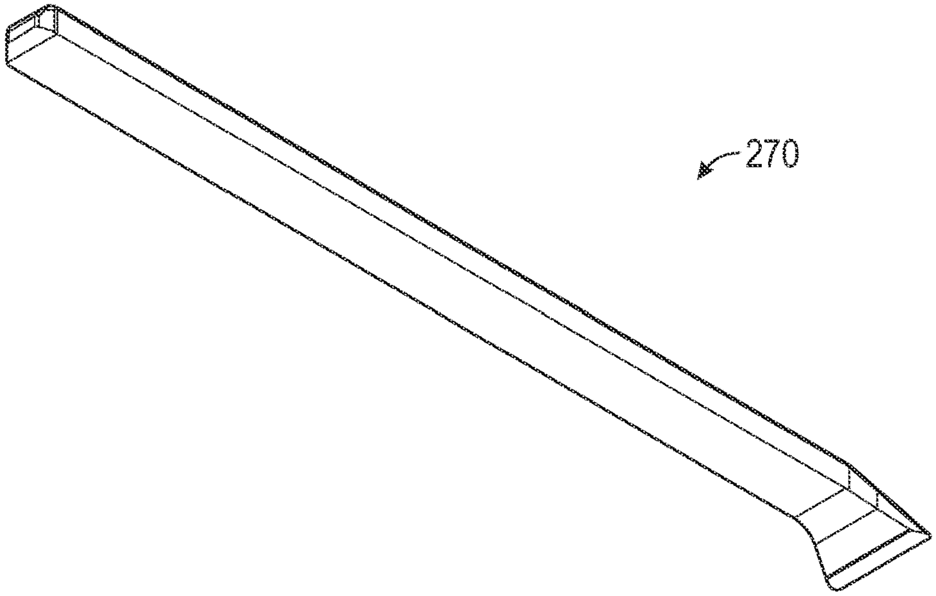
FIG. 50 is a lower left rear perspective view of a guide cursor of a rip-cut saw guide system, according to one or more arrangements.
Figure 51:
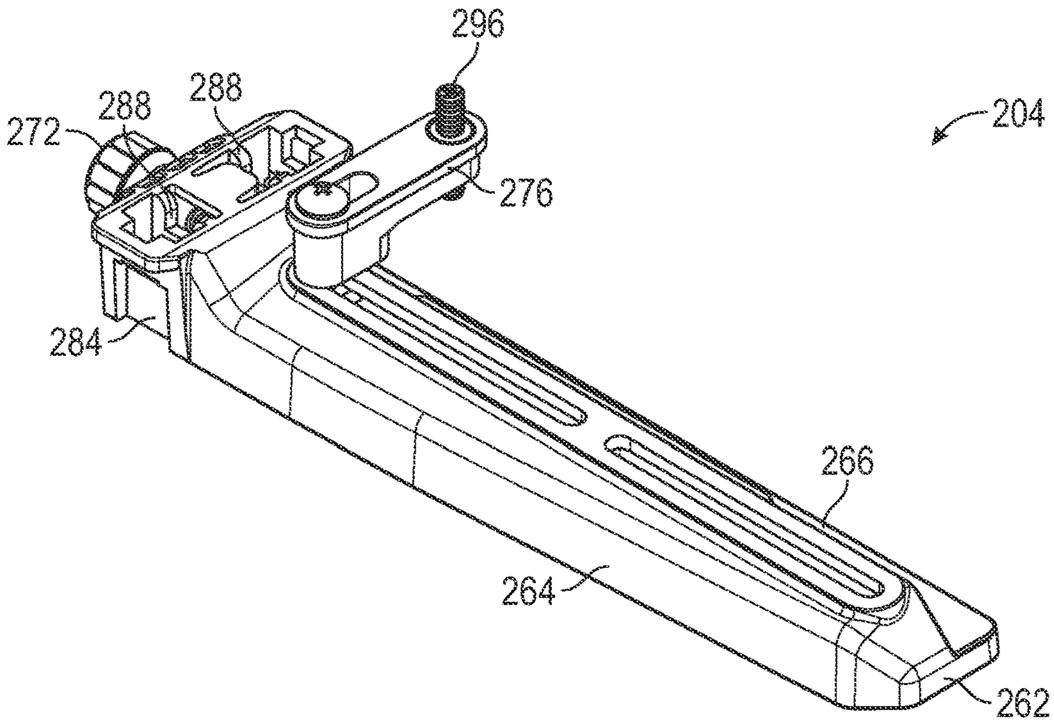
FIG. 51 is an upper left rear perspective view of a left side member of a sled of a rip-cut saw guide system, according to one or more arrangements.
Figure 52:
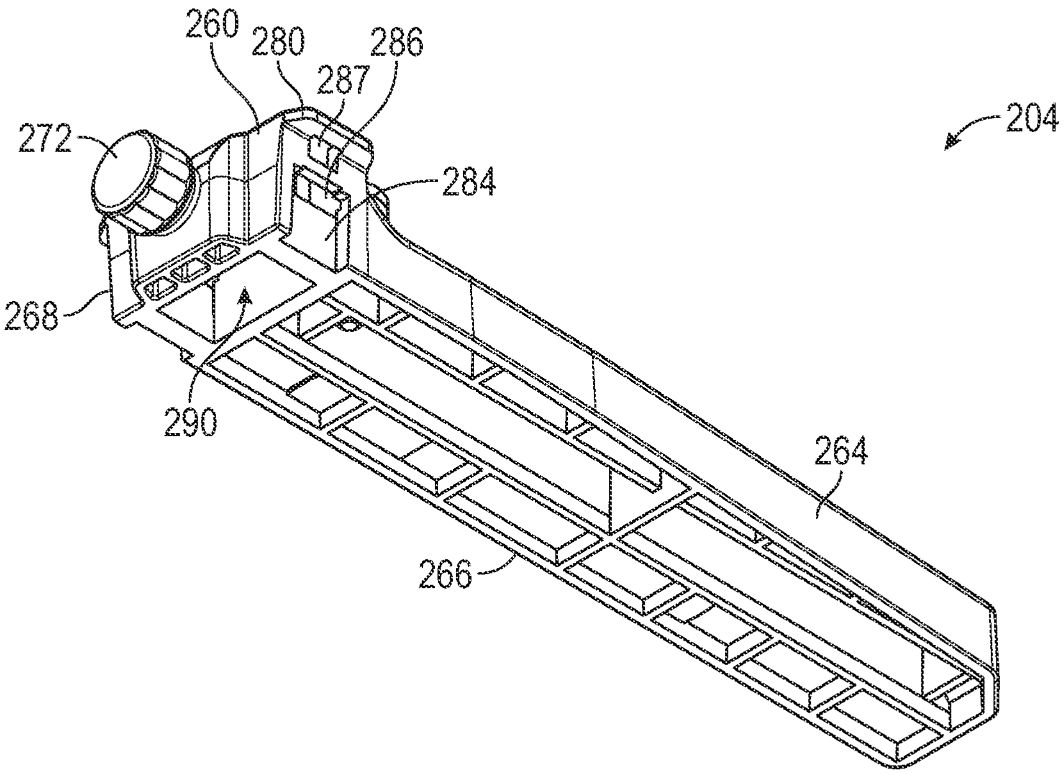
FIG. 52 is a lower left front perspective view of a left side member of a sled of a rip-cut saw guide system, according to one or more arrangements.
Figure 53:
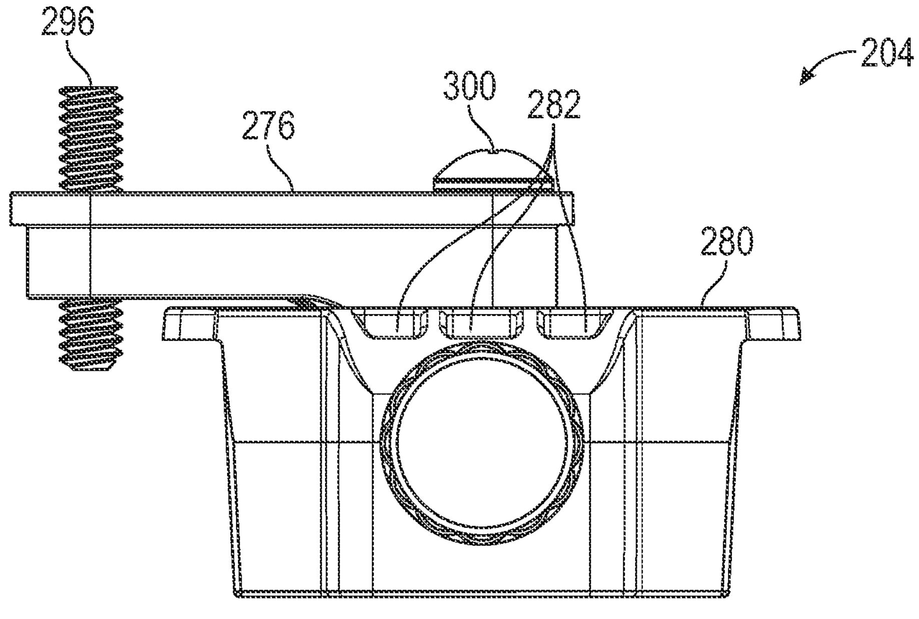
FIG. 53 is a front elevation view of a left side member of a sled of a rip-cut saw guide system, according to one or more arrangements.
Figure 54:
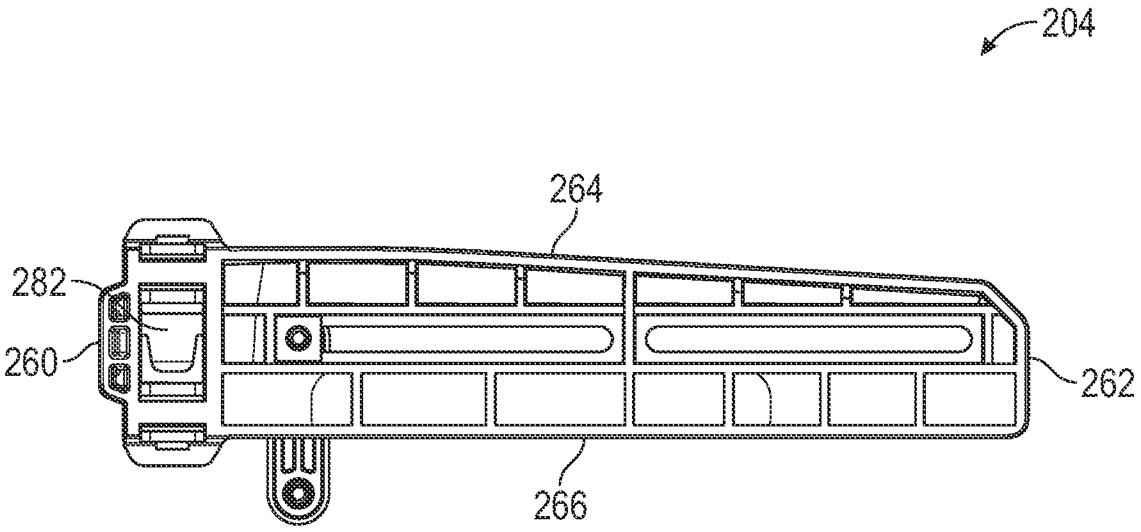
FIG. 54 is a bottom view of a left side member of a sled of a rip-cut saw guide system, according to one or more arrangements.
Figure 55:
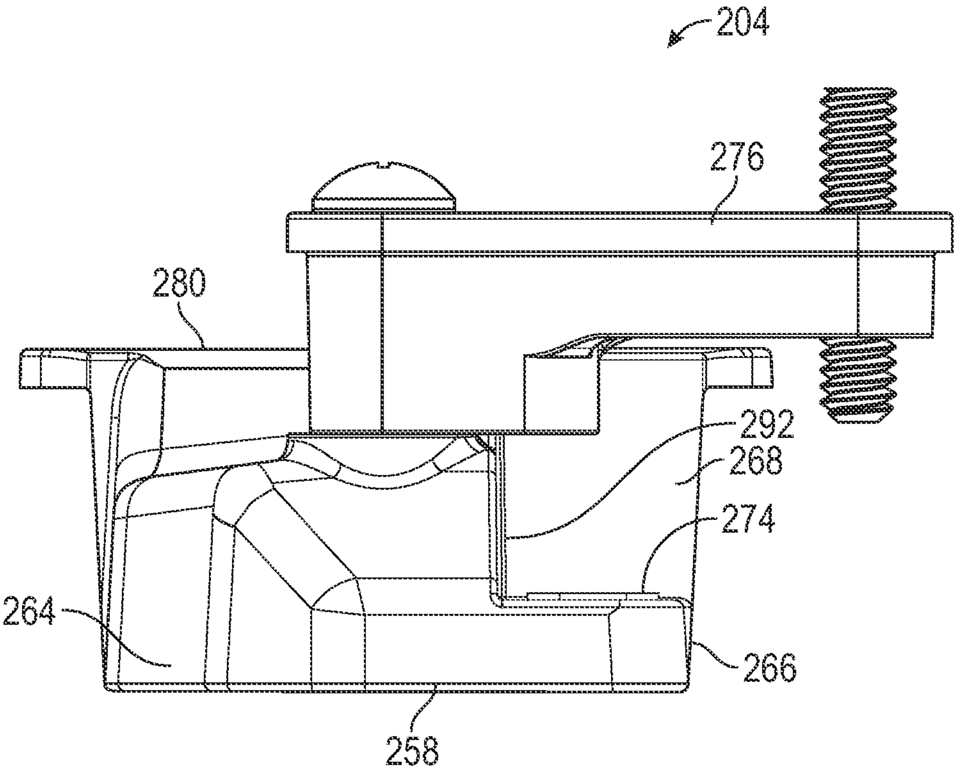
FIG. 55 is a rear elevation view of a left side member of a sled of a rip-cut saw guide system, according to one or more arrangements.
Figure 56:
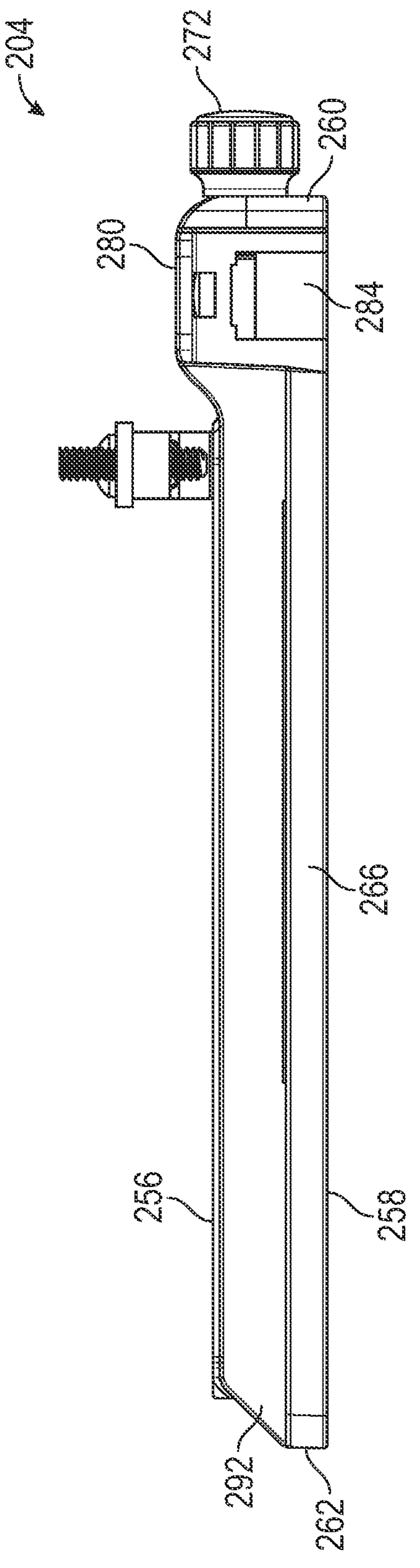
FIG. 56 is a right side elevation view of a left side member of a sled of a rip-cut saw guide system, according to one or more arrangements.
Figure 57:
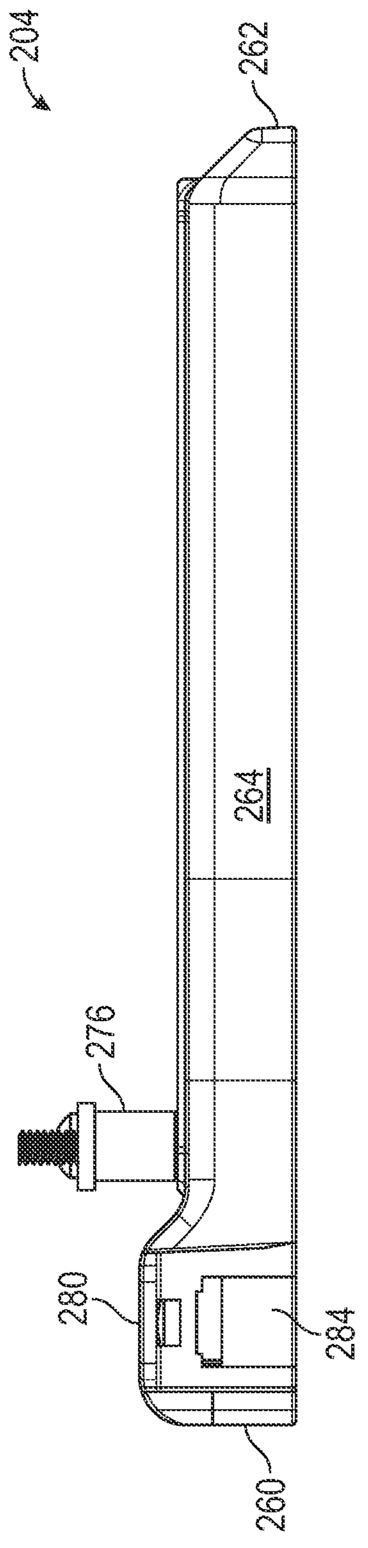
FIG. 57 is a left side elevation view of a left side member of a sled of a rip-cut saw guide system, according to one or more arrangements.
Figure 58:
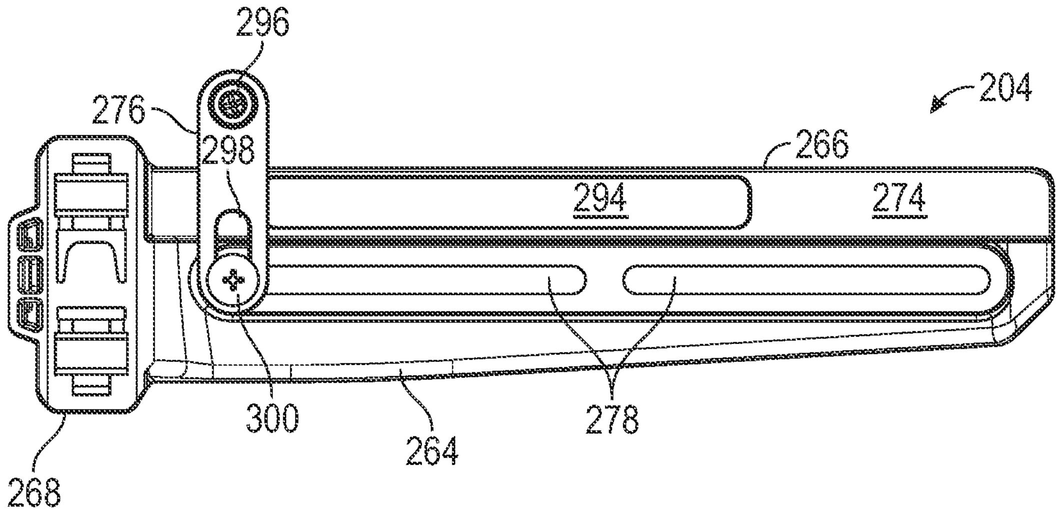
FIG. 58 is a top plan view of a left side member of a sled of a rip-cut saw guide system, according to one or more arrangements.
Figure 59:
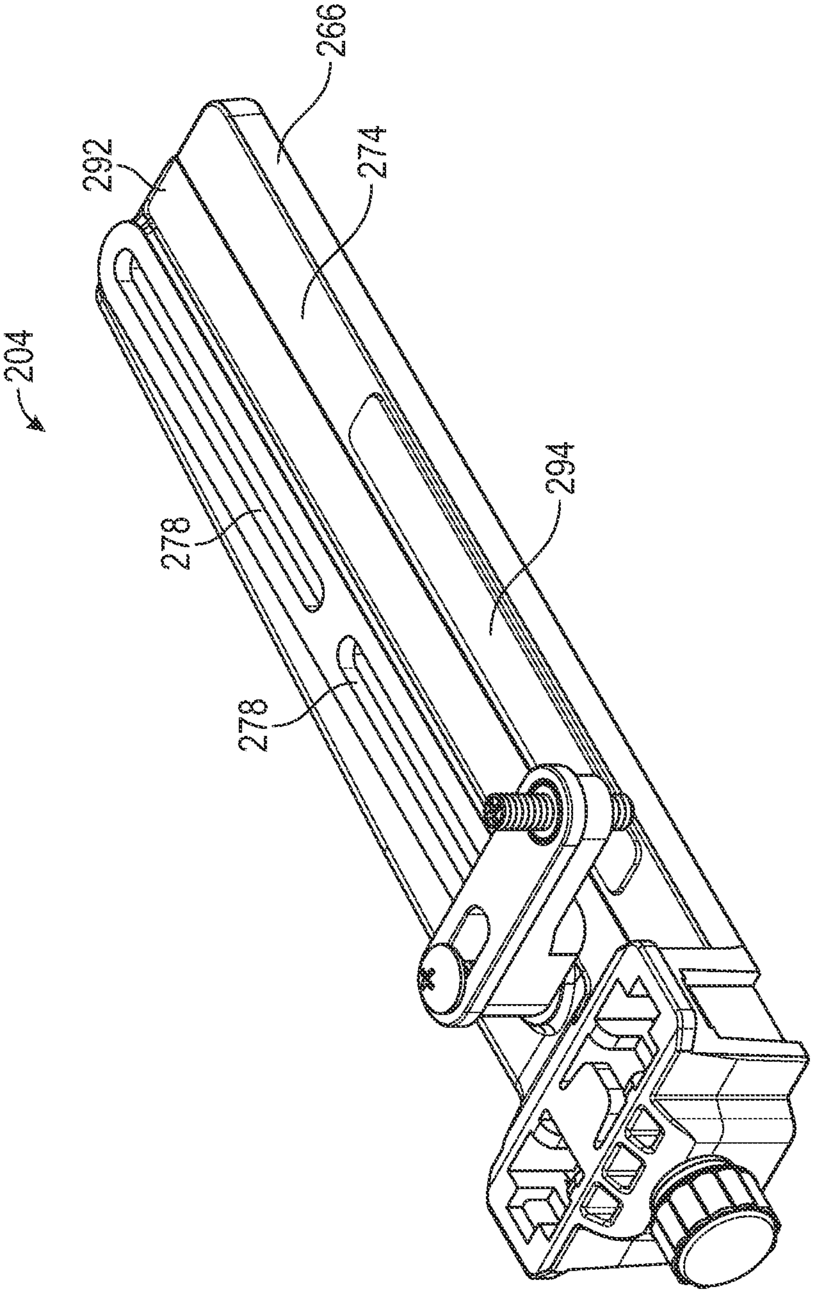
FIG. 59 is an upper left front view of a right side member of a sled of a rip-cut saw guide system, according to one or more arrangements.
Figure 60:
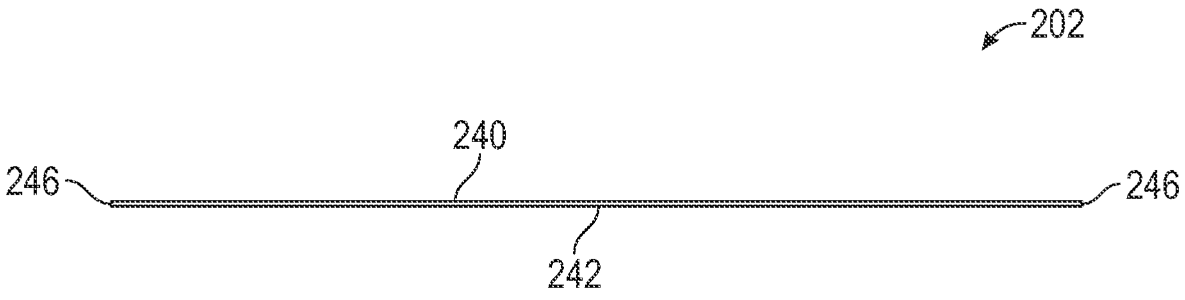
FIG. 60 is a rear elevation view of a rail of a rip-cut saw guide system, according to one or more arrangements.
Figure 61:
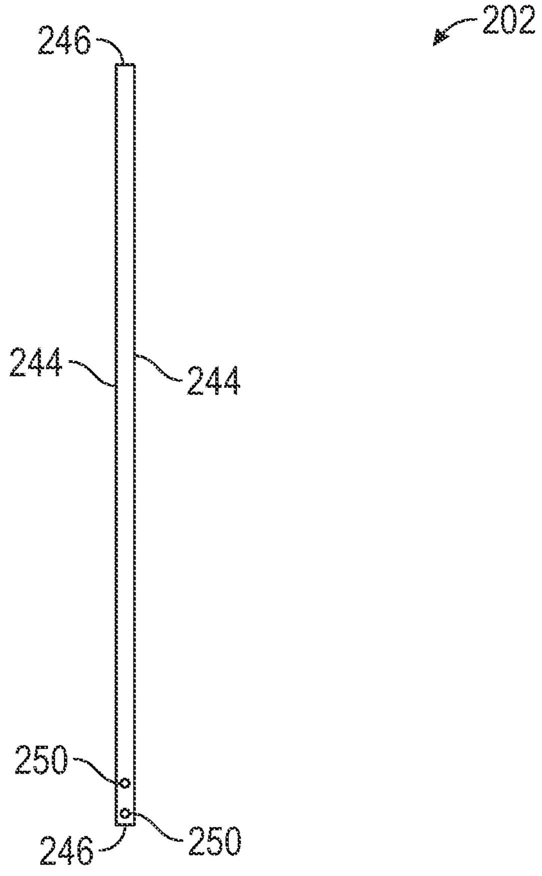
FIG. 61 is a top plan view of a rail of a rip-cut saw guide system, according to one or more arrangements.
Figure 62:
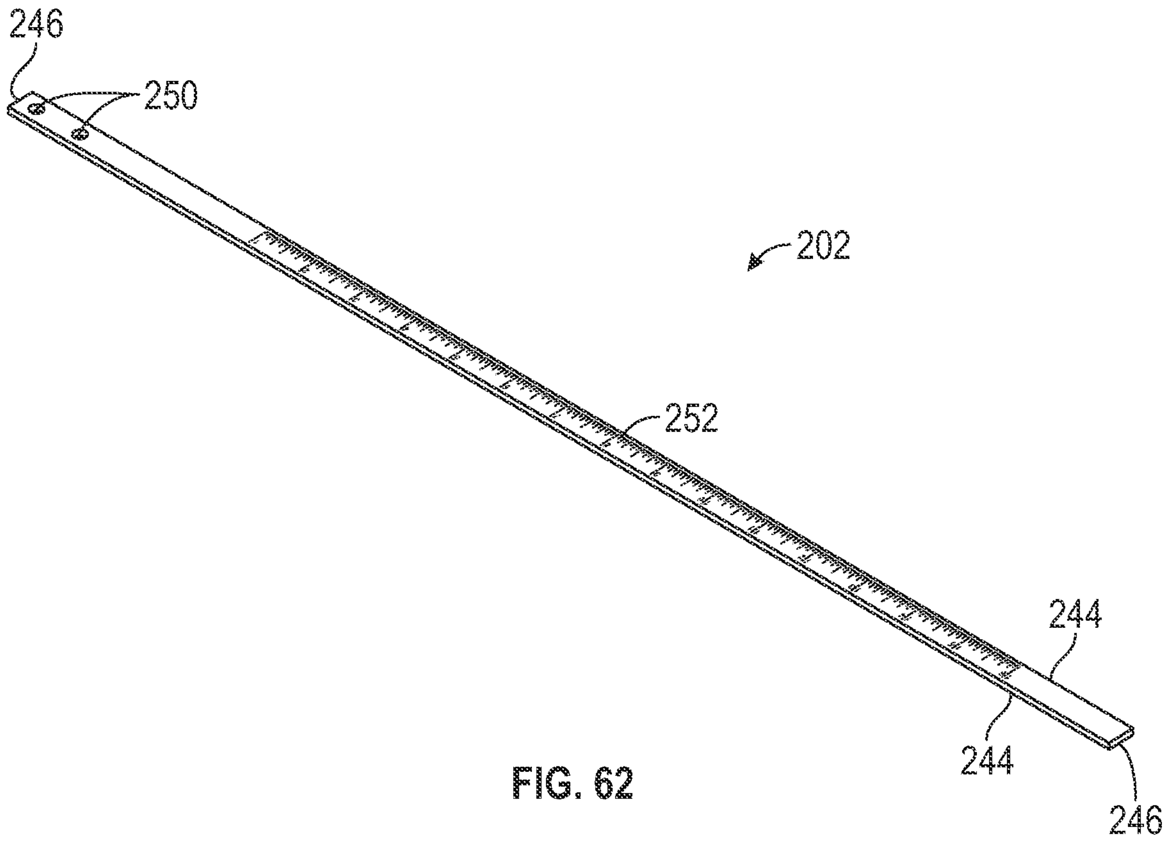
FIG. 62 is an upper left front perspective view of a rail with indicia of a rip-cut saw guide system, according to one or more arrangements.
Figure 63:
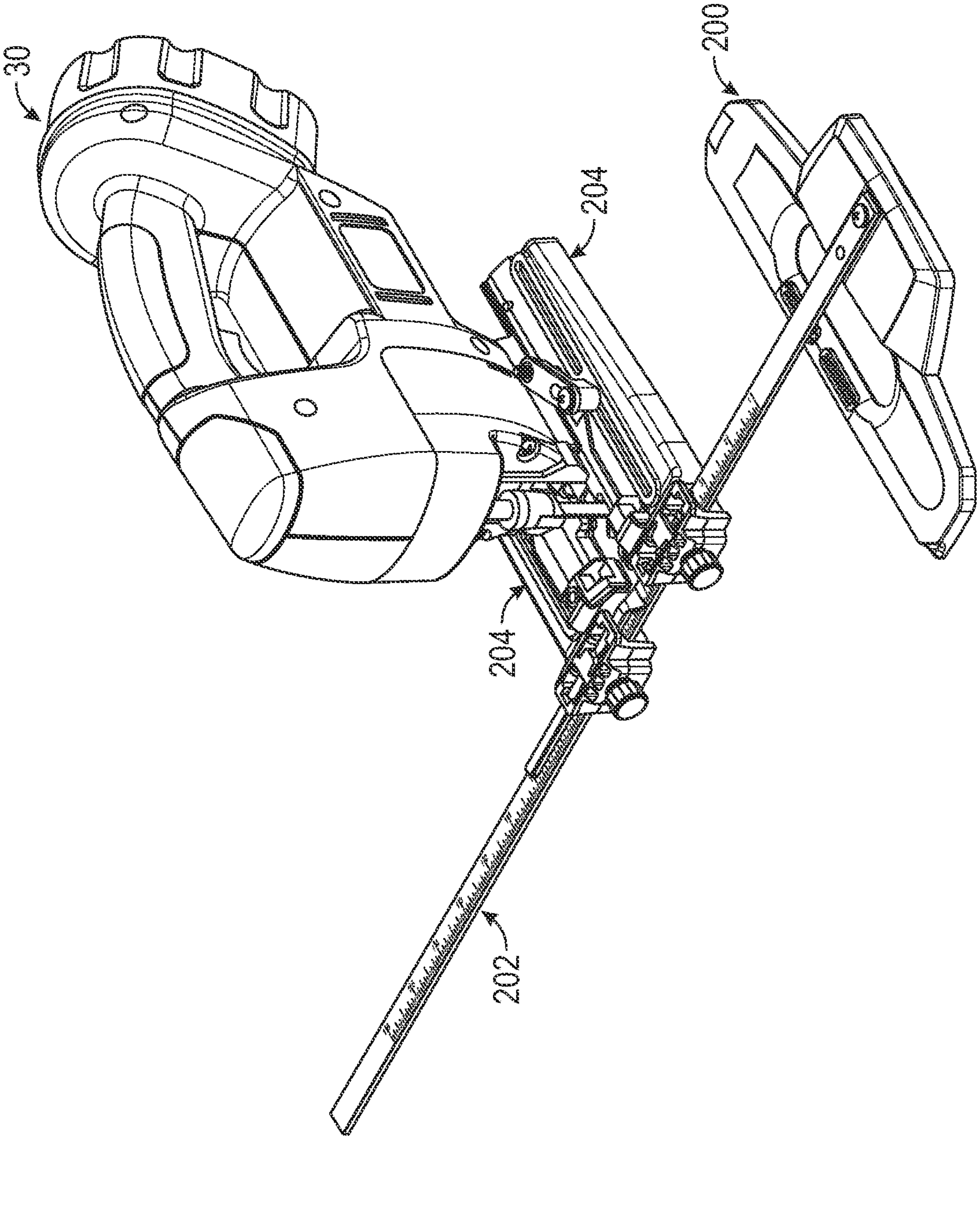
FIG. 63 shows an upper front left perspective view of a rip-cut saw guide system in use with a jigsaw having a guide arm on the left side of the rip-cut saw guide system, in accordance with one or more arrangements.
Figure 64:
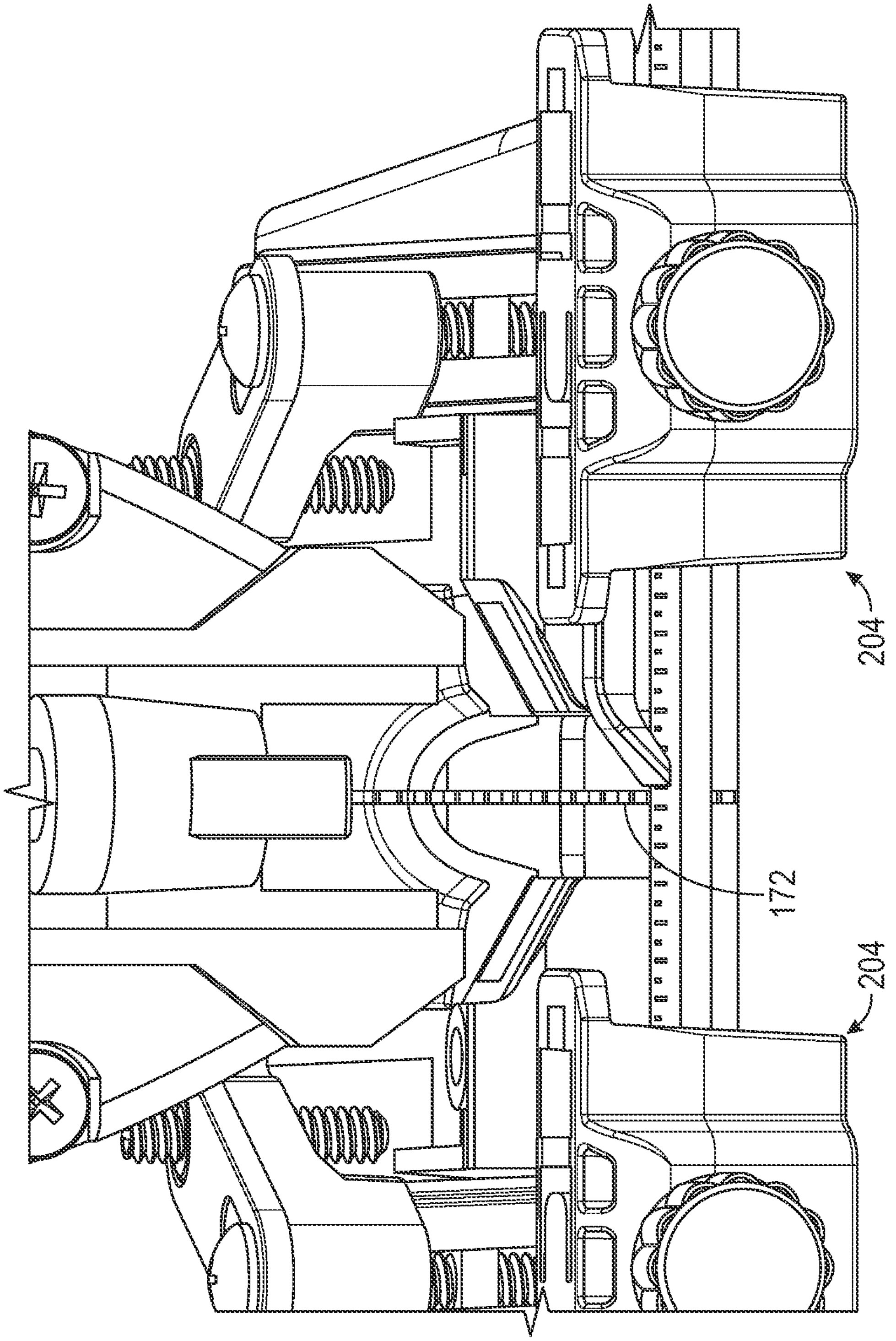
FIG. 64 shows a front view of a rip-cut saw guide system in use with a jigsaw on a workpiece, in accordance with one or more arrangements, the view showing the blade and base member of the cutting member with respect to the side members and rail of the sled of the rip-cut saw guide system.
Figure 65:
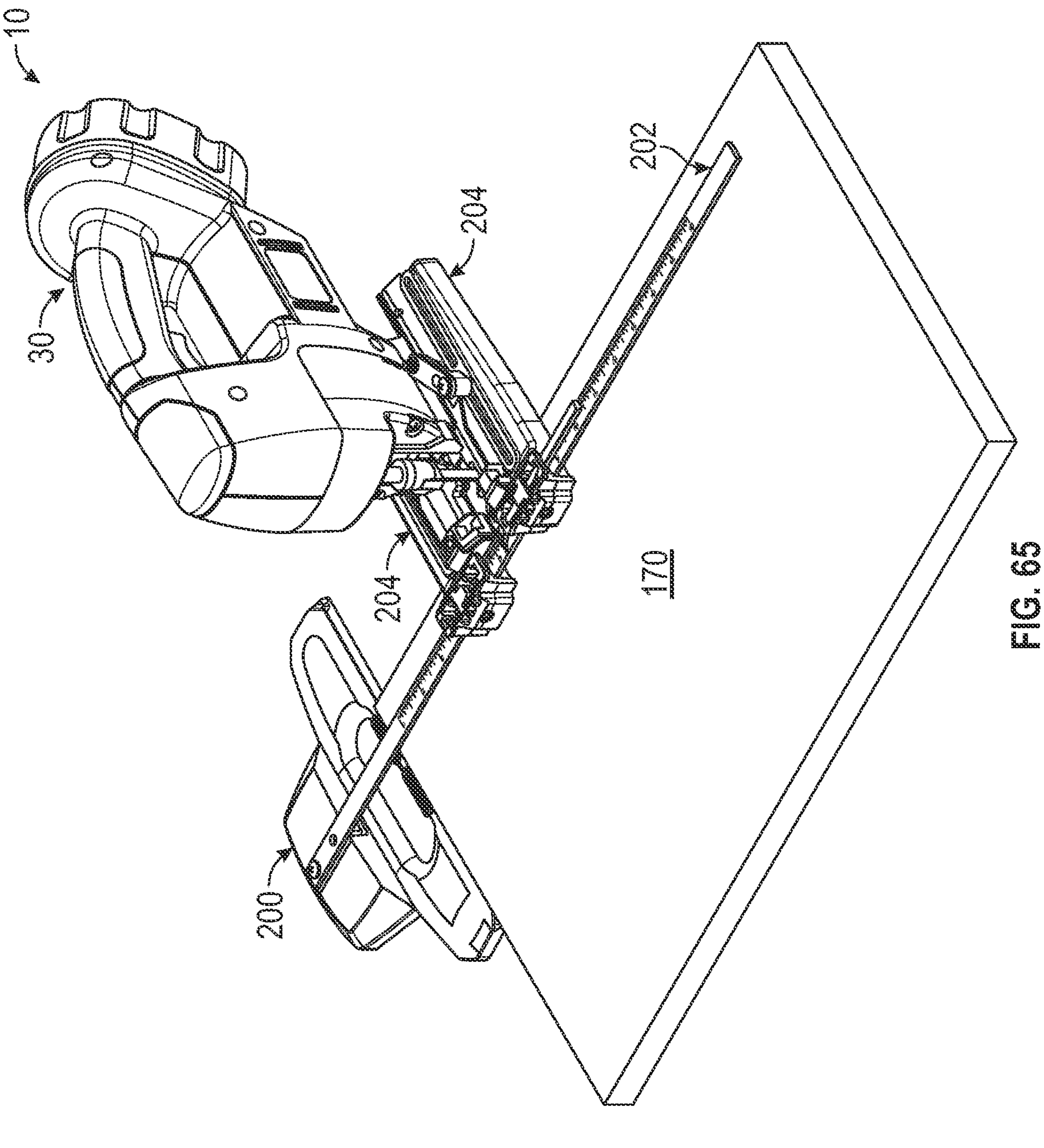
FIG. 65 shows an upper front left perspective view of a rip-cut saw guide system in use with a jigsaw on a workpiece, in accordance with one or more arrangements.
Figure 66:
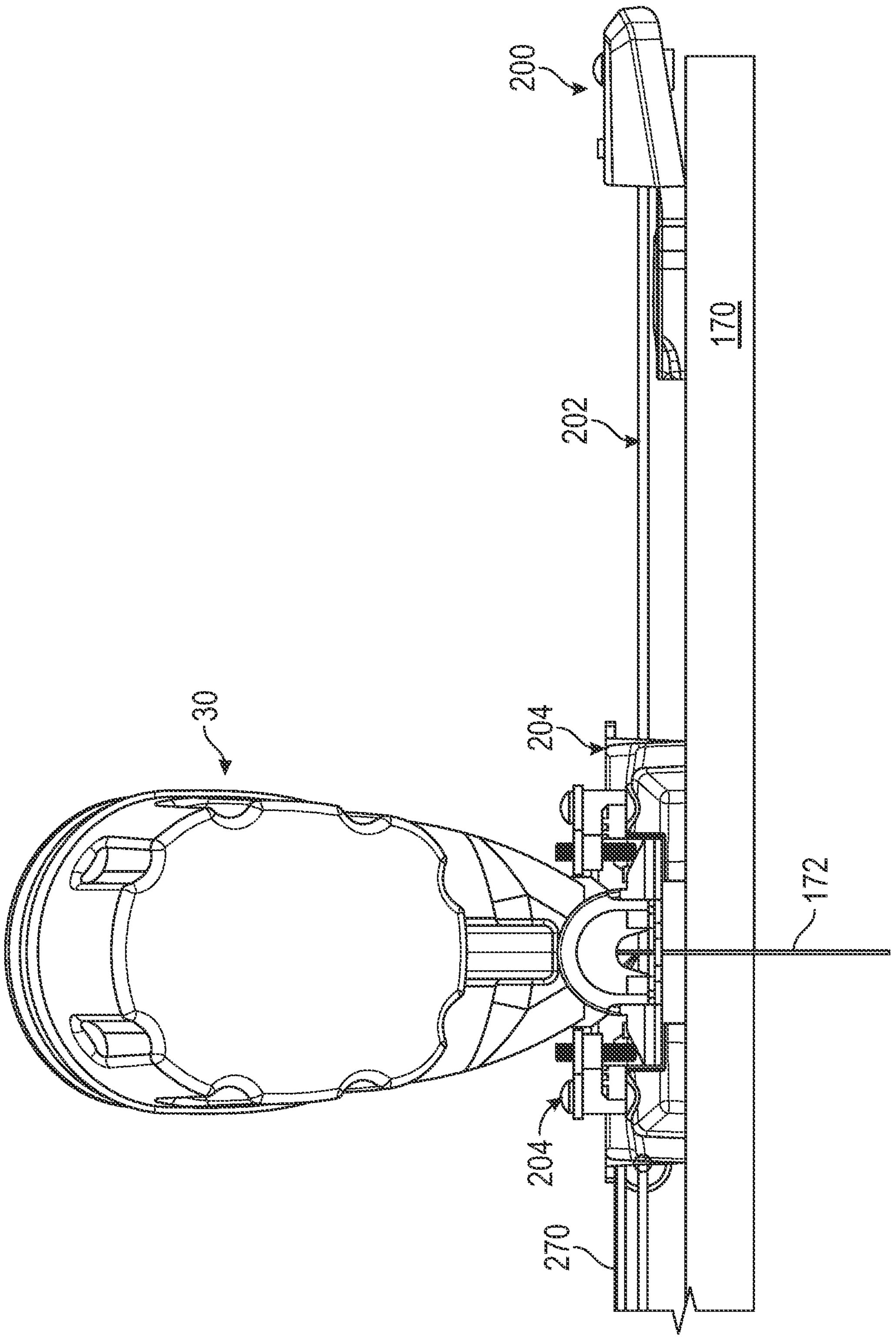
FIG. 66 shows a front elevation view of a rip-cut saw guide system in use with a jigsaw on a workpiece, in accordance with one or more arrangements, the view showing the blade of the cutting member extending through the workpiece while conducting a circle cut.
Figure 67:
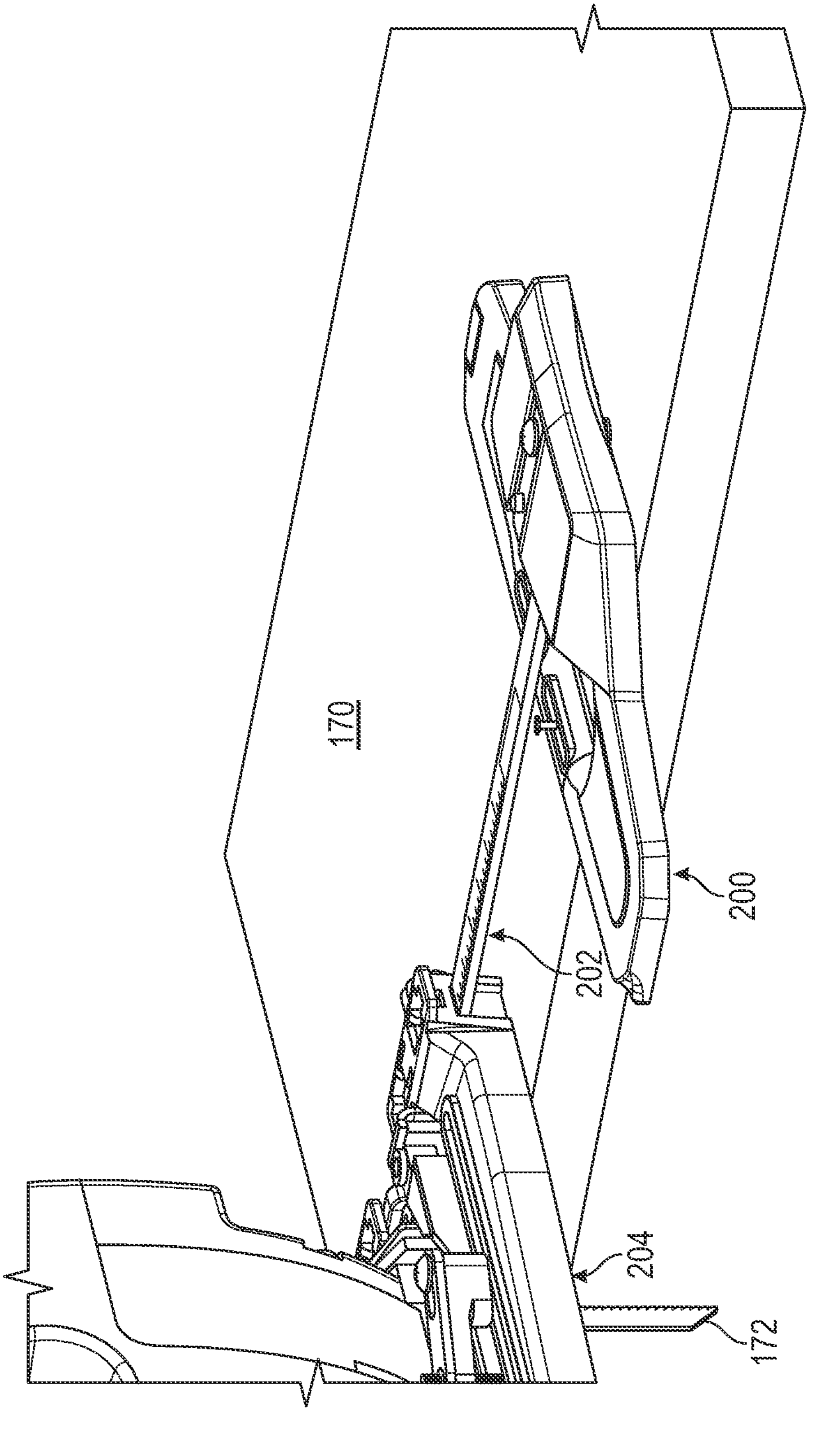
FIG. 67 shows an upper right rear perspective view of a rip-cut saw guide system in use with a jigsaw on a workpiece, in accordance with one or more arrangements, the view showing the blade of the cutting member extending through the workpiece while conducting a circle cut about a nail fastened through the guide arm.
Figure 68:
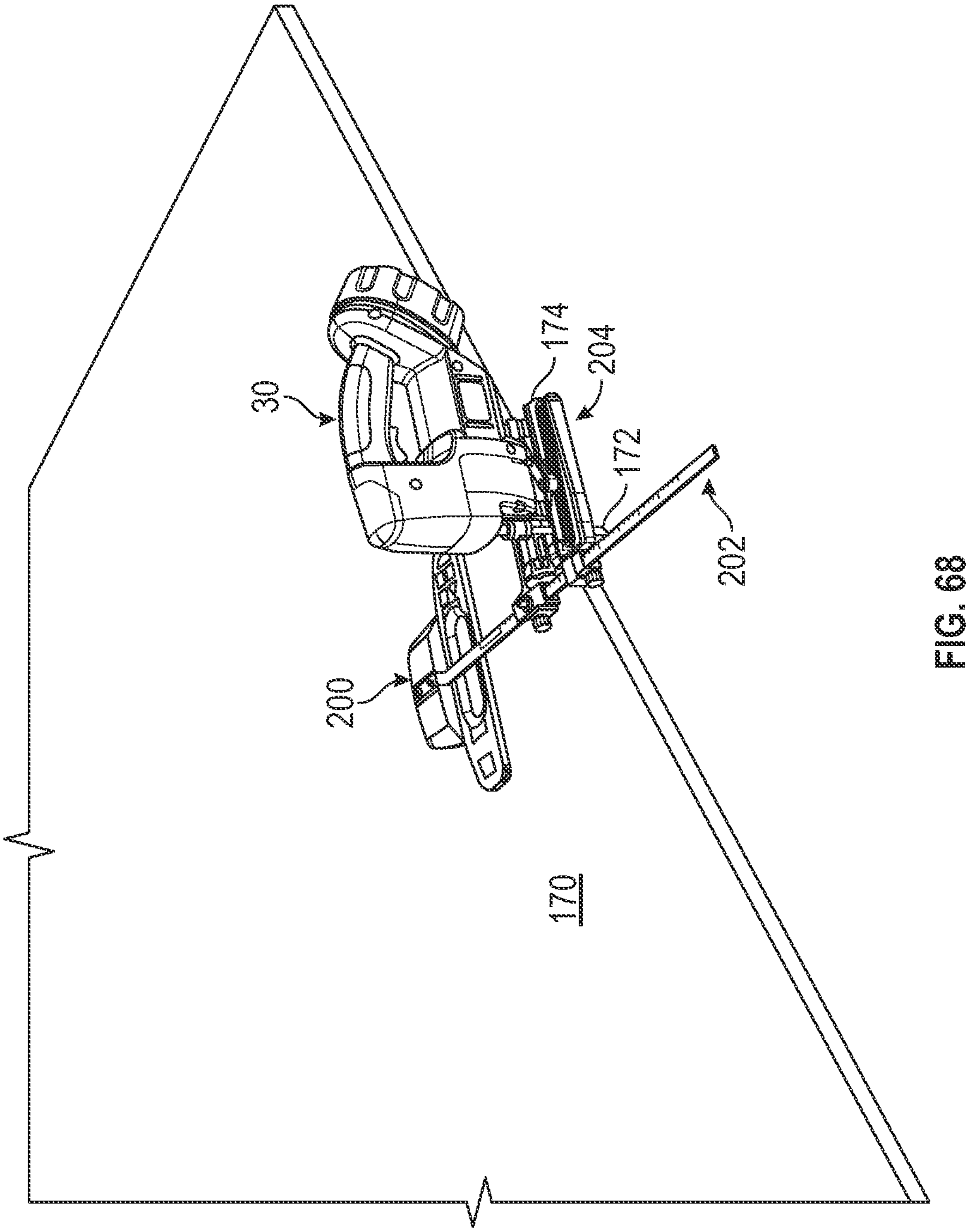
FIG. 68 shows an upper left front perspective view of a rip-cut saw guide system in use with a jigsaw on a workpiece, in accordance with one or more arrangements, the view showing the rip-cut saw guide system used to create a circle cut.
Figure 69:
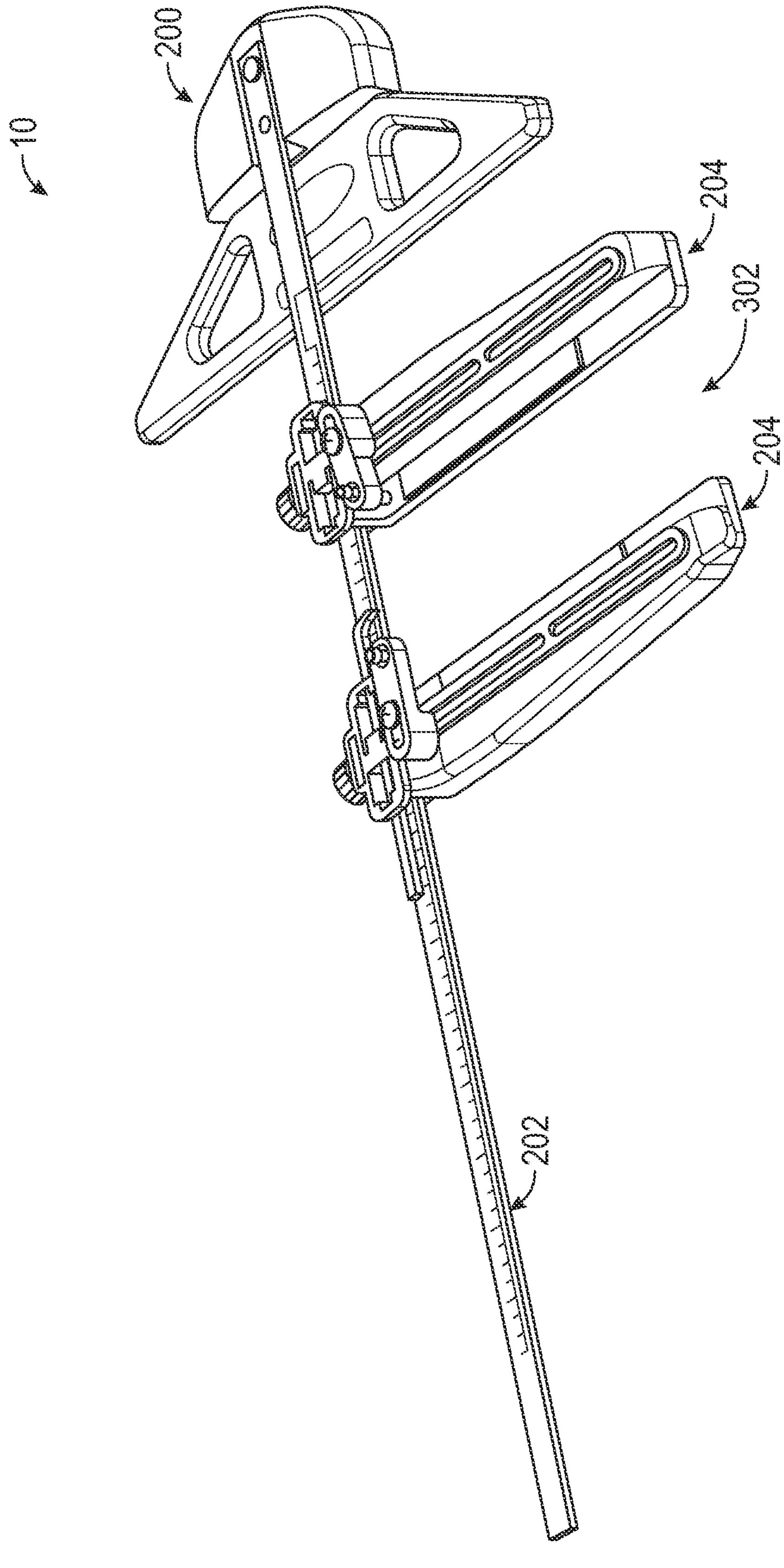
FIG. 69 is an upper left rear view of a rip-cut saw guide system having a sled with no front member, according to one or more arrangements.
Figure 70:
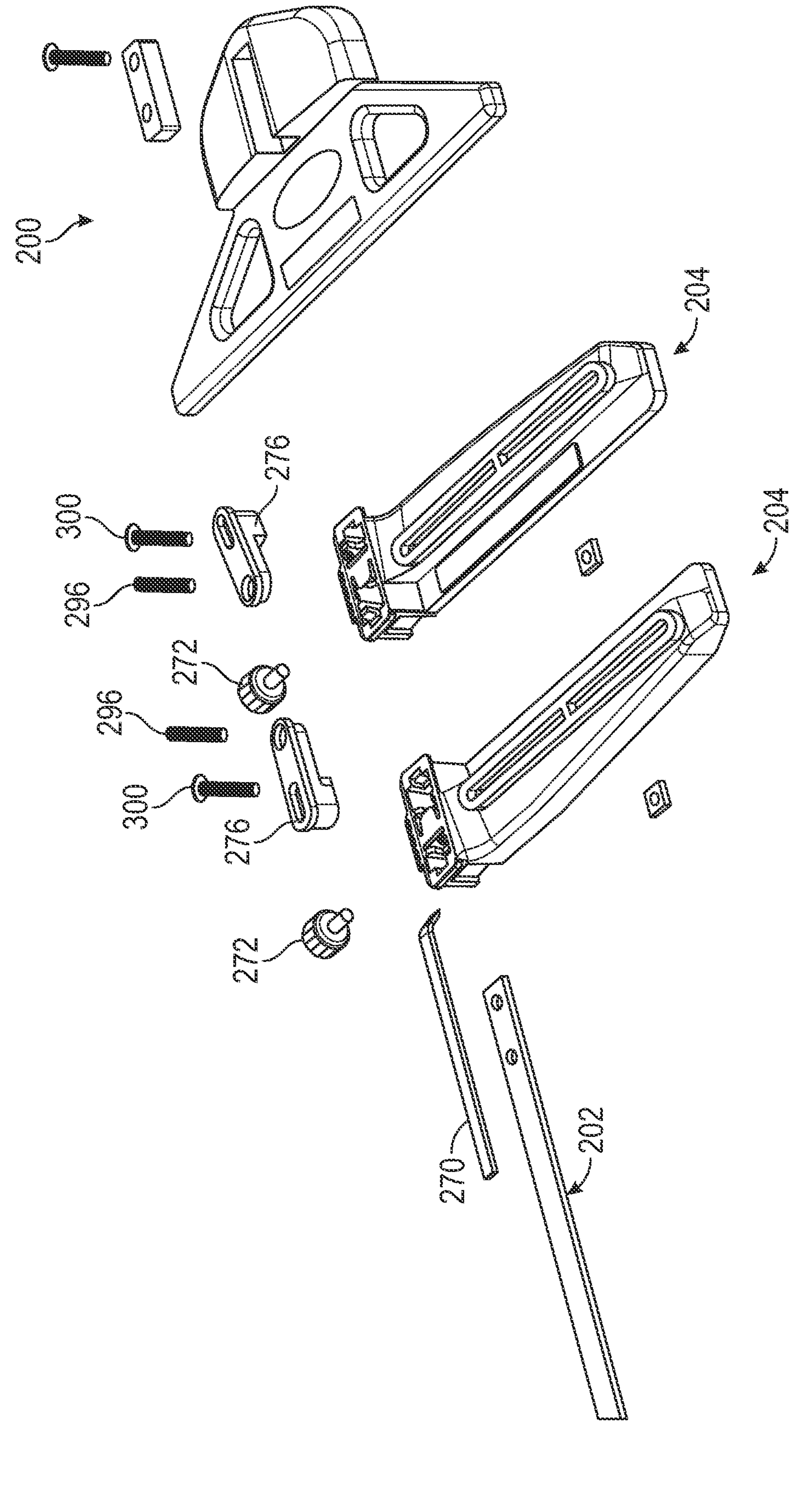
FIG. 70 is an upper left rear view of a rip-cut saw guide system having a sled with no front member, according to one or more arrangements.
Figure 71:
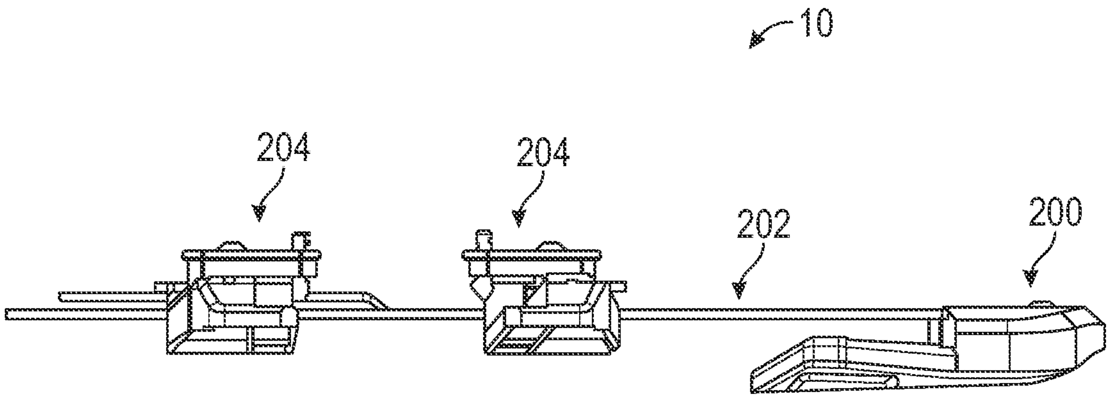
FIG. 71 is a rear elevation view of a rip-cut saw guide system having a sled with no front member, according to one or more arrangements.
Figure 72:
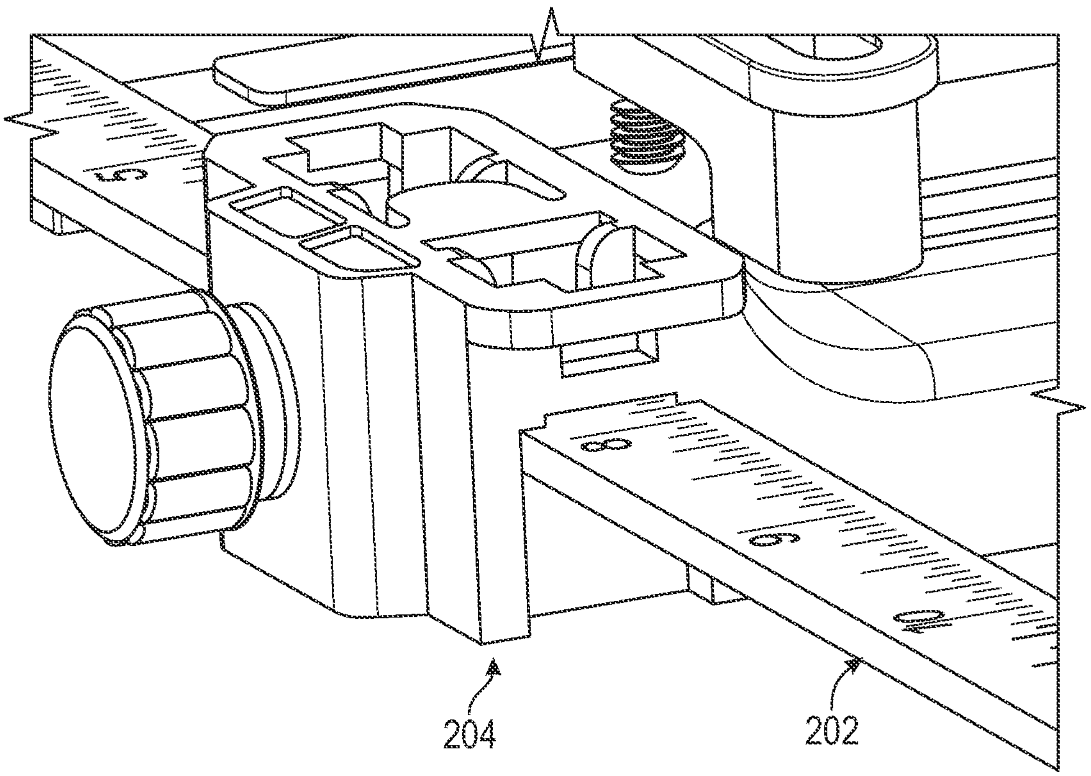
FIG. 72 is an upper left front view of the attachment of a side member to a rail of a rip-cut saw guide system with a sled having no front member, according to one or more arrangements.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the disclosure. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the disclosure that may be described herein. The contemplated embodiments are not so limited and should not be interpreted as being restricted to embodiments which address such objects of the disclosure or disclosure. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present disclosure to any particular orientation or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described as comprising an article, it is understood the system is not limited to a single instance of the article unless expressly indicated otherwise, even if elsewhere another embodiment of the system is described as comprising a plurality of articles.

It will be understood that when an element is referred to as being “connected,” “coupled,” “mated,” “attached,” “fixed,” etc. to another element, it can be directly connected to the other element, and/or intervening elements may be present. In contrast, when an element is referred to as being “directly connected,” “directly coupled,” “directly engaged” etc. to another element, there are no intervening elements present. Other words used to describe the relationship between elements should be interpreted in a like fashion (e.g., “between” versus “directly between,” “adjacent” versus “directly adjacent,” “engaged” versus “directly engaged,” etc.). Similarly, a term such as “operatively”, such as when used as “operatively connected” or “operatively engaged” is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as “communicatively connected” includes all variations of information exchange and routing between two electronic devices, including intermediary devices, networks, etc., connected wirelessly or not. Similarly, “connected” or other similar language particularly for electronic components is intended to mean connected by any means, either directly or indirectly, wired and/or wirelessly, such that electricity and/or information may be transmitted between the components.

It will be understood that, although the ordinal terms “first,” “second,” etc. may be used herein to describe various elements, these elements should not be limited to any order by these terms unless specifically stated as such. These terms are used only to distinguish one element from another; where there are “second” or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of woodworking. However, the embodiments are not so limited. It is appreciated that the embodiments may be adapted for use in other applications which may be improved by the disclosed structures, arrangements and/or methods. The system is merely shown and described as being used in the context of woodworking for ease of description and as one of countless examples.

Rip-Cut Saw Guide System

With reference to the figures, a rip-cut saw guide system (or simply “system 10”) is presented. System 10 is formed of any suitable size, shape, and design and is configured to facilitate the safe and accurate cutting of large and small workpieces 170. In the arrangement shown, as one example, system 10 has a forward end 12, a rearward end 14, opposing left and right sides 16 (or simply “sides 16”), a top side 20, and a bottom side 22. In the arrangement shown, as one example, system 10 includes a guide arm 24, a rail 26, and a sled 28, among other components as described herein. While system 10 has been described according to the arrangement shown, as one example, any combination or arrangement may be used and is hereby contemplated for use.

Guide Arm:

In the arrangement shown, as one example, system 10 includes a guide arm 24. Guide arm 24 is formed of any suitable size, shape, and design and is configured to align with an edge of a workpiece 170 and facilitate movement along the edge of the workpiece 170 during a cutting operation. In the arrangement shown, as one example, guide arm 24 has a top surface 32, a bottom surface 34, a front edge 36, a rear edge 38, and opposing left and right sides 40 (or simply “sides 40”). In the arrangement shown, as one example, guide arm 24 includes a handle 42, alignment features 44, connection openings 46, and fasteners 48.

In the arrangement shown as one example, guide arm 24 is formed of a single, unitary member that is formed in a manufacturing process such as molding, machining, extrusion, forming, additive manufacturing, or the like to form a unitary and monolithic member. Alternatively, guide arm 24 may be formed of multiple pieces that are connected or assembled to one another through bolting, screwing, adhesion, friction fitting, or the like. In the arrangement shown, as one example, guide arm 24 is formed primarily of a non-metallic material such as a plastic material, a fiberglass material, or any other non-metallic material and/or composite thereof. Alternatively, guide arm 24 may be formed of a metallic material such as steel, aluminum, chromium, or any other metallic material, alloy, and/or composite thereof.

In the arrangement shown, as one example, when viewed from top side 20, guide arm 24 is generally rectangular in shape, with the front edge 36 and rear edge 38 extending in approximate parallel planar spaced relation to one another and in approximate perpendicular planar relation to each side 40. In the arrangement shown, as one example, when viewed from a side 16, guide arm 24 is generally rectangular in shape, with top surface 32 and bottom surface 34 extending in approximate parallel planar spaced relation to one another and in approximate perpendicular planar relation to front edge 36 and rear edge 38. In the arrangement shown, as one example, when viewed from either forward end 12 or rearward end 14, guide arm 24 is generally rectangular in shape, with top surface 32 and bottom surface 34 extending in approximate parallel planar spaced relation to one another and in approximate perpendicular planar relation to each side 40. In the arrangement shown, as one example, top surface 32 of guide arm 24 includes chamfers at each corner, however chamfers are not required, and the corners may be formed of straight edges, fillet edges, or any other type of edge.

In the arrangement shown, as one example, each side 40 generally forms a straight edge. When in use, one of the sides 40 is placed against the edge of a workpiece 170. In this manner, side 40 aligns guide arm 24 and system 10, with the edge of a workpiece 170 and move along the edge of the workpiece 170 while a cutting operation is being performed.

In the arrangement shown, as one example, guide arm 24 includes handle 42. Handle 42 is formed of any suitable size, shape, and design and is configured to allow a user to grasp and hold guide arm 24 before, during, and after a cutting operation. In the arrangement shown, as one example, handle 42 is formed of an opening 43 in guide arm 24. In the arrangement shown, as one example, opening 43 is an elongated area towards the middle of guide arm 24 which is formed either in the molding process or by machining away material from guide arm 24. With material machined away from the general middle of guide arm 24, opening 43 is formed while a portion of guide arm 24 is still present between opening 43 and each side 40. In the arrangement shown, as one example, the material left after forming opening 43 forms handle 42. In this arrangement, as one example, guide arm 24 can be utilized with both left-handed saws and right-handed saws and/or on the right or left of the workpiece 170 without having to adjust the position of handle 42 to ensure proper placement of guide arm 24 in relation to the workpiece 170. While handle 42 is formed in the example arrangement, as one example, handle 42 may be formed in any manner including, but not limited to, adding a knob or a pull handle to guide arm 24.

In the arrangement shown, as one example, guide arm 24 includes alignment features 44. Alignment features 44 are formed of any suitable size, shape, and design and are configured to facilitate the proper alignment of rail 26 with guide arm 24. In the arrangement shown, as one example, alignment features 44 are cylindrical nodes (or protrusions) which extend a distance above top surface 32 of guide arm 24. In the arrangement shown, as one example, there are two alignment features 44 which are configured to align with openings 62 of rail 26, thereby facilitating proper alignment of rail 26 with guide arm 24.

In the arrangement shown, as one example, guide arm 24 includes connection openings 46 and fasteners 48. Connection openings 46 and fasteners 48 are formed of any suitable size, shape, and design and are configured to facilitate the secured engagement of guide arm 24 and rail 26. In the arrangement shown, as one example, connection openings 46 are cylindrical openings in guide arm 24 which are configured to receive fasteners 48. In the arrangement shown, as one example, fasteners 48 are screws configured to extend through openings 62 of rail 26 and screw into connection openings 46 of guide arm 24. In this way, connection openings 46 and fasteners 48 facilitate the secured engagement of guide arm 24 and rail 26. While rail 26 and guide arm 24 are connected in the arrangement shown using connection openings 46 and screw as fasteners 48, any other type of fastener or connection member may be used to facilitate engagement of guide arm 24 and rail 26 and is hereby contemplated for use in system 10.

While guide arm 24 has been described according the arrangement shown, as one example, it will be understood by those skilled in the art that any other configuration of guide arm 24 may be used in order to align system 10 with the edge of a workpiece 170 and facilitate movement along the edge of the workpiece 170 during a cutting operation.

Rail:

In the arrangement shown, as one example, system 10 includes a rail 26. Rail 26 is formed of any suitable size, shape, and design and is configured to receive sled 28 and facilitate proper alignment of sled 28 with a workpiece 170 to perform an accurate and precise cutting operation. In the arrangement shown, as one example, rail 26 has a top surface 52, a bottom surface 54, front and rear edges 56 (or simply "edges 56"), and right and left ends 58 (or simply "ends 58"). In the arrangement shown, as one example, rail 26 includes openings 62, indicia 64, and feature 66.

In the arrangement shown as one example, rail 26 is formed of a single, unitary member that is formed in a manufacturing process such as extrusion, machining, forming, molding, additive manufacturing, or the like to form a unitary and monolithic member. Alternatively, rail 26 may be formed of multiple pieces that are connected or assembled to one another through bolting, screwing, adhesion, friction fitting, or the like. In the arrangement shown, as one example, rail 26 is formed primarily of a non-metallic material such as a plastic material, a fiberglass material, or any other non-metallic material and/or composite thereof. Alternatively, rail 26 may be formed of a metallic material such as steel, aluminum, chromium, or any other metallic material, alloy, and/or composite thereof.

In the arrangement shown, as one example, when viewed from top side 20, rail 26 is generally rectangular in shape, with the edges 56 extending in approximate parallel planar spaced relation to one another and in approximate perpendicular planar relation to each end 58. In the arrangement shown, as one example, when viewed from either side 16, bottom surface 54 of rail 26 extends in planar fashion and top surface 52 extends in approximate parallel planar spaced relation to bottom surface 54, with side walls 68 of feature 66 extending upward from top surface 52. In this view, edges 56 extend in approximate perpendicular planar relation to top surface 52 and bottom surface 54. In the arrangement shown, as one example, when viewed from either forward end 12 or rearward end 14, rail 26 is generally rectangular in shape, with top surface 72 of feature 66 and bottom surface 54 extending in approximate parallel planar spaced relation to one another and in approximate perpendicular planar relation to each end 58.

In the arrangement shown, as one example, rail 26 includes openings 62. Openings 62 are formed of any suitable size, shape, and design and are configured to facilitate proper alignment and secure engagement of rail 26 and guide arm 24. In the arrangement shown, as one example, openings 62 are positioned near an end 58 of rail 26. In the arrangement shown, as one example, openings 62 are generally circular in shape. In the arrangement shown, as one example, there are four openings 62, with two openings 62 configured to align with and receive alignment features 44 of guide arm 24, and the remaining two openings 62 configured to allow fastener 48 of guide arm 24 to pass through and enter connection openings 46. While the arrangement shown, as one example, depict four circular openings 62, any number of openings 62 may be present, including zero, one, two, three, four, five, six, seven, eight, nine, ten, or any other number or openings 62, and openings 62 may be formed of any size, shape, and configuration, including square, rectangular, ovular, triangular, or any other shape. Further, in alternative arrangements, openings 62 may not be necessary depending on the mechanism or method used to facilitate engagement between guide arm 24 and rail 26.

In the arrangement shown, as one example, rail 26 includes indicia 64. Indicia 64 can be any visual indication of distance from a predetermined point to help the user accurately cut a workpiece 170. In the arrangement shown, as one example, indicia 64 are positioned on the top surface 52 of rail 26 and are visible to the user when performing a cutting operation using system 10. In the arrangement shown, as one example, indicia 64 show the distance from the edge of a workpiece 170 (which corresponds to a side 40 of guide arm 24) so the user can accurately align the sled 28 and cutting member 30 with the indicia 64 corresponding to the desired size of workpiece 170. Indicia 64 may be in metric units such as, by way of example and not limitation, centimeters or millimeters, or in imperial measurements such as, by way of example and not limitation, inches or feet.

In the arrangement shown, as one example, rail 26 includes feature 66. Feature 66 is formed of any suitable size, shape, and design and is configured to facilitate engagement between rail 26 and sled 28. In the arrangement shown, as one example, feature 66 extends upward from top surface 52. In the arrangement shown, as one example, feature 66 is formed of side walls 68 with an upper protrusion 70. In the arrangement shown, as one example, when viewed from either side 16, a first side wall 68 extends upward from top surface 52 at an angle towards a second side wall 68, and the second side wall 68 extends upward from top surface 52 at an angle towards the first side wall 68. In the arrangement shown, as one example, the side walls 68 extend a distance before terminating at upper protrusion 70. Each side wall 68 includes an upper protrusion 70 and each upper protrusion 70 extends outward from side walls 68 toward the other upper protrusion 70 a distance, however the two upper protrusions 70 do not meet. In this arrangement, when viewed from either side 16, feature 66 generally forms the shape of a partially enclosed trapezoid with a hollow center 74 and a top surface 72 which includes an empty space between the upper protrusions 70. While feature 66 has been described according to the arrangement shown, as one example, feature 66 may be formed of any other suitable size, shape, and design to facilitate connection between rail 26 and sled 28.

In the arrangement shown, as one example, the hollow center 74 of feature 66 is of sufficient size to receive wedge 122 of locking member 108 of front member 90 of sled 28. In the arrangement shown, as one example, when wedge 122 of locking member 108 is in an unlocked position, wedge 122 is slightly narrower than the hollow center 74 of feature 66. With wedge 122 in the unlocked position, sled 28 is freely movable along rail 26 and wedge 122 slides within feature 66. In the arrangement shown, as one example, when wedge 122 of locking member 108 is in a locked position, wedge 122 engages side walls 68 of feature 66 such that wedge 122 is tightly held within feature 66 and unable to move. With wedge 122 in the locked position, sled 28 is securely positioned and no longer able to move along rail 26. In this way, feature 66 and rail 26 are able to receive sled 28 and facilitate proper alignment of sled 28 with a workpiece 170 in order to perform an accurate and precise cutting operation.

While rail 26 has been described according to the arrangement shown, as one example, it will be understood by those skilled in the art that any other configuration of rail 26 may be used in order to receive sled 28 and facilitate proper alignment of sled 28 with a workpiece 170 in order to perform an accurate and precise cutting operation.

Sled:

In the arrangement shown, as one example, system 10 includes a sled 28. Sled 28 is formed of any suitable size, shape, and design and is configured to engage with rail 26 and facilitate attachment and support of a cutting member 30 to system 10. In the arrangement shown, as one example, sled 28 has a top side 80, a bottom side 82, a forward end 84, a rearward end 86, and opposing left and right sides 88 (or simply "sides 88"). In the arrangement shown, as one example, sled 28 includes a front member 90, a pair of side members 92, and an open space 94 between side members 92.

Front Member: In the arrangement shown, as one example, sled 28 includes a front member 90. Front member 90 is formed of any suitable size, shape, and design and is configured to facilitate connection of sled 28 to rail 26 and facilitate the adjustable positioning of side members 92. In the arrangement shown, as one example, front member includes a top surface 96, a bottom surface 98, a front surface 100, a back surface 102, and opposing left and right ends 104 (or simply "ends 104"). In the arrangement shown, as one example, front member 90 includes a feature 106, a locking member 108, indicia 128, an alignment member 130, protrusions 114, slots 116, and fasteners 118.

In the arrangement shown as one example, front member 90 is formed of a single, unitary member that is formed in a manufacturing process such as extrusion, machining, forming, molding, additive manufacturing, or the like to form a unitary and monolithic member. Alternatively, front member 90 may be formed of multiple pieces that are connected or assembled to one another through adhesion, bolting, screwing, welding, friction fitting, or the like. In the arrangement shown, as one example, front member 90 is formed primarily of a non-metallic material such as a plastic material, a fiberglass material, or any other non-metallic material and/or composite thereof. Alternatively, front member 90 may be formed of a metallic material such as steel, aluminum, chromium, or any other metallic material, alloy, and/or composite thereof.

In the arrangement shown, as one example, front member 90 includes feature 106. Feature 106 is formed of any suitable size, shape, and design and is configured to help facilitate engagement between sled 28 and rail 26. In the arrangement shown, as one example, when viewed from a side 88, feature 106 is generally formed in the shape of a trapezoid and is located near front surface 100 of front member 90. In the arrangement shown, as one example, feature 106 corresponds in shape with feature 66 of rail 26 and feature 106 of front member 90 is slightly larger in size than feature 66 of rail 26 such that feature 66 of rail 26 nests within feature 106 of front member 90. That is, feature 106 of front member 90 is generally sized and shaped so that feature 106 of front member 90 can slide over feature 66 of rail 26 and feature 66 of rail 26 can nest within feature 106 of front member 90. In this way, sled 28 is able to slide along rail 26 while still being operatively engaged with rail 26. When the user desire to lock sled 28 in place, such that it can no longer slide along rail 26, the user can utilize locking member 108.

In the arrangement shown, as one example, front member 90 includes locking member 108. Locking member 108 is formed of any suitable size, shape, and design and is configured to facilitate the locking of sled 28 into a position along rail 26 in order to perform a safe cutting operation. In the arrangement shown, as one example, locking member 108 includes a selector 120, a wedge 122, and a bolt 124.

Selector 120 may be formed of any suitable size, shape, and design and is configured to facilitate rotation of wedge 122. In the arrangement shown, as one example, selector 120 rests above the top surface 96 of front member 90 and selector 120 is a knob that is generally triangular in shape. However, any other hardware or mechanism for facilitating rotation of wedge 122 may be used as selector 120. In the arrangement shown, as one example, selector has a lower portion which extends through locking member opening 126 and is configured to receive bolt 124. In the arrangement shown, as one example, bolt 124 is configured to facilitate connection of wedge 122 to selector 120. In the arrangement shown, as one example, bolt 124 extends through wedge 122 and is received within the lower portion of selector 120 and is screwed into selector 120. With wedge 122 connected to selector 120 through bolt 124, rotation of selector 120 causes rotation of wedge 122.

Wedge 122 is formed of any suitable size, shape, and design and is configured to fit within feature 66 of rail 26 and, when in an unlocked position, move freely within feature 66 thereby allowing the free movement of sled 28. In the arrangement shown, as one example, when a user rotates selector 120, wedge 122 is likewise rotated to a locked position. When wedge 122 is rotated to a locked position, wedge 122 is sided and shaped to make contact with side walls 68 of feature 66 and facilitate secured engagement with side walls 68. When wedge 122 is in secured engagement with side walls 68, sled 28 is no longer movable along the length of rail 26 and at this point it is safe to utilize system 10 to perform a cutting operation using a cutting member 30 connected to sled 28.

In one or more arrangements, before locking wedge 122 in order to perform a cutting operation, sled 28 and blade 172 of cutting member 30 are aligned with the desired cutting line. System 10 includes multiple ways for a user to ensure proper alignment of sled 28 and blade 172 of cutting member 30 with the desired cutting line, including indicia 128 and alignment member 130.

In the arrangement shown, as one example, front member 90 includes alignment member 130. Alignment member 130 is formed of any suitable size, shape, and design and is configured to align with the edge of blade 172 of cutting member 30 and a desired cutting line, allowing the user to perform an accurate cutting operation. In the agreement shown, as one example, alignment member 130 is a transparent plastic member with a mark at the center of alignment member 130 serving as a visual indicator of the edge of blade 172 of cutting member 30. In the arrangement shown, as one example, alignment member 130 is operably connected to the front surface 100 of front member 90 and alignment member 130 is connected such that it is movable along a length of front surface 100. In this way, the user can move alignment member 130 along a length of front surface 100 to align with the edge of blade 172 of cutting member 30 and, in this way, the user has a visual indicator of where the blade 172 is cutting workpiece 170. alignment member 130 to align blade 172 of cutting member 30 with the desired cutting line.

In the arrangement shown, as one example, front member 90 also includes indicia 128. Indicia 128 can be any visual indication of the position of sled 28, the blade 172 of cutting member 30, and/or side members 92 of sled 28. In the arrangement shown, as one example, a single indicia 128 is provided on the front surface 100 of front member 90. In the arrangement shown, as one example, the single indicia 128 on the front surface 100 of front member 90 is at the midpoint between opposing left and right ends 104 of front member 90. When side members 92 are positioned such that the blade 172 of cutting member 30 is aligned the single indicia 128 on front surface 100—and with the center of front member 90—a user can move sled 28 along rail 26 until the single indicia 128 on the front surface 100 of front member 90 is aligned with the indicia 64 of rail 26 corresponding to the desired cutting line. With indicia 128 on front surface 100 aligned with the desired cutting line, the user can perform an accurate cutting operation.

The advantage of including both the single indicia 128 on front surface 100 of front member 90 and alignment member 130 is flexibility. There may be situations where, due to the configuration of cutting member 30, blade 172 of cutting member 30 may not be able to align with the center of front member 90 and the single indicia 128 on front surface 100. In such situations, alignment member 130 may be utilized to properly align sled 28 and blade 172 of cutting member 30 with the desired cutting line. In other situations, where blade 172 of cutting member 30 is able to align with the center of front member 90, and the single indicia 128 on front surface 100, user does not need to adjust alignment member 130 to blade 172, saving time and making the cutting operation more efficient.

When using the single indicia 128 on front surface 100 of front member 90, the user can ensure alignment of blade 172 of cutting member 30 with the middle of front member 90 using indicia 128 on the back surface 102 of front member 90. In the arrangement shown, as one example, multiple indicia 128 are included on the back surface 102 of front member 90. In the arrangement shown, as one example, the indicia 128 located at the middle of front member 90 between opposing left and right ends 104 is larger than the rest of the indicia 128. The indicia 128 located at the middle of front member 90 is larger than the rest of the indicia 128 to make it easier for the user to align blade 172 of cutting member 30 with the single indicia 128 on front surface 100.

In the arrangement shown, as one example, indicia 128 on the back surface 102 are also configured to help the user properly align side members 92 of sled 28. Indicia 128 may be utilized to help align side member 92 with a desired position on sled 28. In the arrangement shown, as one example, multiple components are used to operatively connect side member 92 to front member 90 in a manner which allows side members 92 to move along a length of front member 90. These components of front member 90 include protrusions 114, slots 116, and fasteners 118.

In the arrangement shown, as one example, front member 90 includes protrusions 114. Protrusions 114 are formed of any suitable size, shape, and design and are configured nest with recess 142 of side member 92 to facilitate operable connection of side members 92 to front member 90. In the arrangement shown, as one example, protrusions 114 are dovetail protrusions extending outward from the back surface 102 of front member 90, however the embodiment is not so limited and protrusions 114 may be formed of any other shapes or configurations, which are hereby contemplated for use. In this arrangement, protrusions 114 are slightly smaller than recess 142 of side member 92 such that protrusions 114 can be received and operatively held within recess 142 such that side member 92 may be moved along a length of front member 90. In the arrangement shown, as one example, protrusions 114 begin at or near each opposing side 88 and extend a distance towards the middle of front member 90. In the arrangement shown, as one example, there are two protrusions 114 which each terminate in a chamfered end before they reach the middle of front member 90, thereby forming two protrusions 114. Each protrusion 114 is configured to facilitate connection of one or more side members 92 to front member 90. In the arrangement shown, as one example, each protrusion 114 is configured to one side member 92 to front member 90.

In the arrangement shown, as one example, front member 90 includes slots 116. Slots 116 are formed of any suitable size, shape, and design and are configured to facilitate operative engagement with side member 92. In the arrangement shown, as one example, slots 116 are elongated openings in the top surface 96 of front member 90. In the arrangement shown, as one example, there are two slots 116, one on each side of the middle of front member 90. In this arrangement, each slot 116 begins at or near an opposing end 104 of front member 90 and terminate near the middle of front member 90. In the arrangement shown, as one example, each slot 116 is configured to connect to one side member 92 through the use of fasteners 118.

In the arrangement shown, as one example, side members 92 are securely engaged with slots 116 using fasteners 118. Fasteners 118 are formed of any suitable size, shape, and design and are configured to secure side members 92 to front member 90. In the arrangement shown, as one example, fasteners 118 are thumb screws, however any other type of fastener or mechanism to secure front member 92 to front member 90 may be utilized as fasteners 118. In the arrangement shown, as one example, fasteners 118 extend through an opening 152 of tab 144 of side members 92 and through slots 116 of front member 90, thereby operably connecting front member 90 and side members 92.

In the arrangement shown, as one example, to connect side members 92 to front member 90, a user will align protrusions 114 of front member 90 with recess 142 of side member 92. With protrusions 114 and recess 142 aligned, the user can move side members 92 such that recess 142 of side members 92 encompass protrusions 114 of front member 90 and opening 152 of tab 144 of side members 92 are aligned with slots 116. At that point, the user can insert and thread fasteners 118 through opening 152 of tab 144 and through slots 116. Once fasteners 118 are tight, side members 92 will be securely engaged with front member 90 and the user can perform a cutting operation.

While front member 90 has been described according the arrangement shown, as one example, it will be understood by those skilled in the art that any other configuration of front member 90 may be used in order to facilitate connection of sled 28 to rail 26 and facilitate the adjustable positioning of side members 92 within system 10.

Side Members: In the arrangement shown, as one example, sled 28 includes a pair of side members 92. Side members 92 are formed of any suitable size, shape, and design and are configured to operatively connect to rail 26 and engage with, and support, cutting member 30. In the arrangement shown, as one example, side members 92 have a top surface 132, a bottom surface 134, a front end 136, a back end 138, a midpoint 140 between front end 136 and back end 138, and opposing left and right sides 141 (or simply "sides 141"). In the arrangement shown, as one example, side members 92 include a recess 142, a tab 144, a second surface 146, and attachment members 148.

In the arrangement shown as one example, side members 92 are formed primarily of a single, unitary member that is formed in a manufacturing process such as extrusion, machining, forming, molding, additive manufacturing, or the like to form a unitary and monolithic member. Alternatively, side members 92 may be formed of multiple pieces that are connected or assembled to one another through adhesion, bolting, screwing, welding, friction fitting, or the like. In the arrangement shown, as one example, side members 92 are formed primarily of a non-metallic material such as a plastic material, a fiberglass material, or any other non-metallic material and/or composite thereof. Alternatively, side members 92 may be formed of a metallic material such as steel, aluminum, chromium, or any other metallic material, alloy, and/or composite thereof.

In the arrangement shown, as one example, when viewed from top side 20 of system 10, side members 92 are generally rectangular in shape with a slight taper as the outer edge of side members 92 move from front end 136 to back end 138. In the arrangement shown, as one example, when viewed from either side 16 of system 10, side members 92 are primarily rectangular in shape with top surface 132 generally extending in parallel planar spaced relation to bottom surface 134 and generally perpendicular to front end 136 and back end 138. In this view, while side members 92 are primarily rectangular in shape, back end 138 includes a chamfered edge where back end 138 meets top surface 132. Additionally, in this arrangement as one example, top surface 132 of side members 92 has a slight incline near front end 136 which connects directly to tab 144, which extends outward from front end 136 in parallel planar spaced relation to the majority of top surface 132.

Side members 92 are configured to operably connect to front member 90 such that side members 92 are engaged with front member 90 while also being able to laterally adjust along a length of front member 90. In the arrangement shown, as one example, to facilitate operable connection to front member 90, side members 92 include a recess 142 and a tab 144.

In the arrangement shown, as one example, side members 92 include recess 142. Recess 142 is formed of any suitable size, shape, and design and is configured to receive protrusions 114 of front member 90 therein within tolerances that ensure engagement between front member 90 and side members 92, which still allowing for lateral adjustment of side members 92. In the arrangement shown, as one example, recess 142 is generally in the shape of a dovetail recess in order to receive the dovetail protrusions 114, however recess 142 may be any other shape or configuration in order to receive protrusions 114 therein. In the arrangement shown, as one example, recess 142 is formed within front end 136 and extends from one side 141 to the other side 141 of side members 92. In the arrangement shown, as one example, the dovetail shape of protrusions 114 and dovetail shaped recess 142 ensure engagement between front member 90 and side members 92. Specifically, the initial opening of recess 142 and the initial portion of protrusions 114 are relatively narrow and the outer portion of protrusions 114 and the inner portion of recess 142 are wider, so the wider portion of protrusions 114 fits within the wider inner portion of recess 142, but the wider portion of protrusions 114 is secure within recess 142 because this wider portion of protrusions 114 cannot slip out of the narrow initial opening of recess 142. This dovetail shape allows recess 142 to be slightly larger than protrusions 114, which allows for lateral adjustment of side members 92, while also facilitating operable engagement between front member 90 and side members 92. However, as noted previously, other shapes and configurations of protrusions 114 and recess 142 may be used and are hereby contemplated for use.

In the arrangement shown, as one example, side members 92 include a tab 144. Tab 144 is formed of any suitable size, shape, and design and is configured to help facilitate engagement between side members 92 and front member 90. In the arrangement shown, as one example, when viewed from top side 20 of system 10, tab 144 is a generally square or rectangular member extends outward from front end 136 of side members 92. More specifically, in the arrangement shown as one example, top surface 132 of side members 92 angles upward as it nears front end 136 and tab 144 meets top surface 132 at front end 136 and extends at a flat angle such that tab 144 is generally parallel with the majority of top surface 132 (i.e., the non-angled portions of top surface 132). Because tab 144 meets top surface 132 after top surface 132 angles upward, when front member 90 and side members 92 are brought together, tab 144 is located higher than the top surface 96 of front member 90. In this way, tab 144 extends a distance past back surface 102 of front member 90 and over top surface 96 of front member 90. In the arrangement shown, as one example, tab 144 extends a distance past back surface 102 such that an opening 152 of tab 144 aligns with slots 116 of front member 90. When opening 152 is in alignment with slots 116 of front member 90, fasteners 118 may be extended through opening 152 of tab 144 and slots 116. With fasteners 118 extending through openings 152 of tab 144 of side members 92 and through slots 116 of front member 90, side members 92 and front member 90 are operably connected. If a user desires to laterally adjust side members 92, the user can loosen fasteners 118 and move side members 92 to the desired position, then tighten fasteners 118 again. In this way, tab 144 helps facilitate operable engagement between side members 92 and front member 90 while still allowing for easy lateral adjustment of side members 92.

In the arrangement shown, as one example, with side members 92 connected to front member 90, cutting member 30 is ready to be placed on sled 28. Side members 92 are configured to facilitate secured engagement and support of cutting member 30 for a user to safely perform a cutting operation. In the arrangement shown, as one example, cutting member 30 is configured to rest on a second surface 146 of side members 92. Second surface 146 is formed of any suitable size, shape, and design and is configured to provide support to cutting member 30. In arrangement shown, as one example, second surface 146 sits slightly lower than top surface 132 of side members 92, forming a ridge 154 where top surface 132 ends and second surface 146 begins. In this arrangement, ridge 154 helps the user properly place and position cutting member on second surface 146.

In the arrangement shown, as one example, second surface 146 includes a grip strip 156. Grip strip 156 is formed of any suitable size, shape, design, and material and is configured to prevent cutting member 30 from slipping. In the arrangement shown, as one example, there are two grip strips 156 on each side member 92, with one grip strip 156 beginning near the front end 136 of side member 92 and terminating near midpoint 140 of side member 92, and the second grip strip 156 beginning near midpoint 140 and terminating near back end 138 of side member 92. In the arrangement shown, as one example, each grip strip is generally rectangular in shape. While in the arrangement shown, as one example, there are two rectangular grip strips 156 on each side member 92, the embodiment is not so limited. In an alternative arrangement, there may be a singular grip strip 156 on each side member 92, with the single grip strip 156 extending from near the front end 136 to near back end 138 of side member 92. In another alternative arrangement, there may be additional grip strips 156 which may take on any shape or design, such as three, four, five, six, or more grip strips 156 which are generally in the shape of a square, rectangle, oval, circle, triangle, or any other shape, and each grip strip 156 may have the same size or vary in size.

In the arrangement shown, as one example, grip strips 156 are formed of a thermoplastic elastomer (TPE) material which has a high coefficient of friction that helps hold cutting member 30 in place while a cutting operation is being performed. While a TPE material is used in the arrangement shown, as one example, any other material having a relatively higher coefficient of friction may be used to form grip strips 156 to help hold cutting member 30 in place while a cutting operation is being performed, and such other materials having a relatively higher coefficient of friction are hereby contemplated for use.

In addition to grip strips 156, side members 92 include attachment members 148 to help facilitate secured engagement of cutting member. Attachment members 148 are formed of any suitable size, shape, and design and are configured to facilitate secured engagement a base plate 174 of cutting member 30 to side members 92. In the arrangement shown, as one example, attachment members 148 are each a generally oval member formed of a non-metallic material and includes a clamping bolt 158, and slot 160, and a fastener 162. In the arrangement shown, as one example, there are two attachment members 148 on each side member 92, however any other number of attachment members 148 may be used and are hereby contemplated for use, including one, two, three, four, five, six, or any other number of attachment members 148. Additionally, while attachment members 148 are formed primarily of a non-metallic material, a metallic material may be used to primarily form attachment members 148 and are hereby contemplated for use. Finally, while attachment members 148 are described according to the embodiment shown, as one example, including clamping bolt 158, slot 160, and fastener 162, attachment members 148 may be formed of any other size, shape, and design to facilitate secured engagement of base plate 174 of cutting members 30 to side members 92.

In the arrangement shown, as one example, attachment members 148 include a clamping bolt 158. Clamping bolt 158 may be formed of any suitable size, shape, and design and is configured to force the base plate 174 of cutting member 30 into tight engagement with second surface 146, and more specifically, grip strips 156 on second surface 146. In the arrangement shown, as one example, clamping bolt 158 is threaded through attachment member 148. In this way, clamping bolt 158 can be loosened or tightened by partially screwing or unscrewing clamping bolt 158. If a user desires to attach cutting member 30 to sled 28, the user can place and adjust each side member 92 to a desired position, place cutting member 30 on top of second surface 146 of side members 92, and tighten clamping bolt 158, thereby forcing the base plate 174 of cutting member 30 into secured engagement with grip strips 156 of second surface 146 of side members 92.

In the arrangement shown, as one example, attachment members 148 are adjustable inward and outward relative to side members 92, attachment members 148 are pivotable about a vertical axis (not shown), and adjustment members 148 are adjustable along a length of side members 92. In the arrangement shown, as one example, attachment members 148 include a slot 160. Slot 160 is formed of any suitable size, shape, and design and is configured to allow attachment members 148 to move inward and outward relative to side members 92, as well as pivot about a vertical axis. In the arrangement shown, as one example, slot 160 is generally ovular or elongated in shape. In this arrangement, attachment members 148 may move inward and outward relative to side members 92 along a length of slot 160. In the arrangement shown, as one example, fastener 162 extends through slot 160 providing connection with side members 92 while simultaneously providing the vertical axis about which attachment members 148 can rotate.

In the arrangement shown, as one example, attachment members 148 include fastener 162. Fastener 162 is formed of any suitable size, shape, and design and is configured to connect attachment members 148 to side members 92, provide a vertical axis about which attachment members 148 may pivot, and facilitate adjustment of attachment members 148 along a length of side members 92. In the arrangement shown, as one example, fastener 162 is formed of a bolt and a nut, however any other fastener may be used in order as fastener 162 and is hereby contemplated for use. In the arrangement shown, as one example, the bolt of fastener 162 extends through slot 160 of attachment member 148 and through slot 164 of side members 92. In this arrangement, the nut of fastener 162 is provided below the bottom surface 134 of side members 92 and the bolt of fastener 162 is threated into the nut of fastener 162.

In the arrangement shown, as one example, utilizing attachment member 148, including clamping bolt 158, slot 160, and fastener 162, a user can secure virtually any cutting member 30 to side member 92 because attachment members 148 is adjustable in multiple directions and pivotable. For example, if the user desires to attach a cutting member 30 to sled 28, the user can laterally adjust side members 92 to the proper position and place the base plate 174 of cutting member 30 onto second surface 146. Next, the user can position attachment members 148 at the appropriate location along a length of side members 92 by loosening fastener 162, moving fastener 162 (and attachment members 148) along a length of side members 92 within slots 164, and then tighten fastener 162 when attachment member 148 is in the desired position. If the user wants to pivot attachment member 148 to ensure proper positioning of clamping bolt 158 on base plate 174 of cutting member 30, the user can loosen fastener 162, pivot attachment member 148 so clamping bolt 158 is in the desired position, and then tighten fastener 162 again. Finally, if the user desires to adjust attachment member 148 inward and outward relative to side member 92 to ensure clamping bolt 158 is in the proper position, the user can loosen fastener 162, move attachment member 148 along a length of slot 160, and then tighten fastener 162 when clamping bolt 158 is in the proper position. Once attachment members 148, and more specifically clamping bolts 158, are in the desired positions and fasteners 162 are tightened, the user can tighten clamping bolts 158 until clamping bolts 158 have forced base plate 174 of cutting member 30 into secured engagement with second surface 146. With cutting member 30 in secure engagement with second surface 146 of side members 92, the user can perform a cutting operation.

Open Space: In the arrangement shown, as one example, an open space 94 is present between the pair of side members 92. Open space 94 will vary in size depending on the relative positions of each side member 92. Open space 94 allows a blade 172 of cutting member 30 to extend below the bottom side 82 of sled 28 to perform a cutting operation using system 10. In the arrangement shown, as one example, with the guide arm 24, rail 26, sled 28, and cutting member operably connected to one another, blade 172 of cutting member extends below the bottom side of sled 28. When system 10 is placed such that guide arm 24 is placed adjacent the edge of a workpiece 170 and rail 26 is positioned on top of the workpiece 170, sled 28 is also on top of the workpiece 170 but the blade 172 of cutting member extends from above the second surface 146 of sled 28, through open space 94, and below the bottom of workpiece 170 and can be utilized to cut workpiece 170.

Additionally, open space 94 allows cutting member 30 to perform a bevel cut while utilizing system 10. Because sled 28 includes open space 94, the blade 172 of cutting member 30 may be placed at any position and at any angle, so long as it is within open space 94. Open space 94 provides the space necessary to place the blade 172 of cutting member at an angled position such that a bevel cut can be performed. Finally, open space 94, coupled with the lateral adjustability of side members 92, allows sled 28 to facilitate secured engagement of various cutting members 30. Cutting members 30 come in various sizes, shape, designs, and configurations, and even cutting members 30 of the same type have base plates which vary in size and shape. Because sled 28 contains adjustable side members 92 and open space 94, system 10 can accommodate cutting members 30 of various sizes, shapes, designs, configurations, and types.

While sled 28 has been described according to the arrangement shown, as one example, it will be understood by those skilled in the art that any other configuration of sled 28 may be used in order to facilitate engagement with rail 26 and facilitate attachment and support of a cutting member 30 to system 10 and its various components.

Assembly and Operation:

With reference to the arrangement shown, as one example, the assembly and operation of system 10 is described. It will be apparent to one skilled in the art that assembly of system 10 may be performed in various orders without departing from the scope of the disclosure. The order of assembly, and the steps and order of operation of system 10, described below is simply an example and shall not be taken as limiting the scope of the disclosure described herein.

Guide Arm and Rail Connection: In operation, system 10 can be utilized to perform a straight, accurate, and safe cutting operation. In various different arrangements, guide arm 24 may be connected to rail 26 using various methods or means. In the arrangement shown, as one example, guide arm 24 is connected to rail 26 by aligning the openings 62 of rail 26 with alignment features 44 and connection openings 46 of guide arm 24 and placing rail 26 on top of guide arm 24. When the user places rail 26 on top of guide arm 24, alignment features 44 will pass through the two openings 62 of rail 26 which align with alignment features 44. The user will then thread fasteners 48 through the remaining two openings 62 and into and at least partially through connection openings 46 of guide arm 24, thereby connecting rail 26 to guide arm 24.

Sled Assembly: In one or more arrangements, the various components of sled 28 are also be assembled. In the arrangement shown, as one example, front member 90 includes locking member 108, having a selector 120, a wedge 122, and a bolt 124. Selector 120 of locking member 108 is positioned above the top surface 96 of front member 90 and in alignment with locking member opening 126 of front member 90. Wedge 122 is then positioned below and within feature 106 of front member 90 and in alignment with selector 120 and locking member opening 126. The user then threads bolt 124 through the bottom of wedge 122, through locking member openings 126, and into selector 120, thus assembling locking member 108.

Next, the user can then attach side members 92 to front member 90. In the arrangement shown, as one example, the user will start with a side member 92 on a side 88 of front member 90. The user aligns a protrusion 114 of front member 90 with recess 142 of side member 92 and then slide side member 92 such that protrusion 114 is inserted into recess 142. Once this is completed, the user can align the opening 152 of tab 144 with a slot 116 or front member 90 and insert fastener 118 into opening 152, thread fastener 118 through opening 152, and then thread fastener 118 into and through slot 116. With protrusion 114 within recess 142 and fastener 118 extending through opening 152 and at least partially through slot 116, side member 92 is operably connected to front member 90. The user can then repeat this process for the second side member 92 on the other side 88 of front member 90.

With side members 92 connected to front member 90, the user can then operably connect attachment members 148 to side members. First, the user will place and align attachment members 148 above top surface 132 of side member 92 and align a portion of slot 160 of attachment member 148 with a portion of a slot 164 of side member 92. With a portion of slot 160 and a portion of slot 164 aligned, the user can install fastener 162 by passing bolt of fastener 162 through slot 160 and then through slot 164 to the bottom surface 134 of side member 92 and threading the nut of fastener 162 onto the bolt of fastener 162 until the nut is tight against bottom surface 134 of side member 92. With fastener 162 securely connecting attachment member 148 to side members 92, clamping bolt 158 can then be threaded through attachment member 148, thus completing operably connection of attachment member 148 to side member 92. This process is then repeated for each alignment member 148, whether that be one, two, three, four, or more alignment members 148.

Sled and Rail Connection: With the various components of the sled assembled, sled 28 can be operably connected to rail 26. With locking member 108 of front member 90 of sled 28 in the unlocked position, sled 28 can be positioned on either end 58 of rail 26. Feature 106 of front member 90 is positioned to be aligned with feature 66 of rail 26 such that feature 66 will slide into feature 106 and wedge 122 of locking member 108 will slide into the hollow center 74 of feature 66. Once properly aligned, the user can slide sled 28 such that feature 106 of front member 90 slides over feature 66 of rail 26 and wedge 122 of locking member 108 slides into the hollow center 74 of feature 66. At this point, sled 28 is operably connected to rail 26 and in an unlocked position. Rail 26 may have been connected to guide arm 24 previously, or it may not be connected to guide arm 24 according to the assembly steps presented herein.

Cutting Member Attachment: With sled 28 operably connected to rail 26 and guide arm 24, cutting member 30 can be placed on and attached and secured to sled 28. First, the user will select the cutting member 30 and determine the appropriate positions of each side member 92 to ensure secure connection with the base plate 174 of cutting member 30. The user can then laterally adjust side members 92 along a length of slots 116 of front member 90 until each side member 92 is in the desired position. The user can then test placement of side member 92 by placing cutting member 30 onto side member 92. If the base plate 174 of cutting member 30 is not securely resting on the second surface 146 of each of the side member 92, then user can individually adjust one or both side members 92 appropriately to ensure base place 174 is securely resting on second surface 146 of side members 92.

With side members 92 properly positioned and base plate 174 resting securely on the second surface 146 of each side member 92 the user can adjust attachment members 148 to their appropriate positions. The user can move attachment members 148 forwards or backwards relative to the cutting member 30 by slightly loosening fastener 162 and moving attachment member 148 a length along slot 164 on top surface 132 of side members 92. The user can also adjust the lateral position of attachment member 148 by moving attachment member 148 along a length of slot 160 until attachment member 148 is in the desired position. Additionally, the user can pivot attachment member 148 about a vertical access created by fastener 162 to a desired position on the base plate 174 of cutting member 30. Once the user has adjusted attachment member 148 to the desired position, the user can tighten clamping bolt 158. By tightening clamping bolt 158, clamping bolt 158 will lower, contact base plate 174, and lower an additional distance to make sure base place 174 is securely engaged with second surface 146 of side member 92. The user can repeat this process for each attachment member 148 of system 10. Once clamping bolts 158 of attachment members 148 are tightened to securely hold base plate 174 in engagement with second surface 146 of each side member 92, system 10 is assembled and ready to perform a cutting operation.

In Operation: With the various components of system 10 assembled, system 10 can be utilized to perform an accurate, safe, easy, and precise cutting operation. First, the user selects a workpiece 170 to be cut. The user then places workpiece 170 on a cutting surface and determines a desired cutting line. Next, system 10 is placed on the workpiece such that a side 40 of guide arm 24 is directly adjacent a side 176 of workpiece 170 and rail 26 rests on top of workpiece 170, with the rear edge 56 of rail 26 preferably in alignment with the back edge 178 of workpiece 170. In this position, a majority of the side members 92 of sled 28 will be off the workpiece and the blade 172 of cutting member 30 will be behind the workpiece 170 and extending through open space 94 of sled 28 and extend from at or near the top of workpiece 170 to at or below the bottom of workpiece 170.

At this point, the user can adjust the position of sled 28 such that blade 172 will cut along the desired cutting line. To do this, locking member 108 should be placed in an unlocked position, if not in the unlocked position already, by rotating selector 120 of locking member 108 to the unlocked position. In the unlocked position, wedge 122 of locking member 108 rests within the hollow center 74 of feature 66 of rail 26 and sled 28 is movable along a length of rail 26. The user can utilize any combination of indicia 64 of rail 26, indicia 128 of front member 90, and alignment member 130 to properly align the edge of blade 172 of cutting member with the desired cutting line.

Once blade 172 is properly aligned with the desired cutting line, the user can lock locking member 108 by rotating selector 120 to the locked position. When the user rotates selector 120, wedge 122 also rotates. The width of wedge 122 differs depending on the orientation of wedge 122. When wedge 122 is in the unlocked position, the width of wedge 122 is narrower and fits within the hollow center 74 of feature 66. When wedge 122 is in the locked position, the width of the now-rotated wedge 122 is wider and tightly engages side walls 68 of feature 66. When wedge 122 is rotated to the locked position and tightly engages side walls 68, wedge 122 is locked in that position and sled 28 can no longer move along a length of rail 26. With blade 172 in alignment with the desired cutting line and sled 28 locked and no longer able to move along a length of rail 26, the user can perform the cutting operation by starting the cutting member 30, holding onto handle 42 of guide arm 24, and moving cutting member 30 and guide arm 24 forward, thereby cutting workpiece 170 along the desired cutting line.

Alternative Arrangement:

An alternative arrangement of system 10 is presented herein. In the alternative arrangement shown, as one example, system 10 has a forward end 12, a rearward end 14, opposing left and right sides 16 (or simply "sides 16"), a top side 20, and a bottom side 22. In the alternative arrangement shown, as one example, system 10 includes a guide arm 200, a rail 202, and a pair of side members 204, among other components as described herein. While this alternative arrangement of system 10 has been described according to the alternative arrangement shown, as one example, any other combination or arrangement may be used and is hereby contemplated for use.

Guide Arm:

In the arrangement shown, as one example, system 10 includes a guide arm 200. Guide arm 200 is formed of any suitable size, shape, and design and is configured to facilitate movement of system 10 and the cutting operation of workpiece 170. In the arrangement shown, as one example, guide arm 200 has a top surface 208, a bottom surface 210, a front edge 212, a rear edge 214, and opposing left and right sides 216 (or simply "sides 216"). In the arrangement shown, as one example, guide arm 200 includes a handle 220 formed of an opening 222 and a connection member 224 formed of alignment features 226, an opening 228 and a fastener 230.

In the arrangement shown as one example, guide arm 200 is formed of a single, unitary member that is formed in a manufacturing process such as molding, machining, extrusion, forming, additive manufacturing, or the like to form a unitary and monolithic member. Alternatively, guide arm 200 may be formed of multiple pieces that are connected or assembled to one another through bolting, screwing, adhesion, friction fitting, or the like. In the arrangement shown, as one example, guide arm 200 is formed primarily of a non-metallic material such as a plastic material, a fiberglass material, or any other non-metallic material and/or composite thereof. Alternatively, guide arm 200 may be formed of a metallic material such as steel, aluminum, chromium, or any other metallic material, alloy, and/or composite thereof. In the arrangement shown, as one example, when viewed from top side 20, guide arm 200 has a generally rectangular main portion with connection member 224 extending outward from a side 216 of guide arm 200.

In the arrangement shown, as one example, at least one of the sides 216 generally forms a straight edge. In certain uses, a side 216 is placed against the edge of a workpiece 170. In this manner, side 216 aligns guide arm 200, and system 10, with the edge of a workpiece 170 and moves along the edge of the workpiece 170 while a cutting operation is being performed.

In the arrangement shown, as one example, guide arm 200 includes handle 220. Handle 220 is formed of any suitable size, shape, and design and is configured to allow a user to grasp and hold guide arm 200 before, during, and after a cutting operation. In the arrangement shown, as one example, handle 220 is formed of an opening 222 in guide arm 200. In the arrangement shown, as one example, opening 222 is an elongated area towards the middle of guide arm 200 which is formed either in the molding process or by machining away material from guide arm 200. With opening 222 in the general middle of guide arm 200, there is still a portion of guide arm 200 present between opening 222 and each side 216 and this still remaining material constitutes handle 220 in this arrangement, as one example. In this arrangement, as one example, guide arm 200 can be utilized with both left-handed saws and right-handed saws and/or on the right or left side of workpiece 170 without having to adjust the position of handle 220 to ensure proper placement of guide arm 200 in relation to the workpiece 170. While handle 220 is formed in the example arrangement, as one example, handle 220 may be formed in any manner including, but not limited to, adding a knob or a pull handle to guide arm 200.

In the arrangement shown, as one example, guide arm 200 includes connection member 224. Connection member 224 is formed of any suitable size, shape, and design and is configured to facilitate the proper alignment and engagement of rail 202 with guide arm 200. In the arrangement shown, as one example, connection member 224 includes alignment features 226, an opening 228, and a fastener 230. In the arrangement shown, as one example, connection member 224 is a generally rectangular member which extends outward from a side 216 of guide arm 200.

In the arrangement shown, as one example, alignment feature 226 is node 234, which is a protrusion that extends above the surface of connection member 224. In the arrangement shown, as one example, node 234 is a protrusion arising from the top of connection member 224. In the arrangement shown, as one example, connection member 224 also includes opening 228 which is formed of any suitable size, shape, and design and is configured to receive fastener 230. In the arrangement shown, as one example, opening 228 is a cylindrical opening and fastener 230 is a bolt, however fastener 230 is not so limited. Fastener 230 may be formed of any suitable size, shape, and design and is configured to facilitate secured connection between guide arm 200 and rail 202, and opening 228 may be any shape, size, and configuration to accommodate fastener 230.

The above arrangement of connection member 224 is the typical arrangement used when the user desires to make a cut along a straight line. When making a straight cut, the guide arm 200 is positioned adjacent a side 176 of workpiece 170 and the bottom surface 210 of guide arm 200 rests below the top of workpiece 170. In this arrangement, the connection of rail 202 to connection member 224 as described above is such that rail 202 extends a distance above the workpiece 170, and that distance corresponds to the thickness of side members 204. In other words, when rail 202 is connected to the above-described connection member 224 and guide arm 200 is positioned adjacent the side 176 of workpiece 170, the bottom of side members 204 rest on top of workpiece 170 and rail 202 is positioned such that it properly extends through first opening 286 of feature 268 of side members 204.

In an alternative arrangement of connection member 224, as one example, alignment features 226 include a recess 232 within connection member 224. Recess 232 is present in the top surface of connection member 224 and extends a distance inward from the inner edge 236 of connection member 224. In the arrangement shown, as one example, alignment features 226 also include node 234 present within recess 232. In the arrangement shown, as one example, node 234 is a protrusion arising from the bottom of recess 232 in a generally cylindrical shape. In the arrangement shown, as one example, recess 232 also includes opening 228. Opening 228 is formed of any suitable size, shape, and design and is configured to receive fastener 230. In the arrangement shown, as one example, opening 228 is a cylindrical opening and fastener 230 is a bolt. However, fastener 230 is not so limited as fastener 230 may be formed of any suitable size, shape, and design and is configured to facilitate secured connection between guide arm 200 and rail 202.

Recess 232 is typically present in connection member 224 when the user desires to make a circular cut using system 10. When making a circular cut, guide arm 200, and more specifically the bottom surface 210 of guide arm 200, rests on top of workpiece 170 unlike when making a straight cut. If connection member 224 did not included recess 232, when making a circle cut rail 202 would extend a distance above the top of workpiece 170 that is more than the thickness of side members 204, which would lead to either an unsafe or an inaccurate cut because either: 1) the user will try to rest the bottom surface 258 of side members 204 on the top of workpiece 170, which will place rail 202 and blade 172 of cutting member 30 at an angle leading to an inaccurate cut; or 2) the user will try to make the cut without resting the bottom surface 258 of side members 204 on top of workpiece 170, which is unsafe and could lead to inaccurate cutting as well. In view of this, an alternative arrangement of guide arm 200 includes connection member 224 having recess 232. Recess 232 places rail 202 at an appropriate height when guide arm 200 is resting on top of workpiece 170. That is, rail 202 is positioned at a height which allows bottom surface 258 of side members 204 to rest properly on the top of workpiece 170 and rail 202 will extend properly through first opening 286 of feature 268 of side members 204, meaning rail 202 and blade 172 of cutting member 30 will not be at an angle when performing a cutting operation, and user will not have to perform the cutting operation in an unsafe manner to get an accurate cut.

While guide arm 200 has been described according the alternative arrangement shown, as one example, it will be understood by those skilled in the art that any other configuration of guide arm 200 may be used in order to facilitate movement of system 10 and the cutting operation of workpiece 170.

Rail:

In the alternative arrangement shown, as one example, system 10 includes a rail 202. Rail 202 is formed of any suitable size, shape, and design and is configured to operably connect to side members 204 and facilitate proper alignment of side members 204 to perform an accurate and precise cutting operation. In the arrangement shown, as one example, rail 202 has a top surface 240, a bottom surface 242, front and rear edges 244 (or simply "edges 244"), and opposing left and right ends 246 (or simply "ends 246"). In the arrangement shown, as one example, rail 26 includes openings 250 and indicia 252.

In the arrangement shown as one example, rail 202 is formed of a single, unitary member that is formed in a manufacturing process such as extrusion, machining, forming, molding, additive manufacturing, or the like to form a unitary and monolithic member. Alternatively, rail 202 may be formed of multiple pieces that are connected or assembled to one another through bolting, screwing, adhesion, friction fitting, or the like. In the arrangement shown, as one example, rail 202 is formed primarily of a non-metallic material such as a plastic material, a fiberglass material, or any other non-metallic material and/or composite thereof. Alternatively, rail 202 may be formed of a metallic material such as steel, aluminum, chromium, or any other metallic material, alloy, and/or composite thereof.

In the arrangement shown, as one example, when viewed from top side 240, rail 202 is generally rectangular in shape, with the edges 244 extending in approximate parallel planar spaced relation to one another and in approximate perpendicular planar relation to each end 246. In the arrangement shown, as one example, when viewed from either end 246, rail 202 is generally rectangular in shape, with top surface 240 and bottom surface 242 extending in approximate parallel planar spaced relation to one another and in approximate perpendicular planar relation to edges 244. In the arrangement shown, as one example, when viewed from an edge 244, rail 202 is generally rectangular in shape, with top surface 240 and bottom surface 242 extending in approximate parallel planar spaced relation to one another and in approximate perpendicular planar relation to each end 246.

In the arrangement shown, as one example, rail 202 includes openings 250. Openings 250 are formed of any suitable size, shape, and design and are configured to facilitate proper alignment and secure engagement of rail 202 and guide arm 200. In the arrangement shown, as one example, openings 250 are positioned near an end 246 of rail 202. In the arrangement shown, as one example, openings 250 are generally circular in shape. In the arrangement shown, as one example, there are two openings 250, with one opening 250 configured to align with and receive node 234 of guide arm connection member 224 of guide arm 200, and the remaining opening 250 configured to allow fastener 230 of connection member 224 of guide arm 200 to pass through and enter opening 228 of connection member 224 of guide arm 200. While the arrangement shown, as one example, depicts two openings 250, any number of openings 250 may be present, including zero, one, two, three, four, five, six, seven, eight, nine, ten, or any other number of openings 250, and openings 250 may be formed of any size, shape, and configuration, including square, rectangular, ovular, triangular, or any other shape. Further, in alternative arrangements, openings 250 may not be necessary depending on the mechanism or method used to facilitate engagement between guide arm 200 and rail 202.

In the arrangement shown, as one example, rail 202 includes indicia 252. Indicia 252 can be any visual indication of distance from a predetermined point to help the user accurately cut a workpiece 170. In the arrangement shown, as one example, indicia 252 are positioned on the top surface 240 of rail 202 and are visible to the user when performing a cutting operation using this alternative arrangement of system 10. In the arrangement shown, as one example, indicia 252 shows the distance from the edge of a workpiece 170 (which corresponds to a side 216 of guide arm 200) if making a straight cut, or indicia 252 shows the radius of a circle if making a circular cut, so the user can accurately align side members 204 and cutting member 30 with the indicia 252 corresponding to the desired size or radius. Indicia 252 may be in metric units such as, by way of example and not limitation, centimeters or millimeters, or in imperial measurements such as, by way of example and not limitation, inches or feet.

While rail 202 has been described according to the arrangement shown, as one example, it will be understood by those skilled in the art that any other configuration of rail 202 may be used in order to operably connect to side members 204 and facilitate proper alignment of side members 204 in order to perform an accurate and precise cutting operation.

Side Members:

In the arrangement shown, as one example, the alternative arrangement of system 10 includes side members 204. Side members 204 are formed of any suitable size, shape, and design and are configured to operably connect to rail 202 and facilitate attachment and support of a cutting member 30 to system 10. In the arrangement shown, as one example, side members 204 have a top surface 256, a bottom side 258, a front end 260, a back end 262, an outer side 264, and an inner side 266. In the arrangement shown, as one example, side members 204 include a feature 268, a guide cursor 270, locking member 272, a second surface 274, attachment members 276, and slots 278.

In the arrangement shown as one example, side members 204 are formed primarily of single, unitary member that is formed in a manufacturing process such as extrusion, machining, forming, molding, additive manufacturing, or the like to form a unitary and monolithic member. Alternatively, side members 92 may be formed of multiple pieces that are connected or assembled to one another through adhesion, bolting, screwing, welding, friction fitting, or the like. In the arrangement shown, as one example, side members 204 are formed primarily of a non-metallic material such as a plastic material, a fiberglass material, or any other non-metallic material and/or composite thereof. Alternatively, side members 204 may be formed of a metallic material such as steel, aluminum, chromium, or any other metallic material, alloy, and/or composite thereof.

In the arrangement shown, as one example, when viewed from top side 20 of system side members 204 are generally rectangular in shape with a slight taper as the outer side 264 of side members 204 extends from front end 260 to back end 262. In the arrangement shown, as one example, when viewed from either side 16 of system 10, side members 204 are primarily rectangular in shape with top surface 256 generally extending in parallel planar spaced relation to bottom surface 258 and generally perpendicular to front end 260 and back end 262. In this view, while side members 204 are primarily rectangular in shape, back end 262 includes a chamfered edge where back end 262 meets top surface 256. Additionally, in this arrangement as one example, top surface 256 of side members 204 has a slight incline near front end 260 which leads to feature 268. In the arrangement shown, as an example, the right side member 204 is a mirror image of the left side member 204.

Feature: In the arrangement shown, as one example, side members 204 include feature 268. Feature 268 is formed of any suitable size, shape, and design and is configured to operably connect side members 204 to rail 202. In the arrangement shown, as one example, feature 268 includes a top wall 280 with openings 282, side walls 284 with a first opening 286 and a second opening 287, support members 288, and a hollow interior 290. In this alternative arrangement, shown as one example, feature 268 is configured to provide openings (specifically, first opening 286 of side walls 284) through which rail 202 is passed. In this way, side members 204 are operably connected to rail 202 through feature 268 such that side members 204 may be securely engaged with rail 202 while being adjustable along a length of rail 202.

In the arrangement shown, as one example, top wall 280 of feature 268 connects to the top surface 256 following the slight incline in top surface 256 near front end 260. In the arrangement shown, top wall 280 extends in planar fashion and is generally in parallel planar spaced alignment with the majority of top surface 256 (i.e., the portion of top surface 256 which is not at an incline). In the arrangement shown, as one example, top wall 280 includes openings 282 to view inside feature 268 and make sure rail 202 is properly extending through feature 268.

In the arrangement shown, as one example, feature 268 includes side walls 284. Side walls 284 are generally planar members with one side wall 284 positioned on each side of feature 268. In the arrangement shown, as one example, one side wall 284 is generally in parallel planar spaced alignment with inner side 266 of side members 204 and the other side wall 284 is in generally parallel planar spaced alignment with the first side wall 284. In the arrangement shown, as one example, side walls 284 include a first opening 286 and a second opening 287. First opening 286 is formed of any suitable size, shape, and design and is configured to allow rail 202 to pass through first opening 286. In the arrangement shown, as one example, first opening 286 is generally rectangular in shape and corresponds in size to rail 202, however first opening 286 may be any other size, shape, and design which allows rail 202 to pass therethrough. Second opening 287 is formed of any suitable size, shape, and design and is configured to allow guide cursor 270 to pass through second opening 287. In the arrangement shown, as one example, second opening 287 is generally rectangular in shape and corresponds in size to guide cursor 270, however second opening 287 may be any other size, shape, and design which allows guide cursor 270 to pass therethrough.

In the arrangement shown, as one example, feature 268 includes support members 288 within the hollow interior 290 of feature 268. Support members 288 are formed of any suitable size, shape, and design and are configured to support rail 202 and guide cursor 270 as they are passed through the hollow interior 290 of feature 268. In other words, support members 288 help align rail 202 and guide cursor 270 as they pass through hollow interior 290 of feature 268 to ensure rail 202 and guide cursor 270 are properly passed through feature 268.

Guide Cursor: In the arrangement shown, as one example, side members 204 include guide cursor 270. Guide cursor 270 is formed of any suitable size, shape, and design and is configured to help a user align the blade 172 of cutting member 30 with the desired cutting line or cutting position. In the arrangement shown, as one example, guide cursor 270 is a relatively thin and narrow, elongated rectangular member which tapers off at one end. In the arrangement shown, as one example, then end which tapers off comes to an edge which is meant to align with blade 172 of cutting member 30, and with the indicia 252 which corresponds to the desired cutting line or cutting radius.

By way of example, in the alternative arrangement shown, as one example, a user connects rail 202 to a pair of side members 204 by inserting rail 202 through the first opening 286 of each side wall 284 of feature 268 on each of the pair of side members 204. Once rail 202 has been insert, the user will then insert guide cursor 270 through the second opening 287 in each side wall 284 for one of the side members 204. The user will then use indicia 252 to position each side member 204 individually and then, when each side member 204 is at its desired position, the user will place cutting member 30 on side members 204. The user can align guide cursor 270 to the edge of blade 172 and then check to ensure guide cursor 270 is aligned with the indicia 252 on rail 202 which corresponds to the desired cutting line or cutting radius. In this way, guide cursor 270 helps the user align the blade 172 of cutting member 30 with the desired cutting line or cutting position. Once blade 172 (and guide cursor 270) are properly aligned, the side members 204 can be locked in place.

Locking Member: In the arrangement shown, as one example, side members 204 include locking member 272. Locking member 272 is formed of any suitable size, shape, and design and is configured to facilitate secured engagement between rail 202 and side members 204 such that side members 204 may no longer move along a length of rail 202. In the arrangement shown, as one example, locking member 272 is a thumb screw, however any other type of bolt, screw, or fastener of any type may be utilized to facilitate secured engagement between rail 202 and side members 204. In the arrangement shown, as one example, locking member 272 is configured to be inserted through an opening (not shown) in front end 260 and into a portion of the hollow interior 290 of feature 268.

In the alternative arrangement shown, as one example, when rail 202 is inserted through feature 268 and the user has properly positioned side members 204, the user then tightens locking member 272 by threading it until it contacts rail 202 and forces rail 202 into secured engagement within close and tight tolerances with side members 204. With locking member 272 forcing rail 202 into tight engagement with feature 268 of side members 204, side members 204 are secured engaged with rail 202 and the user can safely and accurately perform a cutting operation, but only once cutting member 30 is properly secured to side members 204.

Second Surface: Side members 204 are configured to facilitate secured engagement and support of cutting member 30 for a user to safely perform a cutting operation. In the arrangement shown, as one example, cutting member 30 is configured to rest on a second surface 274 of side members 204. Second surface 274 is formed of any suitable size, shape, and design and is configured to provide support to cutting member 30. In arrangement shown, as one example, second surface 274 sits slightly lower than top surface 256 of side members 204, forming a ridge 292 where top surface 256 ends and second surface 274 begins. In this arrangement, ridge 292 helps the user properly place and position cutting member 30 on second surface 274.

In the arrangement shown, as one example, second surface 274 includes a grip strip 294. Grip strip 294 is formed of any suitable size, shape, design, and material and is configured to prevent cutting member 30 from slipping. In the arrangement shown, as one example, grip strip 294 is generally rectangular in shape. While in the arrangement shown, as one example, there are one rectangular grip strips 294 on each side member 204, the embodiment is not so limited. In an alternative arrangement, there may be additional grip strips 294 which may take on any shape or design, such as two, three, four, five, six, or more grip strips 294 which are generally in the shape of a square, rectangle, oval, circle, triangle, or any other shape, and each grip strip 294 may have the same size or vary in size.

In the arrangement shown, as one example, grip strips 294 are formed of a thermoplastic elastomer (TPE) material which has a high coefficient of friction that helps hold cutting member 30 in place while a cutting operation is being performed. While a TPE material is used in the arrangement shown, as one example, any other material having a relatively higher coefficient of friction may be used to form grip strips 294 to help hold cutting member 30 in place while a cutting operation is being performed, and such other materials having a relatively higher coefficient of friction are hereby contemplated for use.

Attachment Members: In addition to grip strips 294, side members 204 include attachment members 276 to help facilitate secured engagement of cutting member. Attachment members 276 are formed of any suitable size, shape, and design and are configured to facilitate secured engagement of a base plate 174 of cutting member 30 to side members 204. In the arrangement shown, as one example, attachment members 276 are generally oval members formed of a non-metallic material and includes clamping bolts 296 and slots 298, and fasteners 300. In the arrangement shown, as one example, there is one attachment member 276 on each side member 204, however any other number of attachment members 276 may be used and are hereby contemplated for use, including one, two, three, four, five, six, or any other number of attachment members 276. Additionally, while attachment members 276 are formed primarily of a non-metallic material, a metallic material may be used to primarily form attachment members 276 and are hereby contemplated for use. Finally, while attachment members 276 are described according to the embodiment shown, as one example, including clamping bolt 296, slot 298, and fastener 300, attachment members 276 may be formed of any other size, shape, and design in order to facilitate secured engagement of base plate 174 of cutting members 30 to side members 92.

In the arrangement shown, as one example, attachment members 276 include a clamping bolt 296. Clamping bolt 296 may be formed of any suitable size, shape, and design and is configured to force the base plate 174 of cutting member 30 into tight engagement with second surface 274, and more specifically, grip strip 294 on second surface 274. In the arrangement shown, as one example, clamping bolt 296 is threaded through attachment member 276. In this way, clamping bolt 296 can be loosened or tightened by partially screwing or unscrewing clamping bolt 296. If a user desires to attach cutting member 30 to side members 204, the user can place and adjust each side member 204 to a desired position, place cutting member 30 on top of second surface 274 of side members 204, and tighten clamping bolt 296, thereby forcing the base plate 174 of cutting member 30 into secured engagement with grip strips 294 of second surface 274 of side members 204.

In the arrangement shown, as one example, attachment members 276 are adjustable inward and outward relative to side members 204, attachment members 276 are pivotable about a vertical axis (not shown), and adjustment members 276 are adjustable along a length of side members 204. In the arrangement shown, as one example, attachment members 276 include a slot 298. Slot 298 is formed of any suitable size, shape, and design and is configured to allow attachment members 276 to move inward and outward relative to side members 204, as well as pivot about a vertical axis. In the arrangement shown, as one example, slot 298 is generally ovular or elongated in shape. In this arrangement, attachment members 276 may move inward and outward relative to side members 204 along a length of slot 298. In the arrangement shown, as one example, fastener 300 extends through slot 298, providing connection with side members 204 while simultaneously providing the vertical axis about which attachment members 276 can rotate.

In the arrangement shown, as one example, attachment members 276 include fastener 300. Fastener 300 is formed of any suitable size, shape, and design and is configured to connect attachment members 276 to side members 204, provide a vertical axis about which attachment members 276 may pivot, and facilitate adjustment of attachment members 276 along a length of side members 204. In the arrangement shown, as one example, fastener 300 is formed of a bolt and a nut, however any other fastener may be used as fastener 300 and is hereby contemplated for use. In the arrangement shown, as one example, the bolt of fastener 300 extends through slot 298 of attachment member 276 and through slot 278 of side members 204. In this arrangement, the nut of fastener 300 is provided below the bottom surface 258 of side members 204 and the bolt of fastener 300 is threated into the nut of fastener 300.

In the arrangement shown, as one example, utilizing attachment member 276, including clamping bolt 296, slot 298, and fastener 300, a user can secure virtually any cutting member 30 to side members 204 because attachment members 276 are adjustable in multiple directions and pivotable. For example, if the user desires to attach a cutting member 30 to side members 204, the user can laterally adjust side members 204 to the proper position and place the base plate 174 of cutting member 30 onto second surface 274. Next, the user can position attachment members 276 at the appropriate location along a length of side members 204 by loosening fastener 300, moving fastener 300 (and attachment members 276) along a length of side members 204 within slots 278, and then tighten fastener 300 when attachment member 276 is in the desired position. If the user wants to pivot attachment member 276 to ensure proper positioning of clamping bolt 296 on base plate 174 of cutting member 30, the user can loosen fastener 300, pivot attachment member 276 so clamping bolt 296 is in the desired position, and then tighten fastener 300 again. Finally, if the user desires to adjust attachment member 276 inward and outward relative to side member 204 to ensure clamping bolt 296 is in the proper position, the user can loosen fastener 300, move attachment member 276 along a length of slot 278, and then tighten fastener 300 when clamping bolt 296 is in the proper position. Once attachment members 276, and more specifically clamping bolts 296, are in the desired positions and fasteners 300 are tightened, the user can tighten clamping bolts 296 until clamping bolts 296 have forced base plate 174 of cutting member 30 into secured engagement with second surface 274. With cutting member 30 in secure engagement with second surface 274 of side members 204, the user can perform a cutting operation.

Open Space: In the arrangement shown, as one example, an open space 302 is present between the pair of side members 204. Open space 302 will vary in size depending on the relative positions of each side member 204. Open space 302 allows a blade 172 of cutting member 30 to extend below the bottom surface 258 of side members 204 to perform a cutting operation using system 10. In the arrangement shown, as one example, with the guide arm 200, rail 202, side members 204, and cutting member 30 operably connected to one another, blade 172 of cutting member extends below the bottom surface of side members 204. When system 10 is placed such that guide arm 200 is placed in the desired position relative to a workpiece 170 and rail 202 is positioned on top of the workpiece 170, side members 204 are also on top of the workpiece 170 but the blade 172 of cutting member extends from above the second surface 274 of side members 204, through open space 302, and below the bottom of workpiece 170 and can be utilized to cut workpiece 170.

Additionally, open space 302 allows cutting member 30 to perform a bevel cut while utilizing system 10. Because side members 204 have open space 302 between them, the blade 172 of cutting member 30 may be placed at any position and at any angle, so long as it is within open space 302. Open space 302 provides the space necessary to place the blade 172 of cutting member at an angled position such that a bevel cut can be performed. Finally, open space 302, coupled with the lateral adjustability of side members 204, allows side members 204 to facilitate secured engagement of various cutting members 30. Cutting members 30 come in various sizes, shape, designs, and configurations, and even cutting members 30 of the same type have base plates which vary in size and shape. Because side members 204 are adjustable and have open space 302 between them, system 10 can accommodate cutting members 30 of various sizes, shapes, designs, configurations, and types.

While side members 204 have been described according the arrangement shown, as one example, it will be understood by those skilled in the art that any other configuration of side members 204 may be used in order to facilitate engagement with rail 202 and facilitate attachment and support of a cutting member 30 to system 10 and its various components.

Assembly and Operation:

With reference to the alternative arrangement shown, as one example, the assembly and operation of the alternative system 10 is described. It will be apparent to one skilled in the art that assembly of the alternative system 10 may be performed in various orders without departing from the scope of the disclosure. The order of assembly, and the steps and order of operation of the alternative system 10, described below is simply an example and shall not be taken as limiting the scope of the disclosure described herein.

Guide Arm and Rail Connection: In operation, alternative system 10 can be utilized to perform an accurate and safe cutting operation. In various different arrangements, guide arm 200 may be connected to rail 202 using various methods or means. In the arrangement shown, as one example, guide arm 200 is connected to rail 202 by aligning the openings 250 of rail 202 with the node 234 and opening 228 of connection member 224 of guide arm 200 and placing rail 202 onto guide arm 200. When the user places rail 202 onto guide arm 200, node 234 will pass through the opening 250 of rail 202 which aligns with node 234. The user will then thread fastener 230 through the remaining opening 250 of rail 202 and into and at least partially through opening 228 of guide arm 200, thereby connecting rail 202 to guide arm 200.

Attachment Members: In one or more arrangements, attachment members 276 are assembled with side members 204. In the arrangement shown, as one example, the user will first place align attachment members 276 above top surface 256 of side member 204 and align a portion of slot 298 of attachment member 276 with a portion of a slot 278 of side member 204. With a portion of slot 298 and a portion of slot 278 aligned, the user can install fastener 300 by passing bolt of fastener 300 through slot 298 and then through slot 278 to the bottom surface 258 of side member 204 and threading the nut of fastener 300 onto the bolt of fastener 300 until the nut is tight against bottom surface 258 of side member 204. With fastener 300 securely connecting attachment member 276 to side members 204, clamping bolt 296 can then be threaded through attachment member 276, thus completing operable connection of attachment member 276 to side member 276. This process is then repeated for each alignment member 276, whether that be one, two, three, four, or more alignment members 276.

Side Members and Rail Connection: In one or more arrangements, side members 204 are next operably connected to rail 202. With locking member 272 loosened, side members 204 may be positioned on either end 246 of rail 202. Feature 268 of side members 204 may then be aligned with rail 202 such that rail 202 is able to slide into first opening 286 in side walls 284 of feature 268. Once properly aligned, the user can slide rail 202 into first opening 286 on one side wall 284, then through the hollow interior 290 of feature 268 while making sure rail 202 is properly positioned using support members 288, and then through and out the first opening 286 on the other side wall 284 of feature 268. At this point, side member 204 is operably connected to rail 202 and in an unlocked and adjustable position. Guide arm 200 may have been connected to rail 202 previously, or it can be connected at this point. With guide arm 200 connected to rail 202, side members 204 are operably connected to both rail 202 and guide arm 200.

Cutting Member Attachment: With side members 204 operably connected to rail 202 and guide arm 200, cutting member 30 can be placed on and secured to side members 204. First, the user will select the cutting member 30 and determine the appropriate positions of each side member 204 to ensure secure connection with the base plate 174 of cutting member 30. The user can then laterally adjust side members 204 along a length of rail 202. The user can then test placement of side members 204 by placing cutting member 30 onto side member 204. If the base plate 174 of cutting member 30 is not securely resting on the second surface 274 of each of the side members 204, then user can individually adjust one or both side members 204 appropriately to ensure base place 174 is securely resting on second surface 274 of side members 204. At this time also, the user can place guide cursor 270 through the second opening 287 of one of the side members 204 and align the tip of guide cursor 270 with the edge of the blade 172 of cutting member 30. The user can then look at indicia 252 on rail 202 to see if the tip of guide cursor 270, and the blade 172 of cutting member 30, are aligned with the desired cutting line, if a straight cut, or the desired radius, if a circular cut.

With side members 204 properly positioned and base plate 174 resting securely on the second surface 274 of each side member 204 the user can adjust attachment members 276 to their appropriate positions. The user can move attachment members 276 forwards or backwards relative to the cutting member 30 by slightly loosening fastener 300 and moving attachment member 276 a length along slot 278 on top surface 256 of side members 204. The user can also adjust the lateral position of attachment member 276 by moving attachment member 276 along a length of slot 298 until attachment member 276 is in the desired position. Additionally, the user can pivot attachment member 276 about a vertical access created by fastener 300 to a desired position on the base plate 174 of cutting member 30. Once the user has adjusted attachment member 276 to the desired position, the user can tighten clamping bolt 296. By tightening clamping bolt 296, clamping bolt 296 will lower, contact base plate 174, and lower an additional distance to make sure base place 174 is securely engaged with second surface 274 of side member 204. The user can repeat this process for each attachment member 276 of system 10. Once clamping bolt 296 of attachment members 276 are tightened to securely hold base plate 174 in engagement with second surface 274 of each side member 204, system 10 is assembled and ready to perform a cutting operation.

In Operation: With the various components of alternative system 10 assembled, system 10 can be utilized to perform an accurate, safe, easy, and precise cutting operation. First, the user selects a workpiece 170 to be cut. The user then places workpiece 170 on a cutting surface and determines a desired cutting line or cutting radius. Next, system 10 is placed on the workpiece 170 such that guide arm 200 is adjacent a side 176 of workpiece 170, if making a straight cut, or in the desired center of the circle if making a circular cut. In this position, rail 202 will at or just above the top of workpiece 170 and, preferably, a majority of the side members 204 will be off the workpiece 170 and the blade 172 of cutting member 30 will be behind the workpiece 170 and extending through open space 302 and extend from at or near the top of workpiece 170 to at or below the bottom of workpiece 170.

At this point, the user can adjust the position of side members 204 such that blade 172 will cut along the desired cutting line or cut at the desired cutting radius. To do this, locking member 272 should be loosed to be in an unlocked position. In this position, side members 204 are not secured to any position along a length of rail 202. The user can utilize guide cursor 270 of side members 204 and indicia 252 on rail 202 to properly align the edge of blade 172 of cutting member 30 with the desired cutting line or cutting radius.

Once blade 172 is properly aligned with the desired cutting line, the user can tighten locking member 272 by threading it further into the hollow interior 290 of feature 268. As locking member 272 moves further into the hollow interior 290 of feature 268, it contacts rail 202 and forces rail 202 into feature 268, thereby facilitating secured engagement with feature 268. Once rail 202 is in secure engagement with feature 268, friction between rail 202 and feature 268 will prevent side members 204 from moving along a length of rail 202, thereby placing side members 204 in a locked position. With blade 172 in alignment with the desired cutting line, or desired cutting radius, and side members 204 locked and no longer able to move along a length of rail 202, the user can perform the cutting operation by starting the cutting member 30, holding onto handle 220 of guide arm 200, and moving cutting member 30 as desired, thereby cutting workpiece 170.

From the above discussion it will be appreciated that the system 10 presented herein improves upon the state of the art. Specifically, in one or more arrangements, an improved rip-cut saw guide system is provided which: is safe to use; is efficient to use; is relatively inexpensive; is capable of making long straight cuts; is capable of making round; can be used to cut both large and small pieces easily and accurately; is accurate; is efficient; can be used with practically any circular saw; can be used with practically any jigsaw; can be used with workpieces with a wide range of thicknesses; is easy to learn how to use; is relatively small in size and shape; provides the benefits of a circular saw and a table saw in a single device; provides the benefits of a jigsaw and a table saw in a single device; allows for bevel cuts and other angled cuts; holds workpieces in a firm and rigid manner; is easy to set up; is easy to take down; is formed of a minimum number of parts; is simple to use; is easier to use than prior art systems; is unique; provides new capabilities to existing tools; can be used with practically any benchtop; is high quality; has a robust design; has a long useful life; provides accurate and clean cuts; helps prevent chip tear-out; is durable; saves time; is fun to use; can be used with workpieces of practically any material; is easily portable and can be used on a job site; is adjustable to fit various shape, sizes, and types of saws.

What is claimed:

1. A guide system for woodworking operations using a cutting member having a base plate, the guide system comprising:

a sled configured to slide on a top surface of a workpiece;

the sled having a front member;

the sled having a pair of side members;

wherein the pair of side members are operably connected to the front member;

wherein the pair of side members extend rearward from the front member;

wherein the sled is configured to facilitate lateral repositioning of one of the pair of side members relative to the other of the pair of side members so as to adjust a distance between the pair of side members;

wherein the pair of side members are configured for side edges of the base plate of the cutting member to be placed on the pair of side members;

wherein the pair of side members are configured to slide on and in contact with the top surface of the workpiece during a cutting operation;

the pair of side members having a set of attachment members configured to engage the base plate of the cutting member so as to facilitate secure attachment of the cutting member to the sled while allowing a blade of the cutting member to reach down and through the workpiece during the cutting operation;

wherein the set of attachment members are laterally adjustable in two dimensions relative to the base plate so as to adjust the lateral positions at which the set of attachment members can be attached to the base plate of the cutting member.

2. The system of claim 1, wherein the cutting member is a circular saw.

3. The system of claim 1, wherein the cutting member is a jigsaw.

4. The system of claim 1, wherein the front member has a pair of slots;

wherein the pair of side members are operatively connected to the front member through the pair of slots of the front member; and wherein the pair of side members are configured to move laterally within the pair of slots of the front member.

5. The system of claim 1, wherein the set of attachment members includes at least one attachment member;

wherein the at least one attachment member is configured to facilitate secure engagement of the cutting member to at least one of the pair of side members;

wherein the at least one attachment member is movable along a length of the at least one of the pair of side members;

wherein the at least one attachment member is configured to move inward and outward relative to the at least one of the pair of side members; and wherein the at least one attachment member is configured to pivot about a vertical axis.

6. The system of claim 1, wherein each of the pair of side members have a respective one of the set of attachment members;

wherein the respective attachment members of each of the pair of side members are adjustable side-to-side as well as being adjustable forward-to-back.

7. The system of claim 1, wherein the pair of side members extend a length from a front end to a back end;

wherein the pair of side members have at least one slot;

wherein the at least one slot of the pair of side members extends a length from near the front end towards the back end of the pair of side members;

wherein the pair of side members have at least one attachment member of the set of attachment members; and wherein the at least one attachment member is movable along a length of the at least one slot of the pair of side members.

8. The system of claim 1, wherein the pair of side members extend a length from a front end to a back end;

the pair of side members each having a first slot and a second slot;

wherein the first slot extends a length from the front end of the pair of side members to near a midpoint of the pair of side members;

wherein the second slot extends a length from near the midpoint of the pair of side members to near the back end of the pair of side members;

the pair of side members each having a first attachment member and a second attachment member of the set of attachment members;

wherein the first attachment member is movable along a length of the first slot of the pair of side members; and wherein the second attachment member is movable along a length of the second slot of the pair of side members.

9. The system of claim 1 further comprising:

a rail;

the rail extending a length between a first end and a second end;

wherein the sled is operatively connected to the rail; and wherein the sled is configured to move laterally along a length of the rail.

10. The system of claim 1 further comprising:

a rail;

the rail having indicia;

wherein the indicia of the rail indicates a distance from an end of a workpiece;

wherein the sled is operatively connected to the rail; and wherein the sled is configured to move laterally along a length of the rail.

11. The system of claim 1 further comprising:

a rail;

the rail having a feature;

wherein the sled is operatively connected to the feature of the rail; and wherein the sled is configured to move laterally along a length of the rail.

12. The system of claim 1 further comprising:

a rail;

the rail extending a length between a first end and a second end;

the front member having a pair of slots;

wherein the pair of side members are operatively connected to the front member through the pair of slots;

wherein the pair of side members are configured to move laterally within the pair of slots of the front member; and wherein the front member is configured to operatively connect to the rail and move laterally along a length of the rail.

13. The system of claim 1 further comprising:

a guide arm;

the guide arm configured to be positioned adjacent an end of a workpiece;

a rail;

the rail operatively connected to the guide arm;

the rail having a length extending from a first end to a second end;

wherein the first end of the rail is operatively connected to the guide arm; and wherein the sled moves along a length of the rail.

14. The system of claim 1, wherein the sled is configured to be slid on and in contact with the top surface of the workpiece when performing the cutting operation to cut the workpiece using the cutting member;

wherein the set of attachment members hold the base plate in a stationary position relative to the sled during a cutting operation.

15. A guide system for woodworking operations using a cutting member having a base plate, the guide system comprising:

a sled configured to slide on and in contact with a top surface of a workpiece when performing a cutting operation to cut the workpiece using the cutting member;

the sled having a pair of side members;

the pair of side members having a set of attachment members configured to engage the base plate of the cutting member so as to facilitate secure attachment of the cutting member to the sled while allowing a blade of the cutting member to reach down and through the workpiece;

wherein a bottom side of the pair of side members is configured to contact the top surface of the workpiece in one or more contact areas;

wherein the one or more contact areas includes a first contact area extending beyond a left side of the base plate and-includes a second contact area extending beyond a right side of the base plate, thereby providing a stable base for the sled and cutting member on the workpiece when performing the cutting operation;

wherein the set of attachment members are laterally adjustable in two dimensions relative to the base plate;

a rail;

the rail extending a length between a first end and a second end;

wherein the sled is operatively connected to the rail;

a guide arm;

the guide arm operably connected to the second end of the rail;

wherein the guide arm is configured to slide along an edge of the workpiece and thereby guide the rail and sled relative to an edge of the workpiece as the sled is slid on the top surface of the workpiece when performing the cutting operation.

16. The system of claim 15 wherein the sled is adjustable in position along the length of the rail.

17. The system of claim 15 wherein the sled has a front member;

wherein the pair of side members are operatively connected to the front member;

wherein the pair of side members are adjustable in position along a length of the front member.

18. The system of claim 15 wherein the sled has a front member;

wherein the pair of side members are operatively connected to the front member;

wherein the pair of side members are adjustable in position along a length of the front member;

wherein the pair of side members are operatively connected to the front member through a pair of slots of the front member; and wherein the pair of side members are configured to move laterally within the pair of slots of the front member.

* * * * *